United States Patent
Kim et al.

(10) Patent No.: US 12,513,634 B2
(45) Date of Patent: Dec. 30, 2025

(54) METHOD AND APPARATUS FOR TRANSMITTING AND RECEIVING SYNCHRONIZATION SIGNAL IN COMMUNICATION SYSTEM

(71) Applicant: Samsung Electronics Co., Ltd., Suwon-si (KR)

(72) Inventors: Youngbum Kim, Suwon-si (KR); Jeongho Yeo, Suwon-si (KR); Hyunseok Ryu, Suwon-si (KR); Cheolkyu Shin, Suwon-si (KR); Younsun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 18/033,236

(22) PCT Filed: Oct. 29, 2021

(86) PCT No.: PCT/KR2021/015433
§ 371 (c)(1),
(2) Date: Apr. 21, 2023

(87) PCT Pub. No.: WO2022/092893
PCT Pub. Date: May 5, 2022

(65) Prior Publication Data
US 2023/0403661 A1    Dec. 14, 2023

(30) Foreign Application Priority Data
Oct. 30, 2020   (KR) ........................ 10-2020-0143406

(51) Int. Cl.
*H04W 56/00*   (2009.01)
*H04W 48/08*   (2009.01)
*H04W 84/06*   (2009.01)

(52) U.S. Cl.
CPC ......... *H04W 56/001* (2013.01); *H04W 48/08* (2013.01); *H04W 84/06* (2013.01)

(58) Field of Classification Search
CPC ... H04W 56/001; H04W 48/08; H04W 84/06; H04W 56/0035; H04W 48/12; H04W 56/004; H04W 56/0005; H04B 7/18513
See application file for complete search history.

(56) References Cited

U.S. PATENT DOCUMENTS

2022/0095258 A1   3/2022  Yeo et al.
2023/0292267 A1   9/2023  He
(Continued)

FOREIGN PATENT DOCUMENTS

KR    10-2022-0037732 A    3/2022
WO    2020/103161 A1       5/2020

OTHER PUBLICATIONS

1 Extended European Search Report dated Feb. 14, 2024, issued in European Patent Application No. 21886887.5.
(Continued)

*Primary Examiner* — Kyaw Z Soe
(74) *Attorney, Agent, or Firm* — Jefferson IP Law, LLP

(57) ABSTRACT

The present disclosure relates to a 5G or 6G communication system for supporting data transmission rates higher than that of a 4G communication system such as LTE. More particularly, the present disclosure relates to a method and apparatus in which a base station transmits a synchronization signal via a satellite and a terminal detects the synchronization signal in a communication system.

15 Claims, 40 Drawing Sheets

(56) References Cited

U.S. PATENT DOCUMENTS

2023/0397138 A1* 12/2023 Lei .......................... H04L 5/005
2023/0403661 A1* 12/2023 Kim ................... H04W 56/001
2024/0340774 A1* 10/2024 Rane ................ H04L 27/26025

OTHER PUBLICATIONS

Mediatek Inc., 'Summary of 8.4.4 Other Aspects of NR-NTN', R1-2007002, 3GPP TSG RAN WG1 Meeting # 102e, e-Meeting, Aug. 19, 2020.
Oppo, 'On synchronization raster indication', R1-1803997, 3GPP TSG RAN WG1 Meeting #92bis, Sanya, China, Apr. 6, 2018.
Thales, 'Considerations on satellite beam management, control loops and feeder link switch over', R1-1913131, 3GPP TSG RAN WG1 Meeting #99, Reno, USA, Nov. 17, 2019.
Qualcomm Incorporated, 'On NTN Initial Search and Handover', R1-1912958, 3GPP TSG RAN WG1 #99, Reno, USA, Nov. 9, 2019.
VIVO, 'Discussion on NR sync raster shift for frequency range 0-2700MHZ', R4-1804076, 3GPP TSG RAN WG4 Meeting #86bis, Melbourne, AU, Apr. 6, 2018.

* cited by examiner

| Orbit type | Height | Period |
|---|---|---|
| LEO | 500~1000 km | 90~120 min |
| MEO | 5000~15000 km | Approx 6 hours |
| GEO | Approx 36,000 km | Approx 24 hours |

- Link budget between UE and satellite

- Path loss : (1600)
    $FSPL(d, f_c) = 32.45 + 20 \log_{10}(f_c) + 20 \log_{10}(d)$

- Rx antenna gain for UL : 24 dBi (LEO), 45.5 dBi (GEO)

- Link budget between UE and terrestrial gNB

- Path loss (LOS) : (1610)
    $PL_2 = 28.0 + 40 \log_{10}(d_{3D}) + 20 \log_{10}(f_c) - 9 \log_{10}((d'_{BP})^2 + (h_{BS} - h_{UT})^2)$

- Path loss (NLOS) : (1620)
    $PL'_{UMa-NLOS} = 13.54 + 39.08 \log_{10}(d_{3D}) + 20 \log_{10}(f_c) - 0.6(h_{UT} - 1.5)$

- Rx antenna gain for UL : ~12 dBi

METHOD AND APPARATUS FOR TRANSMITTING AND RECEIVING SYNCHRONIZATION SIGNAL IN COMMUNICATION SYSTEM

TECHNICAL FIELD

The present disclosure relates to a method and apparatus that enable a base station to transmit a synchronization signal and enable a terminal to detect the synchronization signal in a communication system.

BACKGROUND ART

Wireless communication technologies have been developed over several generations mainly for human-targeted services, such as voice, multimedia, and data communication. As 5th generation (5G) communication systems are commercially available, it is expected that the explosively increasing number of connected devices will be connected to communication networks. Examples of things connected to a network may include vehicles, robots, drones, home appliances, displays, smart sensors installed in various infrastructures, construction machinery, and factory equipment. Mobile devices are expected to evolve into various form factors, such as augmented reality glasses, virtual reality headsets, and hologram gadgets. In the 6th generation (6G) era, efforts are being made to develop enhanced 6G communication systems to provide various services by connecting hundreds of billions of devices and things. For this reason, the 6G communication system is called a beyond 5G system.

In a 6G communication system expected to be realized around year 2030, the maximum transmission rate is tera (i.e., 1000 giga) bps, and the wireless latency is 100 microseconds (μsec). In other words, in the 6G communication system, compared to the 5G communication system, the transmission speed is 50 times faster and the wireless latency is reduced to $\frac{1}{10}$.

To achieve these high data rates and ultra-low latency, 6G communication systems are being considered for implementation in a terahertz band (e.g., 95 gigahertz (95 GHz) to 3 terahertz (3 THz) band). As the path loss and atmospheric absorption issues worsen in the terahertz band compared with the millimeter wave (mmWave) band introduced in 5G, it is expected that the importance of technology that can guarantee signal reach, that is, coverage, will increase. To ensure coverage, it is required to develop key technologies regarding radio frequency (RF) elements, antennas, new waveforms that are better in terms of coverage than orthogonal frequency division multiplexing (OFDM), beamforming, and multi-antenna transmission techniques such as massive multiple-input and multiple-output (massive MIMO), full dimensional MIMO (FD-MIMO), array antennas, and large scale antennas. In addition, to improve the coverage of terahertz band signals, new technologies are being discussed such as metamaterial-based lenses and antennas, high-dimensional spatial multiplexing using orbital angular momentum (OAM), and reconfigurable intelligent surfaces (RIS).

Additionally, to improve the frequency efficiency and system network for 6G communication systems, technologies are being developed such as full duplex technology in which uplink and downlink simultaneously utilize the same frequency resource at the same time, networking technology that utilizes satellites and high-altitude platform stations (HAPS) in an integrated way, network architecture innovation technology that supports mobile base stations and enables network operation optimization and automation, dynamic spectrum sharing technology through collision avoidance based on spectrum usage prediction, AI-based communication technology that utilizes artificial intelligence (AI) from the design stage and internalizes end-to-end AI support functions to realize system optimization, and next-generation distributed computing technology that realizes complex services exceeding the limits of terminal computing capabilities by utilizing ultra-high-performance communication and computing resources (mobile edge computing (MEC), cloud, etc.). In addition, attempts are continuously made to further strengthen connectivity between devices, further optimize networks, promote softwarization of network entities, and increase the openness of wireless communications through the design of new protocols to be used in 6G communication systems, the implementation of hardware-based security environments, the development of mechanisms for safe use of data, and the technology development for maintaining privacy.

These research and development on 6G communication systems are expected to enable the next hyper-connected experience through the hyper-connectivity of 6G communication systems which includes not only connections between things but also connections between people and things. Specifically, it is expected that services such as truly immersive extended reality (XR), high-fidelity mobile hologram, and digital replica will be available through 6G communication systems. In addition, via security and reliability enhancement, services such as remote surgery, industrial automation, and emergency response will be provided through 6G communication systems, and can be applied in various fields such as industry, medical care, automobiles, and home appliances.

On the other hand, as the cost of launching satellites has drastically decreased in the late 2010s and 2020s, the number of companies trying to provide communication services through satellites has increased. Accordingly, satellite networks have emerged as a next-generation network system that complements existing terrestrial networks. Although there is a possibility that the satellite network may fail to provide a user experience comparable to that of a terrestrial network, it has not only the advantage of being capable of providing communication services even in areas where it is difficult to build a terrestrial network or in a disaster situation but also has secured economic feasibility due to the recent sharp decrease in satellite launch costs as described above. Further, some companies along with 3rd Generation Partnership Project (3GPP) standards are also conducting research on direct communication between smartphones and satellites.

DISCLOSURE OF INVENTION

Technical Problem

Communications satellites can be classified into low Earth orbit (LEO) satellites, medium Earth orbit (MEO) satellites, and geostationary orbit (GEO) satellites according to their orbits. In general, GEO means a satellite at an altitude of about 36000 km, MEO means a satellite at an altitude of 5000 to 15000 km, and LEO means a satellite at an altitude of 500 to 1000 km. Satellites orbit the Earth at their altitude. When a satellite orbits the Earth, if the centrifugal force generated by the satellite's velocity and the gravitational force pulling the satellite from the Earth match, the satellite can orbit the Earth while maintaining its orbit. Based on this, the required orbital velocity of a satellite can be calculated according to the altitude of the satellite. For example, to maintain an orbit at an altitude of 1000 km, a satellite needs a velocity of 7.3487 km/sec (7.3487 km per second). In the case of a GEO satellite, its orbital velocity coincides with the Earth's rotational velocity, so it always appears to be at the same position on the ground. Due to the fast movement speed of a satellite, a Doppler effect occurs in the signal transmitted from the satellite, and the center frequency of the signal is shifted. The Doppler effect occurs-when the transmitter and the receiver move relative to each other. In the case of a vehicle moving on the ground, as the speed of the vehicle is much smaller than the speed of light, the shift of the center frequency caused by the Doppler effect is very small. However, in the case of a satellite, since it moves at a speed of about 7 km/sec, which is very fast compared to a vehicle on the ground, the shift of the center frequency due to the Doppler effect generated accordingly is relatively large. That is, when a terminal in a satellite network intends to connect to a base station through a satellite, a Doppler effect, which is much greater than the Doppler effect that can occur when a terminal and a base station directly communicate in a terrestrial network, occurs between the satellite network and the terminal on the ground.

Since the center frequency shifts according to such a large Doppler effect, the center frequency of the signal transmitted by the transmitter is changed and received by the receiver. Hence, if the receiver does not know the shifted center frequency of the transmitted signal, reception performance may be very poor. To solve this problem, a method for correcting the Doppler effect occurring between a satellite network and a terminal on the ground is required.

Solution to Problem

To solve the above problems, in the disclosure, a method performed by a terminal supporting non-terrestrial network (NTN) communication in a wireless communication system may include: identifying a synchronization raster to perform initial access for NTN communication; and receiving a synchronization signal block (SSB) from a satellite based on the identified synchronization raster, wherein the position of the synchronization raster may be identified by a global synchronization channel number (GSCN), and wherein each GSCN may be determined based on a first parameter related to the order of clusters formed by at least one synchronization raster and a second parameter related to the order of synchronization rasters included in a cluster.

Further, in the above method, the transmission frequency of the SSB may be corrected based on a Doppler effect between the satellite and the terminal.

In the above method, the SSB may be transmitted by a base station and received via the satellite.

Here, the above method may further include receiving, from the base station via the satellite, system information indicating that the base station is a base station for the NTN communication.

Further, in case that a subcarrier spacing (SCS) of the SSB is 15 kHz and the frequency band for the initial access is lower than 3000 MHz, the interval between the 1st synchronization rasters included respectively in two adjacent clusters may be greater than 1200 kHz.

Further, in case that the SSB has a subcarrier spacing (SCS) of 15 kHz and the frequency band for the initial access is lower than 3000 MHz, the interval between two adjacent synchronization rasters included in a cluster may be less than 50 kHz.

Further, in case that the SSB has an SCS of 15 kHz and the frequency band for the initial access is lower than 3000 MHz, the maximum value of the first parameter may be less than 2499 or the number of synchronization rasters included in a cluster may be less than 3.

Further, the interval between two adjacent synchronization rasters included in a cluster may be determined based on the altitude of the satellite.

According to another embodiment of the disclosure, a terminal supporting non-terrestrial network (NTN) communication in a wireless communication system may include: a transceiver to transmit and receive-signals; and a controller connected to the transceiver, wherein the controller may be configured to: identify a synchronization raster to perform initial access for NTN communication; and receive a synchronization signal block (SSB) from a satellite based on the identified synchronization raster, wherein the position of the synchronization raster may be identified by a global synchronization channel number (GSCN), and wherein each GSCN may be determined based on a first parameter related to the order of clusters formed by at least one synchronization raster and a second parameter related to the order of synchronization rasters included in a cluster.

Advantageous Effects of Invention

According to various embodiments of the disclosure, the terminal may connect to the base station via a satellite, and the base station may notify the terminal of a frequency offset and the terminal may correct the time offset, so that signals can be effectively exchanged between the base station and the terminal.

MODE FOR THE INVENTION

Figure 1:
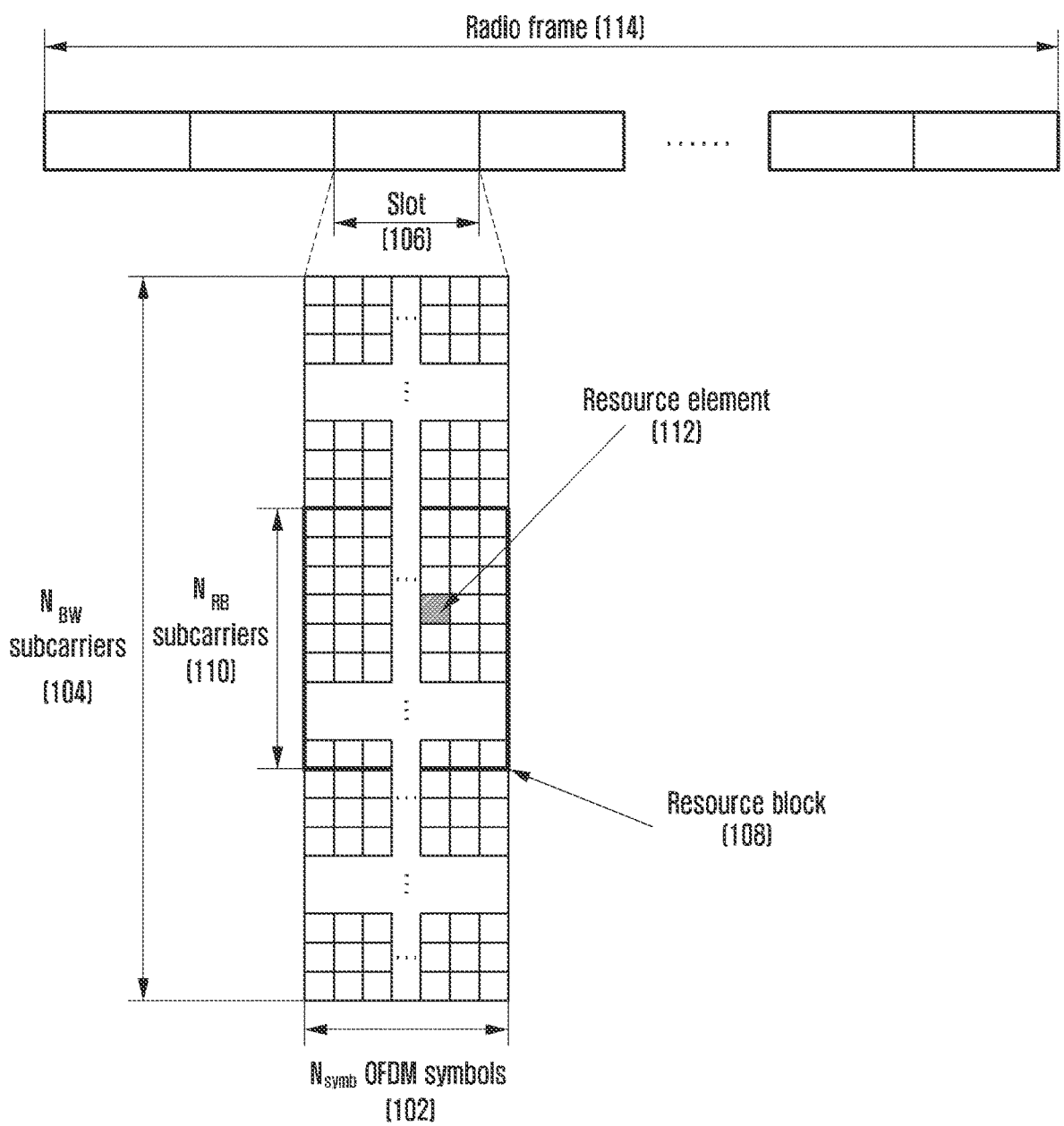
FIG. 1 is a diagram illustrating the basic structure of a time-frequency domain, which is a radio resource region in which a data or control channel is transmitted in downlink or uplink in a new radio (NR) system.

The NR (New Radio access technology) system as new 5G communication is being designed so that various services can be freely multiplexed in time and frequency resources, and the waveform, numerology, reference signals or the like can be dynamically or freely allocated according to the needs of corresponding services. To provide optimal services to UEs in wireless communication, it is important to optimize data transmission through measurement of the channel quality and interference amount, and accurate measurement of channel conditions is essential correspondingly. However, in the case of 5G channels, unlike 4G communication where channel and interference characteristics do not change greatly according to frequency resources, the channel and interference characteristics may change greatly depending on services, so that it is necessary to support subsets of a frequency resource group (FRG) that can be measured in a divisible manner. On the other hand, the types of services supported in the NR system can be divided into categories such as enhanced mobile broadband (eMBB), massive machine type communications (mMTC), and ultra-reliable and low-latency communications (URLLC). eMBB can be seen as services aiming at high-speed transmission of high-capacity data, mMTC can be seen as services aiming at connecting many UEs with minimal UE power, and URLLC can be seen as services aiming at high reliability and low latency. Different requirements may be applied according to the types of services related to the UE.

In this way, a plurality of services can be provided to the user in the communication system, and, to provide such plural services to a user, a method capable of providing individual services within the same time period according to characteristics and an apparatus using the method are required.

Hereinafter, embodiments of the disclosure will be described in detail with reference to the accompanying drawings.

In the following description of embodiments, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card. In addition, a unit or the like may include one or more processors in an embodiment.

In contrast to early wireless communication systems that provided voice-oriented services only, advanced broadband wireless communication systems, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e communication standards, may provide high-speed and high-quality packet data services. In addition, communication standards are being developed for 5G or NR (new radio) systems as the fifth generation wireless communication system.

As a representative example of the broadband wireless communication system, the NR system employs orthogonal frequency division multiplexing (OFDM) in the downlink (DL) and the uplink (UL). More specifically, cyclic-prefix OFDM (CP-OFDM) is employed in the downlink, and discrete Fourier transform spreading OFDM (DFT-S-OFDM) is employed along with CP-OFDM in the uplink. The uplink refers to a radio link through which a terminal (user equipment (UE) or mobile station (MS)) sends a data or control signal to a base station (BS, gNode B), and the downlink refers to a radio link through which a base station sends a data or control signal to a UE. In such a multiple access scheme, time-frequency resources used to carry user data or control information are allocated so as not to overlap each other (i.e., maintain orthogonality) to thereby identify the data or control information of a specific user.

The NR system employs hybrid automatic repeat request (HARQ) to retransmit corresponding data at the physical layer when a decoding error has occurred in the initial transmission. HARQ is a scheme that enables the receiver having failed in decoding data to transmit information (negative acknowledgement (NACK)) indicating the decoding failure to the transmitter so that the transmitter can retransmit the corresponding data at the physical layer. The receiver may combine the retransmitted data with the previously received data for which decoding has failed, increasing data reception performance. Further, when the data is correctly decoded, the receiver may send information (acknowledgement (ACK)) indicating successful decoding to the transmitter so that the transmitter can transmit new data.

FIG. 1 is a diagram illustrating the basic structure of a time-frequency domain, which is a radio resource region in which a data or control channel is transmitted in downlink or uplink in an NR system.

In FIG. 1, the horizontal axis denotes the time domain and the vertical axis denotes the frequency domain. In the time domain, the minimum transmission unit is OFDM symbols, and $N_{symb}$ OFDM symbols 102 are grouped to form one slot 106. The length of a subframe is defined to be 1.0 ms, and the radio frame 114 is defined to be 10 ms. In the frequency domain, the minimum transmission unit is subcarriers, and the total system transmission bandwidth is composed of a total of $N_{BW}$ subcarriers 104. One frame may be defined to be 10 ms. One subframe may be defined to be 1 ms, and thus one frame may be composed of a total of 10 subframes. One slot may be defined to be 14 OFDM symbols (i.e. the number of symbols per slot ($N^{slot}_{symb}$)=14). One subframe may be composed of one or multiple slots, and the number of slots per subframe may vary according to a setting value μ for the subcarrier spacing. In an example of FIG. 2, a case where μ=0 and a case where μ=1 are shown as a subcarrier spacing setting value. When μ=0, 1 subframe may be composed of 1 slot, and when μ=1, 1 subframe may be composed of 2 slots. That is, according to the setting value μ for the subcarrier spacing, the number of slots per subframe ($N^{subframe,\mu}_{slot}$) may vary, and the number of slots per frame ($N^{frame,\mu}_{slot}$) may vary accordingly. According to each setting value p for the subcarrier spacing, $N^{subframe,\mu}_{slot}$ and $N^{frame,\mu}_{slot}$ may be defined as in Table 1 below.

TABLE 1

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

A UE before radio resource control (RRC) establishment may be configured with an initial bandwidth part (initial BWP) for initial access by the base station through a master information block (MIB). To be more specific, in the initial access step, the UE may receive configuration information about a control resource set (CORESET) and a search space, in which a physical downlink control channel (PDCCH) can be transmitted, for receiving system information required for initial access (may correspond to remaining system information (RMSI) or system information block 1 (SIB1)) through the MIB. The control resource set and the search space configured by the MIB can each be regarded as having an identity (ID) of 0. The base station may notify the UE of configuration information, such as frequency assignment information, time assignment information, and numerology for control resource set #0 through the MIB. In addition, through the MIB, the base station may notify the UE of configuration information about the monitoring periodicity and occasions for control resource set #0, that is, configuration information about search space #0. The UE may regard the frequency domain set as control resource set #0 obtained from the MIB as an initial bandwidth part for the initial access. Here, the identifier (ID) of the initial bandwidth part may be regarded as 0.

The MIB may include information as shown in Table 2 and Table 3 below.

TABLE 2

```
-- ASN1START
-- TAG-MIB-START
MIB ::=                        SEQUENCE {
    systemFrameNumber              BIT STRING (SIZE (6)),
    subCarrierSpacingCommon        ENUMERATED {scs15or60,
scs30or120},
    ssb-SubcarrierOffset           INTEGER (0..15),
    dmrs-TypeA-Position            ENUMERATED {pos2, pos3},
    pdcch-ConfigSIB1               PDCCH-ConfigSIB1,
    cellBarred                     ENUMERATED {barred, notBarred},
    intraFreqReselection           ENUMERATED {allowed, notAllowed},
    spare                          BIT STRING (SIZE (1))
}
-- TAG-MIB-STOP
-- ASN1STOP
```

TABLE 3

| MIB field descriptions |
|---|
| cellBarred |
| Value barred means that the cell is barred, as defined in TS 38.304 [20]. |
| dmrs-TypeA-Position |
| Position of (first) DM-RS for downlink (see TS 38.211 [16], clause 7.4.1.1.2) and uplink (see TS 38.211 [16], clause 6.4.1.1.3). |
| intraFreqReselection |
| Controls cell selection/reselection to intra-frequency cells when the highest ranked cell is barred, or treated as barred by the UE, as specified in TS 38.304 [20]. |
| pdcch-ConfigSIB1 |
| Determines a common ControlResourceSet (CORESET), a common search space and necessary PDCCH parameters. If the field ssb-SubcarrierOffset indicates that S1B1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13). |
| ssb-SubcarrierOffset |
| Corresponds to $k_{SSB}$ (see TS 38.213 [13]), which is the frequency domain offset between SSB and the overall resource block grid in number of subcarriers. (See TS 38.211 [16], clause 7.4.3.1). The value range of this field may be extended by an additional most significant bit encoded within PBCH as specified in TS 38.213 [13]. This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13). |
| subCarrierSpacingCommon |
| Subcarrier spacing for SIB1, Msg.2/4 for initial access, paging and broadcast SI-messages. If the UE acquires this MIB on an FR1 carrier frequency, the value scs15or60 corresponds to 15 kHz |

TABLE 3-continued

MIB field descriptions and the value scs30or120 corresponds to 30 kHz. If the UE acquires this MIB on an FR2 carrier frequency, the value scs15or60 corresponds to 60 kHz and the value scs30or120 corresponds to 120 KHz.

systemFrameNumber

The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212 [17].

In the method of configuring a bandwidth part, before RRC connection is established, the UE may receive configuration information for the initial bandwidth part via the MIB at the initial access step. To be more specific, the UE may be configured with a control, resource set for a downlink control channel, in which downlink control information (DOI) that schedules SIBs can be transmitted, from the MIB of a physical broadcast channel (PBCH). Here, the bandwidth of the control resource set configured by the MIB can be regarded as the initial bandwidth part, and the UE may receive a physical downlink shared channel (PDSCH) over which the SIB is transmitted, through the configured initial bandwidth part. In addition to the purpose of receiving the SIB, the initial bandwidth part may be used for other system information (OSI), paging, and random access.

When one or more bandwidth parts are configured for the UE, the base station may instruct the UE to switch the bandwidth part by using a bandwidth part indicator field in the DCI.

A basic unit in the time-frequency domain is a resource element (RE) 112, which may be represented by an OFDM symbol index and a subcarrier index. A resource block (RB) 108 (or, physical resource block (PRB)) is defined as $N_{RB}$ consecutive subcarriers 110 in the frequency domain. In general, the minimum transmission unit of data is the RB unit. Generally in the NR system, $N_{symb}=14$ and $N_{RB}=12$, and $N_{BW}$ is proportional to the bandwidth of the system transmission band. The data rate may be increased in proportion to the number of RBs scheduled for the UE.

In the case of an FDD system where the downlink and the uplink are separated by a frequency in the NR system, the downlink transmission bandwidth and the uplink transmission bandwidth may be different from each other. The channel bandwidth represents an RF bandwidth corresponding to the system transmission bandwidth. Table 4 and Table 5 represent a part of the correspondence between the system transmission bandwidth, subcarrier spacing, and channel bandwidth defined in the NR system for frequency range 1 (FR1) of frequencies lower than 6 GHz and frequency range 2 (FR2) of frequencies higher than 6 GHz. For example, in an NR system having a subcarrier spacing of 30 kHz and a channel bandwidth of 100 MHz, the transmission bandwidth is composed of 273 RBs. Here, "N/A" may indicate a bandwidth-subcarrier combination not supported in the NR system.

TABLE 5

| Channel bandwidth BWChannel [MHz] | subcarrier spacing | 50 MHz | 100 Mhz | 200 Mhz | 400 Mhz |
|---|---|---|---|---|---|
| Transmission bandwidth configuration NRB | 60 kHz | 66 | 132 | 264 | N/A |
| | 120 kHz | 32 | 66 | 132 | 264 |

In the NR system, the frequency range may be divided into FR1 and FR2 and defined as shown in Table 6 below.

TABLE 6

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be changed and applied differently. For example, the frequency range of FR1 may be changed to a range from 450 MHz to 6000 MHz for application.

Next, a description is given of a synchronization signal (SS)/PBCH block in 5G.

The SS/PBCH block may indicate a physical layer channel block including a primary SS (PSS), a secondary SS (SSS), and a PBCH. The details are as follows.

PSS: PSS is a signal that serves as a reference for downlink time/frequency synchronization and provides some information of cell ID.

SSS: SSS serves as a reference for downlink time/frequency synchronization, and provides remaining cell ID information not provided by PSS. Additionally, it may serve as a reference signal (RS) for demodulation of the PBCH.

PBCH: PBCH provides essential system information required for transmission and reception of a data channel and control channel of the UE. The essential system information may include search space-related control information indicating radio resource mapping information of a control channel, scheduling control information of a separate data channel for transmitting system information, and the like.

SS/PBCH block: the SS/PBCH block is composed of a combination of PSS, SSS, and PBCH. One or multiple

TABLE 4

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

SS/PBCH blocks may be transmitted within 5 ms, and individual SS/PBCH blocks being transmitted may be distinguished by an index.

The UE may detect the PSS and SSS in the initial access step; and may decode the PBCH. The UE may obtain the MIB from the PBCH, and may be configured with control resource set #0 (which may correspond to a control resource set having a control resource set index of 0) therefrom. The UE may assume that a selected SS/PBCH block and a demodulation reference signal (DMRS) transmitted in control resource set #0 are in a quasi-colocated (QCL) relationship, and may perform monitoring of control resource set #0. The UE may obtain system information through downlink control information transmitted in control resource set #0. The UE may obtain random access channel (RACH)-related configuration information required for initial access from the received system information. The UE may transmit a physical RACH (PRACH) to the base station in consideration of the selected SS/PBCH block index, and the base station having received the PRACH may obtain information about the SS/PBCH block index selected by the UE. Through this process, the base station may know that the UE has selected a specific block among individual SS/PBCH blocks and monitors control resource set #0 related thereto.

Next, a detailed description is given of downlink control information (DCI) in a 5G system.

In the 5G system, scheduling information regarding uplink data (or, physical uplink shared channel (PUSCH)) or downlink data (or, physical downlink shared channel (PDSCH)) is delivered from the base station to the UE through DCI. The UE may monitor a fallback DCI format and a non-fallback DCI format for the PUSCH or PDSCH. A fallback DCI format may include fixed fields predefined between the base station and the UE, and a non-fallback DCI format may include fields that may be configurable. In addition to this, there are various DCI formats, and each format can indicate whether it is a DCI for power control or a DCI for notifying a slot format indicator (SFI).

DCI may be transmitted over a PDCCH, which is a physical downlink control channel, through a channel coding and modulation process. A cyclic redundancy check (CRC) is attached to the payload of a DCI message, and the CRC may be scrambled with a radio network temporary identifier (RNTI) corresponding to the identity of the UE. Different RNTIs may be used according to the purpose of the DCI message, for example, UE-specific data transmission, power control command, or random access response. That is, the RNTI is not explicitly transmitted, but is transmitted by being included in the CRC calculation process. Upon receiving the DCI transmitted over the PDCCH, the UE may perform a CRC check by using the assigned RNTI, and if the CRC check result is correct, the UE may know that the corresponding message has been transmitted to it. The PDCCH is transmitted by being mapped to a control resource set (CORESET) configured to the UE.

For example, DCI for scheduling a PDSCH for system information (SI) may be scrambled with an SI-RNTI. DCI for scheduling a PDSCH for a random access response (RAR) message may be scrambled with an RA-RNTI. DCI for scheduling a PDSCH for a paging message may be scrambled with a P-RNTI. DCI for notifying a slot format indicator (SFI) may be scrambled with an SFI-RNTI. DCI for notifying transmit power control (TPC) may be scrambled with a TPC-RNTI. DCI for scheduling UE-specific PDSCH or PUSCH may be scrambled with a cell RNTI (C-RNTI).

DCI format 0_0 may be used as fallback DCI for scheduling a PUSCH, where the CRC may be scrambled with a C-RNTI. DCI format 0_0 having a CRC scrambled with a C-RNTI may include, for example, the following information.

TABLE 7

Identifier for DCI formats - [1] bit
Frequency domain resource assignment - $\lceil \log_2(N_{RB}^{UL,BWP}(N_{RB}^{UL,BWP} + 1)/2) \rceil$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
Padding bits, if required.
UL/SUL indicator - 0 or 1 bit DCI format 0_1 may be used as non-fallback DCI for scheduling a PUSCH, where the CRC may be scrambled with a C-RNTI. DCI format 0_1 having a CRC scrambled with a C-RNTI may include, for example, the following information.

TABLE 8

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;
$\lceil \log_2(N_{SRS}) \rceil$ bits for codebook based PUSCH transmission.
Precoding information and number of layers-up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as fallback DCI for scheduling a PDSCH, where the CRC may be scrambled with a C-RNTI. DCI format 1_0 having a CRC scrambled with a C-RNTI may include, for example, the following information.

TABLE 9

Identifier for DCI formats - [1] bit
Frequency domain resource assignment - $[\lceil \log_2(N_{RB}^{UL,BWP}(N_{RB}^{UL,BWP} + 1)/2) \rceil]$ bits
   Time domain resource assignment - X bits
   Frequency hopping flag - 1 bit.
   Modulation and coding scheme - 5 bits
   New data indicator - 1 bit
   Redundancy version - 2 bits
   HARQ process number - 4 bits
   TPC command for scheduled PUSCH command for scheduled PUSCH - [2] bits
   UL/SUL indicator - 0 or 1 bit DCI format 1_1 may be used as non-fallback DCI for scheduling a PDSCH, where the CRC may be scrambled with a C-RNTI. DCI format 1_1 having a CRC scrambled with a C-RNTI may include, for example, the following information.

TABLE 10

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP}(N_{RB}^{DL,BWP} + 1)/2) \rceil$ bits
   Time domain resource assignment - 1, 2, 3, or 4 bits
   VRB-to-PRB mapping - 0 or 1 bit, only for resource allocation type 1.
0 bit if only resource allocation type 0 is configured;
1 bit otherwise.
   PRB bundling size indicator - 0 or 1 bit
   Rate matching indicator - 0, 1, or 2 bits
   ZP CSI-RS trigger - 0, 1, or 2 bits
For transport block 1:
   Modulation and coding scheme - 5 bits
   New data indicator - 1 bit
   Redundancy version - 2 bits
For transport block 2:
   Modulation and coding scheme - 5 bits
   New data indicator - 1 bit
   Redundancy version - 2 bits
   HARQ process number - 4 bits
   Downlink assignment index - 0 or 2 or 4 bits
   TPC command for scheduled PUCCH - 2 bits
   PUCCH resource indicator - 3 bits
   PDSCH-to-HARQ_feedback timing indicator - 3 bits
   Antenna ports - 4, 5, or 6 bits
   Transmission configuration indication - 0 or 3 bits
   SRS request - 2 bits
   CBG transmission information - 0, 2, 4, 6, or 8 bits
   CBG flushing out information - 0 or 1 bit
   DMRS sequence initialization - 1 bit Next, a description is given of time domain resource allocation for a data channel in a 5G communication system.

The base station may configure a UE with a table regarding time domain resource allocation for a downlink data channel (PDSCH) and an uplink data channel (PUSCH) via higher layer signaling (e.g., RRC signaling). For the PDSCH, a table composed of maxNrofDL-Allocations=16 entries can be configured, and for the PUSCH, a table composed of maxNrofUL-Allocations=16 entries can be configured. Time domain resource allocation information may include, for example, PDCCH-to-PDSCH slot timing (corresponding to the time interval in units of slots between the time when the PDCCH is received and the time when the PDSCH scheduled by the received PDCCH is transmitted, denoted as K0), PDCCH-to-PUSCH slot timing (corresponding to the time interval in units of slots between the time when the PDCCH is received and the time when the PUSCH scheduled by the received PDCCH is transmitted, denoted as K2), information on the start symbol position and length for which the PDSCH or PUSCH is scheduled within the slot, mapping type of the PDSCH or PUSCH, or the like. For example, information as shown in Table 11 and Table 12 below may be notified from the base station to the UE.

TABLE 11

PDSCH-TimeDomainResourceAllocationList information element

```
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
    k0                   INTEGER(0..32)
OPTIONAL,  -- Need S
    (PDCCH-to-PDSCH timing, slot units)
    mappingType          ENUMERATED {typeA, typeB},
    (PDSCH mapping type)
    startSymbolAndLength        INTEGER (0..127)
    (PDSCH start symbol and length)
}
```

TABLE 12

PUSCH-TimeDomainResourceAllocation information element

```
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
    k2                   INTEGER(0..32)        OPTIONAL, -
- Need S
    (PDCCH-to-PUSCH timing, slot units)
    mappingType          ENUMERATED {typeA, typeB},
    (PUSCH mapping type)
    startSymbolAndLength        INTEGER (0..127)
    (PUSCH start symbol and length)
}
```

The base station may notify one of the entries of the table for the time domain resource allocation information to the UE through L1 signaling (e.g., DCI) (e.g., it can be indicated by 'time domain resource allocation' field in DCI). The UE may obtain time domain resource allocation information for the PDSCH or PUSCH based on the DCI received from the base station.

Next, a more detailed description is given of a downlink control channel in a 5G communication system with reference to the drawings.

Figure 2:
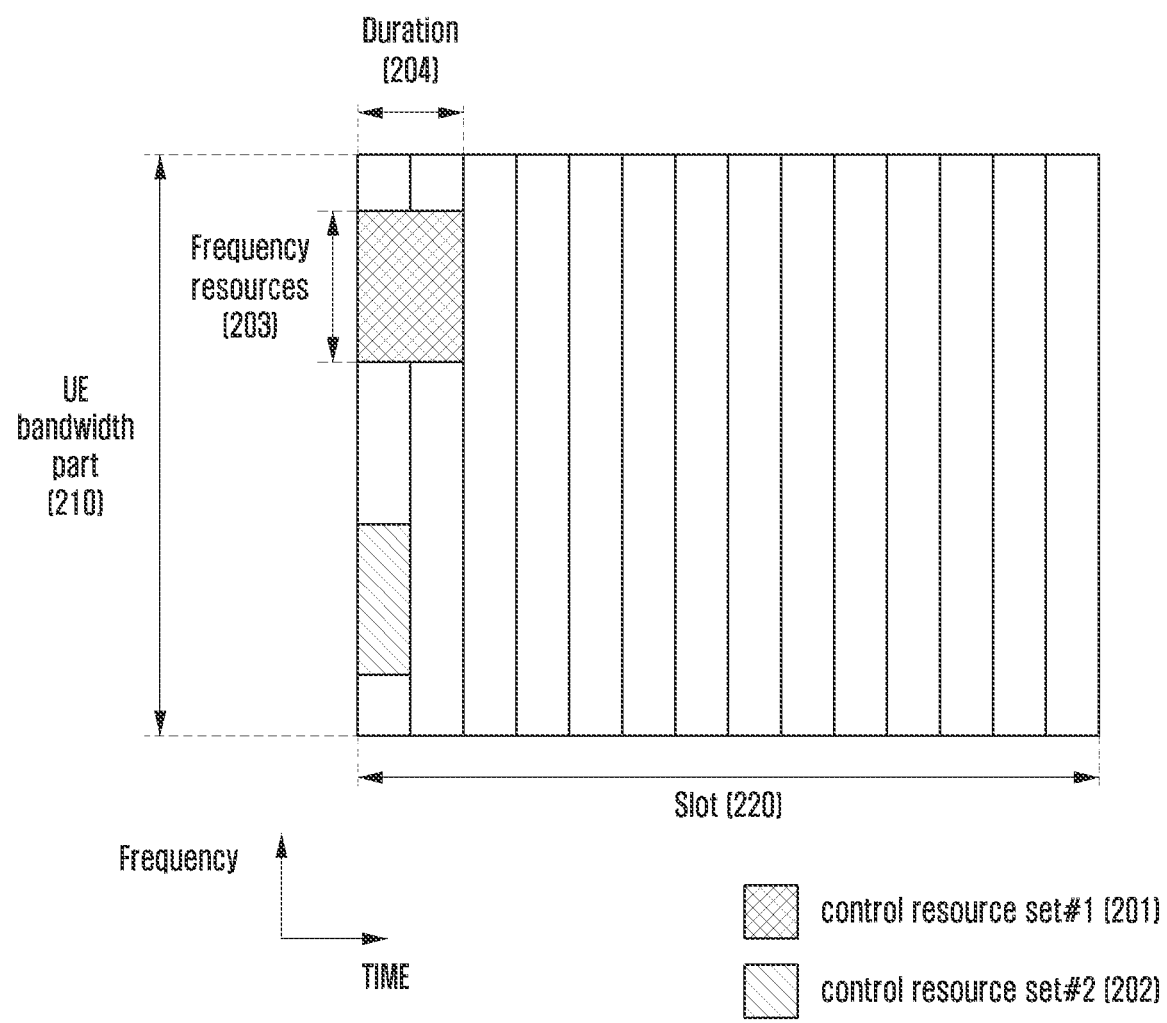
FIG. 2 is a diagram illustrating a control region in which a downlink control channel is transmitted in a 5G wireless communication system.

FIG. 2 is a diagram illustrating a control resource set in which a downlink control channel is transmitted in a 5G wireless communication system. FIG. 2 shows an example in which two control resource sets (control resource set #1 (201) and control resource set #2 (202)) are configured in a UE bandwidth part 210 on the frequency domain within one slot 220 on the time domain. The control resource sets 201 and 202 may be configured in specific frequency resources 203 within the entire UE bandwidth part 210 on the frequency domain. The control resource set may be configured as one or multiple OFDM symbols on the time domain, and this can be defined as a control resource set duration 204. Referring to the illustrated example of FIG. 2, control resource set #1 (201) is set to have a control resource set duration of 2 symbols, and control resource set #2 (202) is set to have a control resource set duration of 1 symbol.

The above-described control resource set in 5G may be configured by the base station to the UE through higher layer signaling (e.g., system information, MIB, RRC signaling). Configuring a control resource set to the UE means providing information such as a control resource set identity, a frequency location of the control resource set, and a symbol length of the control resource set. For example, this higher layer signaling may include information as shown in Table 13 below.

TABLE 13

```
ControlResourceSet ::=                SEQUENCE {
    -- Corresponds to L1 parameter 'CORESET-ID'
    controlResourceSetId            ControlResourceSetId,
(control resource set Identity))
    frequencyDomainResources        BIT STRING (SIZE (45)),
(frequency domain resource allocation information)
    duration                        INTEGER
(1..maxCoReSetDuration),
(time domain resource allocation information)
    cce-REG-MappingType
    CHOICE {
(CCE-to-REG mapping scheme)
        interleaved
    SEQUENCE {
        reg-BundleSize
    ENUMERATED {n2, n3, n6},
(REG bundle size
        precoderGranularity
    ENUMERATED {sameAsREG-bundle, allContiguousRBs},
        interleaverSize
    ENUMERATED {n2, n3, n6}
            (interleaver size)
        shiftIndex
    INTEGER(0..maxNrofPhysicalResourceBlocks-1)
                OPTIONAL
            (interleaver shift)
    },
    nonInterleaved                  NULL
    },
    tci-StatesPDCCH
    SEQUENCE(SIZE (1..maxNrofTCI-StatesPDCCH) OF TCI-
StateId
                OPTIONAL,
    (QCL configuration information)
    tci-PresentInDCI                ENUMERATED
{enabled}
                OPTIONAL, -- Need S
}
```

In Table 11, configuration information "tci-StatesPDCCH" (abbreviated as transmission configuration indication (TCI) state) may include information about one or plural SS/PBCH block indexes or channel state information reference signal (CSI-RS) indexes in a QCL relationship with a DMRS transmitted in a corresponding control resource set.

For example, the following control information may be included in DCI format 1_1, which is scheduling control information (DL grant) for downlink data.

Carrier indicator: indicates the carrier on which the data scheduled by the DCI is transmitted—0 or 3 bits Identifier for DCI formats: indicates the DCI format, and specifically, is an indicator for distinguishing whether the corresponding DCI is for the downlink or uplink—1 bit Bandwidth part indicator: indicates if there is a change in the bandwidth part—0, 1 or 2 bits Frequency domain resource assignment: resource allocation information indicating frequency domain resource allocation, and the resource represented varies depending on whether the resource allocation type is 0 or 1.

Time domain resource assignment: resource assignment information indicating time domain resource allocation, may indicate higher layer signaling or one configuration of a preset PDSCH time domain resource assignment list—1, 2, 3, or 4 bits VRB-to-PRB mapping: indicates a mapping relationship between a virtual resource block (VRB) and a physical resource block (PRB)—0 or 1 bit PRB bundling size indicator: indicates the size of physical resource block bundles to which the same precoding is assumed to be applied—0 or 1 bit Rate matching indicator: indicates the rate match group applied among the rate match groups applied to the PDSCH configured by higher layers—0, 1, or 2 bits ZP CSI-RS trigger: triggers the zero power CSI-RS—0, 1, or 2 bits Transport block (TB) related configuration information: indicates a modulation and coding scheme (MCS), a new data indicator (NDI) and a redundancy version (RV) for one or two TBs.

Modulation and coding scheme (MCS): indicates the modulation scheme and coding rate used for data transmission. That is, it may indicate a coding rate value that can inform the TBS and channel coding information together with information indicating QPSK, 16QAM, 64QAM, or 256QAM.

New data indicator: indicates whether HARQ initial transmission or retransmission.

Redundancy version: indicates a redundancy version of HARQ

HARQ process number: indicates the HARQ process number applied to the PDSCH—4 bits Downlink assignment index: an index for generating a dynamic HARQ-ACK codebook when reporting HARQ-ACK for PDSCH—0 or 2 or 4 bits TPC command for scheduled PUCCH: power control information applied to PUCCH for HARQ-ACK report as to PDSCH—2 bits PUCCH resource indicator: information indicating the resource of PUCCH for HARQ-ACK report as to PDSCH—3 bits PDSCH-to-HARQ_feedback timing indicator: configuration information on the slot in which PUCCH for HARQ-ACK report as to PDSCH is transmitted—3 bits Antenna ports: information indicating the antenna port of the PDSCH DMRS and the DMRS CDM group in which the PDSCH is not transmitted—4, 5 or 6 bits Transmission configuration indication: information indicating beam related information of PDSCH—0 or 3 bits SRS request: information requesting SRS transmission—2 bits CBG transmission information: information indicating which code block group (CBG) data is transmitted through the PDSCH when code block group-based retransmission is configured—0, 2, 4, 6, or 8 bits CBG flushing out information: information indicating whether the code block group previously received by the UE can be used for HARQ combining—0 or 1 bit DMRS sequence initialization: indicates a DMRS sequence initialization parameter—1 bit In the above, for data transmission over the PDSCH or PUSCH, time domain resource assignment may be transmitted by information about a slot in which PDSCH/PUSCH is transmitted, a start symbol position S in the corresponding slot, and the number of symbols L to which PDSCH/PUSCH is mapped. Here, S may be a relative position from the start of the slot, L may be the number of consecutive symbols, and S and L may be determined from a start and length indicator value (SLIV) defined as in Equation 1 below.

$$\text{if } (L-1) \le 7, \text{ then}$$
$$SLIV = 14 \cdot (L-1) + S$$
$$\text{else}$$
$$SLIV = 14 \cdot (14 - L + 1) + (14 - 1 - S)$$
$$\text{where } 0 < L \le 14 - S$$

Equation 1

In an NR system, the UE may be configured with information about the SLIV value, the PDSCH/PUSCH mapping type, and the slot in which the PDSCH/PUSCH is transmitted, in one row, through RRC configuration (for example, this information may be set in the form of a table). Then, in the time domain resource assignment of the DCI, by indicating the index value in the table configured above, the base station may deliver information about the SLIV value, the PDSCH/PUSCH mapping type, and the slot in which the PDSCH/PUSCH is transmitted to the UE.

In an NR system, type A and type B are defined for the PDSCH mapping. In PDSCH mapping type A, the first symbol of DMRS symbols is located at the second or third OFDM symbol of the slot. In PDSCH mapping type B, the first symbol of DMRS symbols is located at the first OFDM symbol in the time domain resource allocated through PUSCH transmission.

Downlink data may be transmitted on the PDSCH, which is a physical channel for downlink data transmission. The PDSCH may be transmitted after the control channel transmission period, and scheduling information such as a specific mapping position in the frequency domain and a modulation scheme is determined based on the DCI transmitted through the PDCCH.

Through the MCS among the control information constituting the DCI, the base station notifies the UE of the modulation scheme applied to the PDSCH to be transmitted and the size of data to be transmitted (transport block size (TBS)). In an embodiment, the MCS may be composed of 5 bits or more or fewer bits. The TBS corresponds to the size of data (transport block, TB) that the base station intends to transmit before channel coding for error correction is applied.

In the disclosure, the transport block (TB) may include a medium access control (MAC) header, a MAC control element, one or more MAC service data units (MAC SDUs), and padding bits. Or, the TB may indicate the unit of data being delivered from the MAC layer to the physical layer, or a MAC protocol data unit (MAC PDU).

The modulation schemes supported by an NR system are quadrature phase shift keying (QPSK), 16 quadrature amplitude modulation (16QAM), 64QAM, and 256QAM, whose modulation orders (Qm) correspond to 2, 4, 6 and 8, respectively. That is, 2 bits per symbol may be transmitted in the case of QPSK modulation, 4 bits per symbol may be transmitted in the case of 16QAM modulation, 6 bits per symbol may be transmitted in the case of 64QAM modulation, and 8 bits per symbol may be transmitted in the case of 256QAM modulation.

Figure 3:
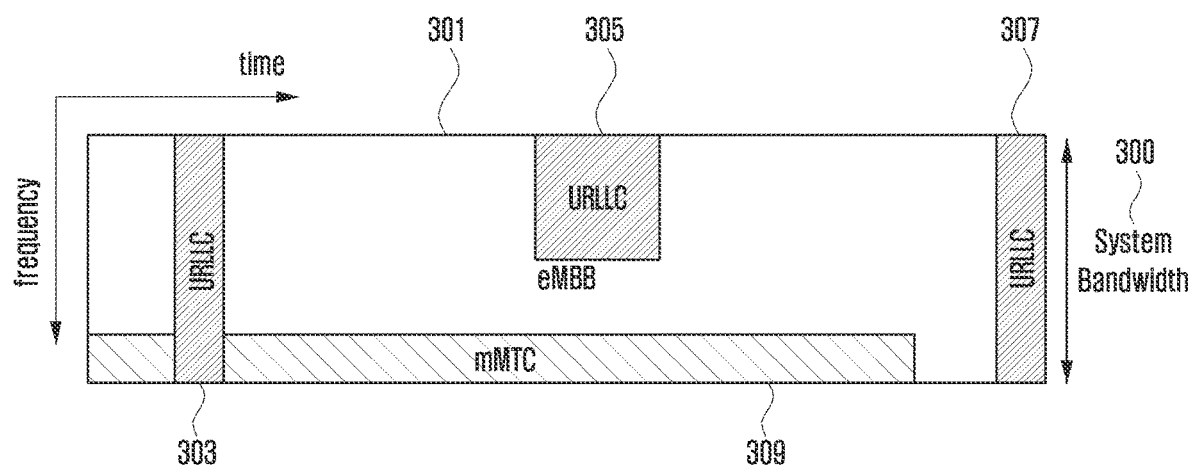
FIG. 3 is a diagram showing an example in which eMBB (enhanced mobile broadband) data, URLLC (ultra reliable low latency communications) data, and mMTC (massive machine type communications) data are allocated over the entire system frequency band.
Figure 4:
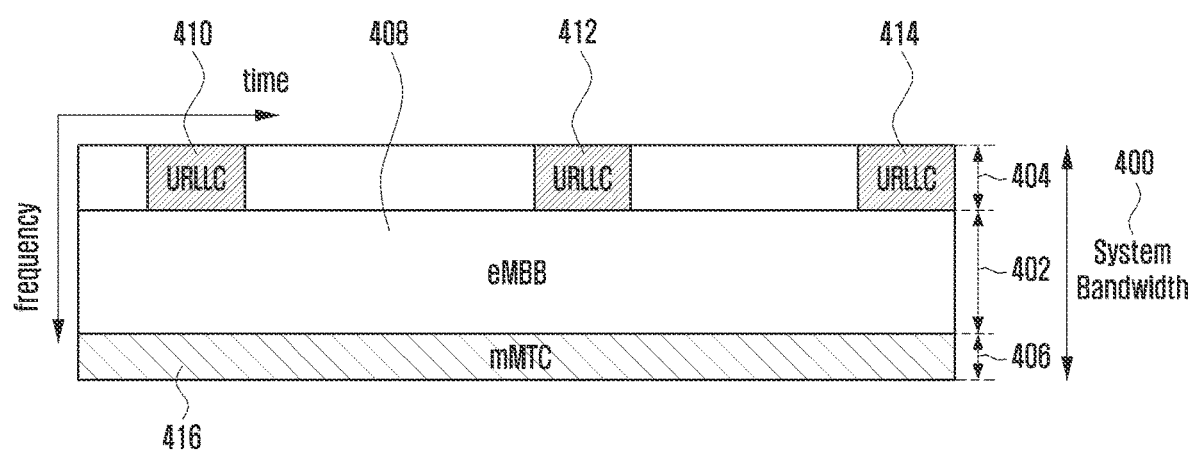
FIG. 4 is a diagram showing an example, in which eMBB data, URLLC data, and mMTC data are allocated in parts of the system frequency band.

FIGS. 3 and 4 show an example in which eMBB data, URLLC data, and mMTC data, which are services considered in the 5G or NR system, are allocated on frequency-time resources.

Schemes in which frequency and time resources are allocated for information transmission in each system can be identified with reference to FIGS. 3 and 4.

FIG. 3 shows an example in which eMBB data, URLLC data, and mMTC data are allocated over the entire system frequency bandwidth. First, in FIG. 3, pieces of data for eMBB, URLLC, and mMTC are allocated over the entire system frequency bandwidth 300. When URLLC data 303, 305 or 307 is generated and its transmission is required while eMBB 301 and mMTC 309 has been allocated in specific frequency bands and are being transmitted, the URLLC data 303, 305 or 307 may be transmitted by emptying the portions already allocated to eMBB 301 and mMTC 309 or not transmitting them. Among the above services, URLLC needs to reduce the delay time, URLLC data 303, 305 or 307 may be allocated to portions of the resources 301, to which eMBB is allocated, and transmitted. Here, when URLLC is additionally allocated and transmitted through the resource already allocated to eMBB, eMBB data may be not transmitted on the overlapping frequency-time resource, and the transmission performance of eMBB data may be lowered accordingly. That is, in the above case, eMBB data transmission may fail due to URLLC allocation.

FIG. 4 shows an example in which eMBB, URLLC, and mMTC data are allocated by dividing the system frequency band. In FIG. 4, the entire system frequency band 400 may be divided into sub-bands 402, 404 and 406, which may each be used for service and data transmission. Information related to the sub-band configuration may be determined in advance, and this information may be transmitted from the base station to the UE through higher-layer signaling. Alternatively, the base station or a network node may divide sub-bands at its discretion to provide services without separately transmitting sub-band configuration information to the UE. In FIG. 4, sub-band 402 is used for eMBB data transmission, sub-band 404 is used for URLLC data transmission, and sub-band 406 is used for mMTC data transmission.

To describe the method and apparatus proposed in the embodiment, the terms "physical channel" and "signal" in the NR system may be used. However, the contents of the disclosure can be applied to wireless communication systems other than the NR system.

Hereinafter, embodiments of the disclosure will be described in detail with reference to the accompanying drawings. Also, in describing the disclosure, if it is determined that a detailed description of a related function or configuration may unnecessarily obscure the gist of the disclosure, the detailed description will be omitted. Further, the terms described below are defined in consideration of their functions in the disclosure, and these may vary depending on the intention of the user, the operator, or the custom. Hence, their meanings should be determined based on the overall contents of this specification.

In the disclosure, the term "downlink (DL)" refers to a wireless transmission path through which the base station sends a signal to the UE, and the term "uplink (UL)" refers to a wireless transmission path through which the UE sends a signal to the base station.

In the following description, embodiments of the disclosure will be described with an NR system as an example, they may be applicable to other communication systems having similar technical backgrounds or channel configurations. Also, the embodiments of the disclosure are applicable to other communication systems with minor modifications not departing from the scope of the disclosure on the basis of the judgment of those skilled in the art.

In the disclosure, the terms "physical channel" and "signal" in the related art may be used interchangeably with "data" or "control signal". For example, although the PDSCH is a physical channel through which data is transmitted, the PDSCH may be referred to as data in the disclosure.

In the disclosure, higher signaling is a method for transmitting a signal from the base station to the UE by using a downlink data channel of the physical layer or from the UE to the base station by using an uplink data channel of the physical layer, and may be referred to as RRC signaling or MAC control element (MAC CE).

Figure 5:
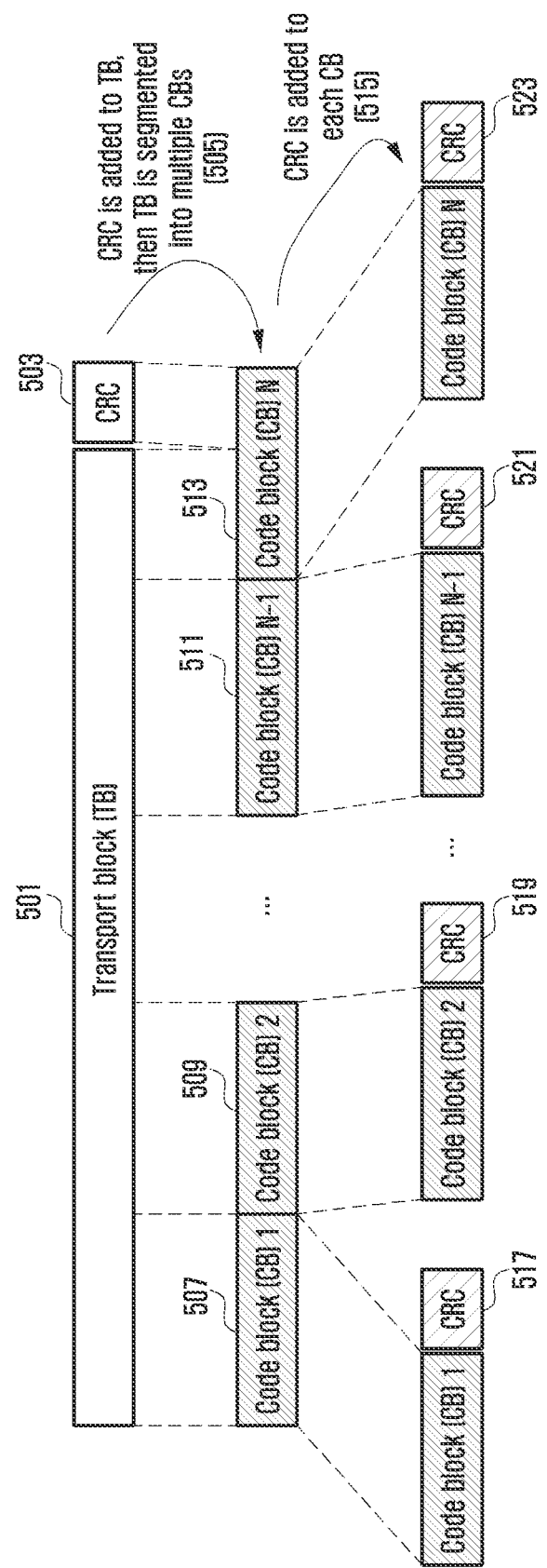
FIG. 5 is a diagram showing an example of a process in which one transport block is divided into several code blocks and a cyclic redundancy check (CRC) is inserted.

FIG. 5 is a diagram showing an example of a process in which one transport block is divided into several code blocks and a CRC is inserted.

With reference to FIG. 5, a CRC 503 may be added to the last or front part of a transport block (TB) 501 to be transmitted in the uplink or downlink. The CRC 503 may have 16 bits, 25 bits, a number of bits fixed in advance, or a variable number of bits according to channel conditions, and may be used to determine whether channel coding is successful. The block obtained by adding the CRC 503 to the TB 501 may be segmented into several code blocks (CBs) 507, 509, 511 and 513 (505). Here, the maximum size of a code block may be determined in advance, in which case the last code block 513 may have a smaller size than the other code blocks 507, 509 and 511. However, this is only an illustration, and according to another example, 0, a random value, or 1 may be inserted into the last code block 513 so that the last code block 513 and the other code blocks 507, 509 and 511 have the same length.

In addition, CRCs 517, 519, 521 and 523 may be added respectively to the code blocks 507, 509, 511 and 513 (515). The CRC may have 16 bits, 24 bits, or a number of bits fixed in advance, and may be used to determine whether channel coding is successful.

The TB 501 and a cyclic generator polynomial may be used to generate the CRC 503, and the cyclic generator polynomial may be defined in various ways. For example, assuming that cyclic generator polynomial $g_{CRC24A}(D) = D^{24}+D^{23}+D^{18}+D^{17}+D^{14}+D^{11}+D^{10}+D^7+D^6+D^5+D^4+D^3+D^1+1$ for 24-bit CRC and L=24, for TB data $a_0, a_1, a_2, a_3, \ldots, a_{A-1}$, the CRC $p_0, p_1, p_2, p_3, \ldots, p_{L-1}$ may be determined by dividing $a_0 D^{A-L-1}+a_1 D^{A-L-2}+ \ldots +a_{A-1}D^L + p_0 D^{L-1}+p_1 D^{L-2}+ \ldots +p_{L-2}D^1+p_{L-1}$ by $g_{CRC24A}(D)$ so that the remainder becomes 0. In the above example, the CRC length L may be determined to have various lengths such as 12, 16, 24, 32, 40, 48, 64, or the like.

After the CRC is added to the TB through this process, TB+CRC may be segmented into N CBs 507, 509, 511 and 513. CRCs 517, 519, 521 and 523 may be added respectively to the segmented CBs 507, 509, 511 and 513 (515). The CRC added to the CB may have a different length from the CRC added to the TB, or a different cyclic generator polynomial may be used for CRC generation. Further, the CRC 503 added to the TB and the CRCs. 517, 519, 521 and 523 added to the code blocks may be omitted depending on the type of channel code to be applied to the code block. For example, when an LDPC code, not a turbo code, is applied to the code block, the CRCs 517, 519, 521 and 523 to be added to individual code blocks may be omitted.

However, even when LDPC is applied, the CRCs 517, 519, 521 and 523 may be added to the corresponding code blocks. Also, even when a polar code is used, the CRC may be added or omitted.

As described in FIG. 5, the maximum length of a code block is determined according to the type of channel coding applied to the TB to be transmitted, and the TB and the CRC added thereto may be segmented into code blocks according to the maximum length of the code block.

In the related art LTE system, a CRC for the CB is added to a segmented CB, and the data bits of the CB and the CRC are encoded with a channel code to thereby determine the coded bits, and the number of rate-matched bits is determined for the coded bits as agreed in advance.

TBS Determination Method

The TB size (TBS) in an NR system can be calculated through the following steps.

Step 1: calculate $N_{RE}'$, which is the number of REs allocated to PDSCH mapping in one PRB in the allocated resources.

$N_{RE}'$ may be calculated according to $N_{RE}'=N_{sc}^{RB} \cdot N_{symb}^{sh}-N_{DMRS}^{PRB}-N_{oh}^{PRB}$. Here, $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by overhead in one PRB and set by higher signaling, and may be set to one of 0, 6, 12 and 18. Then, $N_{RE}$ being the total number of REs allocated to the PDSCH may be calculated. $N_{RE}$ is calculated by $N_{RE}=\min(156, N_{RE}') \cdot n_{PRB}$, where $n_{PRB}$ represents the number of PRBs allocated to the UE.

Step 2: the number of temporary information bits $N_{info}$ may be calculated according to $N_{RE} \cdot R \cdot Q_m \cdot \mu$. Here, R is a code rate, is a modulation order, and information on this value may be transmitted by using the MCS bit-field of the DCI and a pre-agreed table. And, v is the number of allocated layers. If $N_{info} \leq 3824$, TBS can be calculated through step 3 below. Otherwise, TBS can be calculated through step 4.

Step 3: $N_{info}'$ may be calculated by the equation $$N_{info}' = \max\left(24, 2^n \cdot \left\lfloor \frac{N_{info}}{2^n} \right\rfloor\right)$$

and $n = \max(3, \lfloor \log_2 N_{info} \rfloor - 6)$. TBS may be determined as a value closest to $N_{info}'$ among values not smaller than $N_{info}'$ in Table 14 below.

TABLE 14

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |

TABLE 14-continued

| Index | TBS |
|---|---|
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}'$ may be calculated by the equation $$N_{info}' = \max\left(3840, 2^n \times \text{round}\left(\frac{N_{info} - 24}{2^n}\right)\right)$$

and $n = \lfloor \log_2(N_{info} - 24) \rfloor - 5$. TBS can be determined through $N_{info}'$ value and pseudo-code 1 below. In the following, C corresponds to the number of code blocks included in one TB.

[Start of pseudo-code 1]
  if R ≤ 1/4

$$TBS = 8 \cdot C \cdot \left\lceil \frac{N_{info}' + 24}{8 \cdot C} \right\rceil - 24, \text{ where } C = \left\lceil \frac{N_{info}' + 24}{3816} \right\rceil$$

else
    if $N_{info}' > 8424$ $$TBS = 8 \cdot C \cdot \left\lceil \frac{N_{info}' + 24}{8 \cdot C} \right\rceil - 24, \text{ where } C = \left\lceil \frac{N_{info}' + 24}{8424} \right\rceil$$

else $$TBS = 8 \cdot \left\lceil \frac{N_{info}' + 24}{8 \cdot C} \right\rceil - 24$$

end if
  end if
[End of pseudo-code 1]

LBRM Method

When one CB is input to an LDPC encoder in an NR system, parity bits may be added and output. Here, the amount of parity bits may vary according to an LDPC base graph. For a specific input, a method of sending all parity bits generated by LDPC coding may be called full buffer rate matching (FBRM), and a method of limiting the number of transmittable parity bits may be called limited buffer rate matching (LBRM). When a resource is allocated for data transmission, the LDPC encoder output is made in the form of a circular buffer and the created bits of the buffer are repeatedly transmitted as much as the allocated resource, where the length of the circular buffer may be called $N_{cb}$.

If the number of all parity bits generated by LDPC coding is N, $N_{cb} = N$ in the FBRM method. In the LBRM method, $N_{cb}$ is $N_{cb} = \min(N, N_{ref})_{N_{cb}} = \min(N, N_{ref})$, where $N_{ref}$ is given by $$N_{ref} = \left\lfloor \frac{TBS_{LBRM}}{C \cdot R_{LBRM}} \right\rfloor,$$

and $R_{LBRM}$ can be determined to be 2/3. To obtain $TBS_{LBRM}$, the above-described method of obtaining TBS may be used, where the maximum number of layers and the maximum modulation order supported by the UE in the corresponding cell are assumed, the maximum modulation order $Q_m$ is assumed to be 8 when it is configured to use an MCS table that supports 256QAM for at least one BWP in the cell, and $Q_m$ is assumed to be 6 (64QAM) otherwise, the code rate is assumed to be the maximum code rate of 948/1024, $N_{RE}$ is assumed to be $N_{RE} = 156 \cdot n_{PRB}$, and $n_{PRB}$ is assumed to be $n_{PRB,LBRM}$ for calculation. $n_{PRB,LBRM}$ can be given in Table 15 below.

TABLE 15

| Maximum number of PRBs across all configured DL BWPs and UL BWPs of a carrier for DL-SCH and UL-SCH, respectively | $n_{PRB,LBRM}$ |
|---|---|
| Less than 33 | 32 |
| 33 to 66 | 66 |
| 67 to 107 | 107 |

108 to 135    135
136 to 162    162
163 to 217    217
Larger than 217    273

Maximum Data Rate

The maximum data rate supported by the UE in an NR system may be determined according to Equation 2 below.

Equation 2 data rate (in Mbps) =

$$10^{-6} \sum_{j=1}^{J} \left( v_{Layers}^{(j)} \cdot Q_m^{(j)} \cdot f^{(j)} \cdot R_{max} \frac{N_{PRB}^{BW(j),\mu} \cdot 12}{T_s^{\mu}} \cdot (1 - OH^{(j)}) \right)$$

In Equation 2, J may be the number of carriers aggregated by carrier aggregation, $R_{max}=948/1024$, $v_{Layers}^{(j)}$ may be the maximum number of layers, $Q_m^{(j)}$ may be the maximum modulation order, $f^{(j)}$ may be a scaling exponent, and $\mu$ may mean the subcarrier spacing. One of 1, 0.8, 0.75 and 0.4 may be reported by the UE as the value of $f^{(j)}$, and $\mu$ may be given as in Table 16 below.

TABLE 16

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $T_s^\mu$ is the average OFDM symbol length and can be calculated as $$\frac{10^{-3}}{14 \cdot 2^\mu},$$

and $N_{PRB}^{BW(j),\mu}$ is the maximum number of RBs in BW(j). Overhead value OH(j) may be given as 0.14 in the downlink of FR1 (band below 6 GHz) and as 0.18 in the uplink, and may be given as 0.08 in the downlink of FR2 (band above 6 GHz) and as 0.10 in the uplink. Through Equation 2, the maximum data rate in the downlink in a cell having a frequency bandwidth of 100 MHz at a subcarrier spacing of 30 kHz can be calculated as shown in Table 17 below.

TABLE 17

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, the actual data rate that can be measured by the UE in actual data transmission may be a value obtained by dividing the amount of data by the data transmission time. This may be a value obtained by dividing TBS by the TTI a length for 1 TB transmission or a value obtained by dividing the sum of TBSs by the TTI length for 2 TB transmission. For example, as in assumptions for Table 17, the maximum actual data rate in the downlink in a cell having a 100 MHz frequency bandwidth at a 30 kHz subcarrier spacing may be determined as shown in Table 18 below according to the number of allocated PDSCH symbols.

TABLE 18

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

It is possible to identify the maximum data rate supported by a UE through Table 17, and to identify the actual data rate according to the allocated TBS through Table 18. Here, depending on the scheduling information, there may be a case where the actual data rate is greater than the maximum data rate.

In a wireless communication system, particularly, a new radio (NR) system, the data rate that a UE can support may be mutually agreed upon between the base station and the UE. This may be calculated by using the maximum frequency band, the maximum modulation order, and the maximum number of layers supported by the UE. However, the calculated data rate may be different from the value calculated based on the transport block size (TBS) of a transport block (TB) and the transmission time interval (TTI) length used for actual data transmission.

As a result, the UE may be allocated a TBS larger than the value corresponding to the data rate supported by the UE. To prevent this, there may be restrictions on the TBS that can be scheduled according to the data rate supported by the UE.

Figure 6:
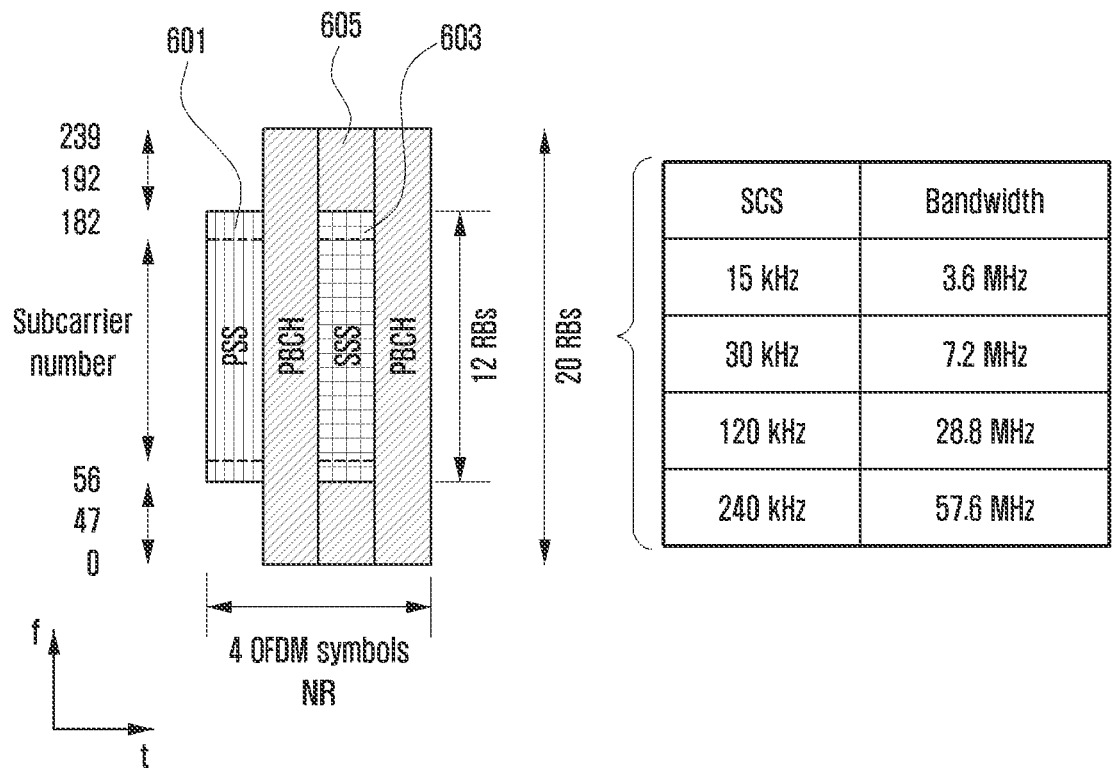
FIG. 6 is a diagram showing how a synchronization signal (SS) and a physical broadcast channel (PBCH) are mapped in the frequency-time domain in an NR system.

FIG. 6 is a diagram showing how a synchronization signal (SS) and a physical broadcast channel (PBCH) are mapped in the frequency-time domain in an NR system.

A primary synchronization signal (PSS) 601, a secondary synchronization signal (SSS) 603, and a PBCH are mapped over 4 OFDM symbols, where the PSS and the SSS are mapped to 12 RBs, and the PBCH is mapped to 20 RBs. Changes in the frequency band of 20 RBs according to the subcarrier spacing (SCS) are shown in the table of FIG. 6. The resource region in which the PSS, SSS and PBCH are transmitted may be referred to as SS/PBCH block. Also, the SS/PBCH block may be referred to as SSB block.

Figure 7:
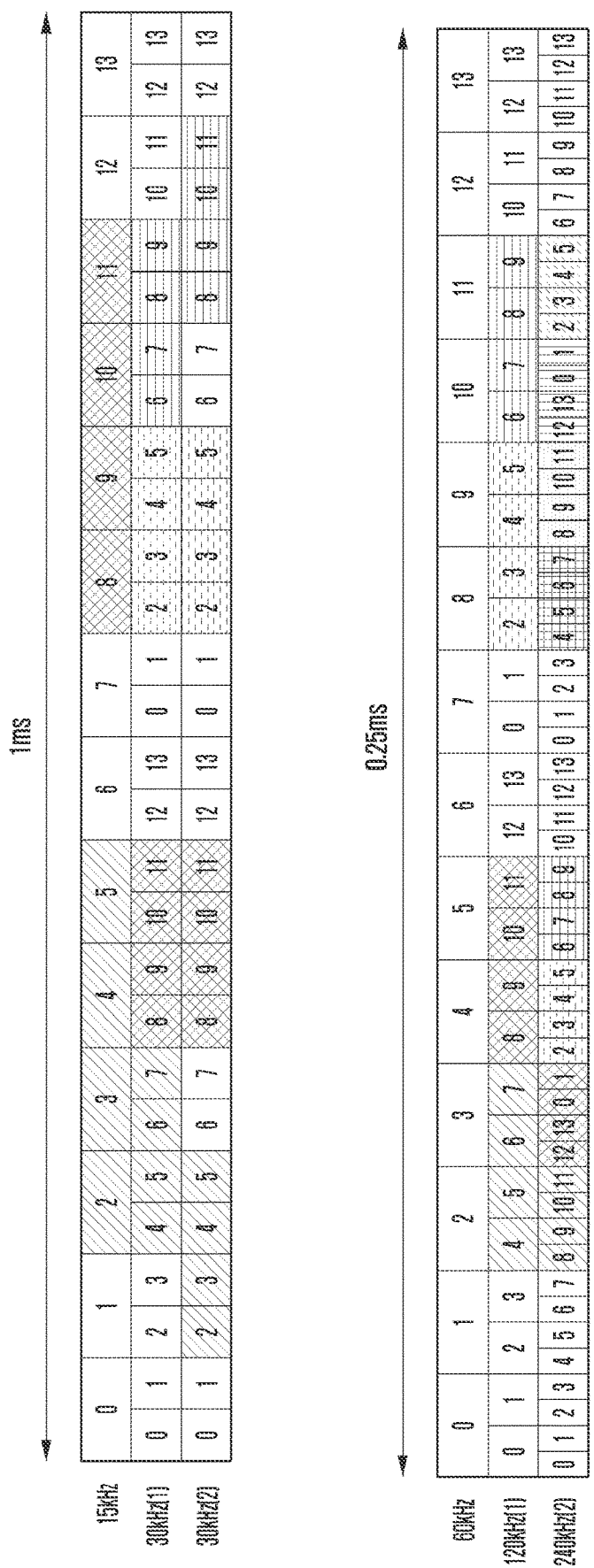
FIG. 7 is a diagram illustrating symbols capable of carrying an SS/PBCH block (SSB) according to the subcarrier spacing.

FIG. 7 is a diagram illustrating symbols capable of carrying an SS/PBCH block (SSB) according to the subcarrier spacing.

With reference to FIG. 7, the subcarrier spacing may be set to 15 kHz, 30 kHz, 120 kHz or 240 kHz, and the positions of symbols at which the SS/PBCH block (or, SSB block) may be located may be determined according to the subcarrier spacing. FIG. 7 shows the positions of symbols in which the SSB can be transmitted according to the subcarrier spacing among symbols within 1 ms, and it is not always necessary to transmit the SSB in regions shown in FIG. 7. The position at which the SSB block is transmitted may be configured in the UE through system information or dedicated signaling.

Since the UE is generally far from the base station, the signal transmitted by the UE is received by the base station after a propagation delay time. The propagation delay time is the value obtained by dividing the path through which radio waves travels from the UE to the base station by the speed of light, and it may generally be a value obtained by dividing the distance from the UE to the base station by the speed of light. In an embodiment, for a UE located 100 km away from the base station, the signal transmitted by the UE is received by the base station after about 0.34 msec. Conversely, the signal transmitted by the base station is also received by the UE after about 0.34 msec. As described above, the time when a signal transmitted by the UE arrives at the base station may vary depending on the distance between the UE and the base station. Hence, when multiple UEs at different locations transmit signals at the same time, the times when the signals arrive at the base station may all be different. To solve this problem by allowing signals transmitted from multiple UEs to arrive at the base station at the same time, the times for individual UEs to transmit uplink signals may be set differently according to their locations. This is called timing advance in 5G, NR and LTE systems.

Figure 8:
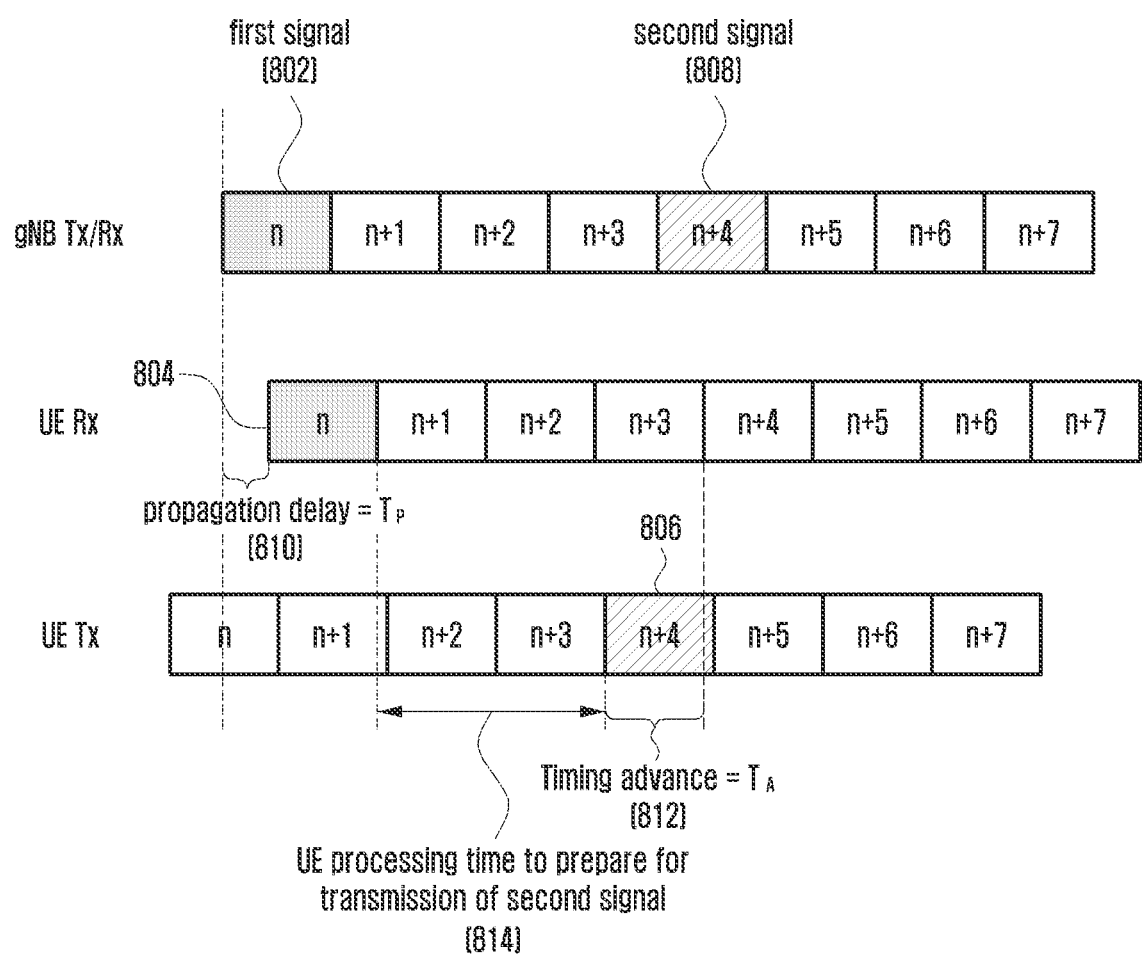
FIG. 8 is a diagram illustrating a UE processing time according to a timing advance (TA) when the UE receives a first signal and transmits a second signal correspondingly in a 5G or NR system according to an embodiment of the disclosure.

FIG. 8 is a diagram illustrating a UE processing time according to a timing advance (TA) when the UE receives a first signal and transmits a second signal correspondingly in a 5G or NR system according to an embodiment of the disclosure.

Next, a detailed description is given of the processing time of the UE according to the timing advance. When the base station transmits an uplink scheduling grant (UL grant) or a downlink control signal and data (DL grant and DL data) to the UE in slot n (802), the UE may receive the uplink scheduling grant or downlink control signal and data in slot n (804). Here, the UE may receive the signal later by the transmission delay time Tp (810) than the time the base station transmits the signal. In this embodiment, when the UE receives a first signal in slot n (804), it transmits a corresponding second signal in slot n+4 (806). When the UE transmits a signal to the base station, in order for the signal to arrive at the base station at a specific time, the UE may transmit uplink data or HARQ ACK/NACK for downlink data at a timing (806) that is advanced by the timing advance TA (812) than slot n+4 being a timing with respect to the signal received by the UE. Hence, in this embodiment, the time for the UE to prepare to transmit uplink data after receiving an uplink scheduling grant or transmit HARQ ACK or NACK after receiving downlink data may be a time corresponding to three slots excluding the TA (814).

For determining the above-described timing, the base station may calculate the absolute value of the TA of a specific UE. The base station may calculate the absolute value of the TA by adding or subtracting the amount of change in the TA value transmitted through higher signaling to or from the TA value that is initially delivered to the UE in the random access stage for initial access of the UE. In the disclosure, the absolute value of the TA may be a value obtained by subtracting the start time of the $n^{th}$ TTI at which the UE receives from the start time of the $n^{th}$ TTI at which the UE transmits.

Meanwhile, one of the important criteria for the performance of a cellular wireless communication system is packet data latency. To this end, in the LTE system, transmission and reception of signals are performed in units of subframes having a transmission time interval (TTI) of 1 ms. The LTE system operating as described above may support a UE having a transmission time interval shorter than 1 ms (short-TTI UE). On the other hand, in 5G or NR systems, the transmission time interval may be shorter than 1 ms. A short-TTI UE is suitable for services such as voice over LTE (VoLTE) and remote control where latency is important. In addition, the short-TTI UE may be a means to realize mission-critical Internet of Things (IoT) on a cellular basis.

In a 5G or NR system, when the base station transmits the PDSCH including downlink data, the DCI scheduling the PDSCH indicates the K1 value, which is a value corresponding to timing information at which the UE transmits HARQ-ACK information for the PDSCH. When the HARQ-ACK information is not indicated as being transmitted earlier than symbol L1 with timing advance included, the UE may transmit it to the base station. That is, the HARQ-ACK information may be transmitted from the UE to the base station at the same timing as or later than symbol L1 with timing advance included. When the HARQ-ACK information is indicated as being transmitted earlier than symbol L1 with timing advance included, the HARQ-ACK information may be not valid HARQ-ACK information in the HARQ-ACK transmission from the UE to the base station.

Symbol L1 may be the first symbol at which the cycle prefix (CP) starts after $T_{proc,1}$ from the last point in time of the PDSCH. $T_{proc,1}$ may be calculated as in Equation 3 below.

$$T_{proc,1}=((N_1+d_{1,1}+d_{1,2})(2048+144)\cdot\kappa 2^{-\mu})\cdot T_C \qquad \text{Equation 3}$$

In Equation 3, $N_1$, $d_{1,1}$, $d_{1,2}$, $\kappa$, $\mu$, and $T_c$ may be defined as follows.

- $d_{1,1}=0$ when HARQ-ACK information is transmitted on the PUCCH (uplink control channel), and $d_{1,1}=1$ when HARQ-ACK information is transmitted on the PUSCH (uplink shared channel, data channel).
- When the UE is configured with a plurality of active component carriers or carriers, a maximum timing difference between the carriers may be reflected in transmission of the second signal.
- For PDSCH mapping type A, i.e., in the case that the first DMRS symbol is positioned at the third or fourth symbol of a slot, when position index i of the last symbol of the PDSCH is smaller than 7, $d_{1,2}$ is defined to be 7−i ($d_{1,2}=7-i$).
- For PDSCH mapping type B, i.e., in the case that the first DMRS symbol is positioned at the first symbol of the PDSCH, $d_{1,2}=3$ when the PDSCH has a length of 4 symbols, or $d_{1,2}=3+d$ when the PDSCH has a length of 2 symbols, where d is the number of overlapping symbols between the PDSCH and the PDCCH including a control signal scheduling the corresponding PDSCH.
- $N_1$ is defined according to p as in Table 19 below. $\mu=0, 1, 2$, and 3 refer to a subcarrier spacing of 15 kHz, 30 kHz, 60 kHz, and 120 kHz, respectively.

TABLE 19

| | PDSCH decoding time $N_1$ [symbols] | |
|---|---|---|
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For the value of $N_1$ presented in Table 19, different values may be used depending on the UE capability. $T_c=1/(\Delta f_{max}\cdot N_f)$, $\Delta f_{max}=480\cdot 10^3$ Hz, $N_f=4096$, $\kappa=T_s/T_c=64$, $T_s=1/(\Delta_{ref}\cdot N_{f,ref})$, $\Delta f_{ref}=15\cdot 10^3$ Hz, $N_{f,ref}=2048$ Other values may be defined as above.

Further, in a 5G or NR system, when the base station transmits control information including an uplink scheduling grant, it may indicate the K2 value corresponding to information on the timing at which the UE transmits uplink data or the PUSCH.

When the PUSCH is not indicated as being transmitted earlier than symbol L2 with timing advance included, the UE may transmit the PUSCH to the base station. That is, the PUSCH may be transmitted from the UE to the base station at the same timing as or later than symbol L2 with timing advance included. When the PUSCH is indicated as being transmitted earlier than symbol L2 with timing advance included, the UE may ignore the uplink scheduling grant control information from the base station.

Symbol L2 may be the first symbol at which CP of PUSCH symbols to be transmitted starts after $T_{proc,2}$ from the last point in time of the PDCCH including the scheduling grant. $T_{proc,2}$ may be calculated as iii Equation 4 below.

$$T_{proc,2}=((N_2+d_{2,1})(2048+144)\cdot\kappa 2^{-\mu})\cdot T_C \qquad \text{Equation 4}$$

In Equation 4 above, $N_2$, $d_{2,1}$, $\kappa$, $\mu$, and $T_C$ may be defined as follows.

- $d_{2,1}=0$ when the first symbol among the symbols allocated to PUSCH includes only DMRS, and $d_{2,1}=1$ otherwise.
- When the UE is configured with a plurality of active component carriers or carriers, a maximum timing difference between the carriers may be reflected in transmission of the second signal.
- $N_2$ is defined according to as in Table 20. $\mu=0, 1, 2$, and 3 refer to a subcarrier spacing of 15 kHz, 30 kHz, 60 kHz, and 120 kHz, respectively.

TABLE 20

| $\mu$ | PUSCH preparation time $N_2$ [symbols] |
|---|---|
| 0 | 10 |
| 1 | 12 |
| 2 | 23 |
| 3 | 36 |

For the value of $N_2$ presented above in Table 18, different values may be used depending on the UE capability. $T_c=1/(\Delta f_{max}\cdot N_f)$, $\Delta f_{max}=480\cdot 10^3$ Hz, $N_f=4096$, $\kappa=T_s/T_c=64$, $T_s=1/(\Delta f_{ref}\cdot N_{f,ref})$, $\Delta f_{ref}=15\cdot 10^3$ Hz, $N_{f,ref}=2048$ Other values may be defined as above.

Bandwidth Part (BWP)

Meanwhile, in a 5G or NR system, a frequency bandwidth part (BWP) may be configured in one carrier, and a particular UE may be designated to perform transmission and reception within the configured BWP. This may aim at reducing power consumption of the UE. The base station may configure a plurality of BWPs, and switch an active BWP through control information. The time usable by the UE to switch the BWP may be defined as in Table 21 below.

TABLE 21

| Frequency Range | Scenario | type 1 delay (μs) | type 2 delay (μs) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 21, frequency range 1 refers to a range of frequencies lower than or equal to 6 GHz, and frequency range 2 refers to a range of frequencies higher than or equal to 6 GHz. In the embodiment, type 1 and type 2 may be determined based on UE capabilities. In the embodiment, scenarios 1, 2, 3 and 4 are given as in Table 22 below.

TABLE 22

| | Center frequency changes | Center frequency is fixed |
|---|---|---|
| Frequency bandwidth changes | Scenario 3 | Scenario 2 |
| Frequency bandwidth is fixed | Scenario 1 | Scenario 4 when subcarrier spacing changes |

Figure 9:
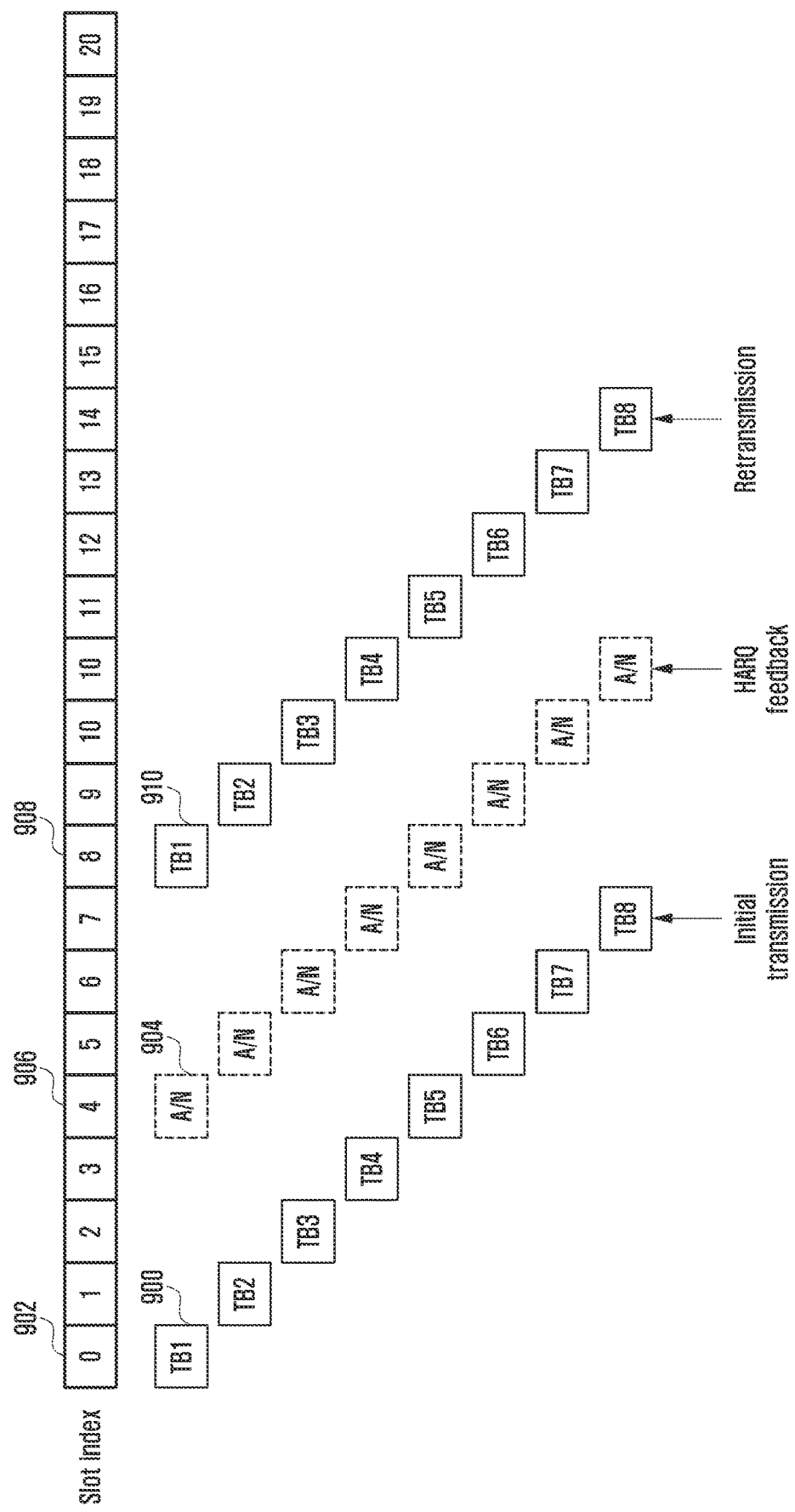
FIG. 9 is a diagram showing an example of scheduling and transmitting data (e.g., transport blocks (TBs)) on the basis of slots, receiving HARQ-ACK (hybrid automatic repeat request acknowledgement) feedback for the corresponding data, and performing retransmissions based on the feedback.

FIG. 9 is a diagram showing an example of scheduling and transmitting data (e.g., TBs) on the basis of slots, receiving HARQ-ACK feedback for the corresponding data, and performing retransmissions based on the feedback. In FIG. 9, TB1 (900) is initially transmitted in slot 0 (902), and ACK/NACK feedback (904) for this is transmitted in slot 4 (906). If the initial transmission of TB1 fails and a NACK is received, retransmission for TB1 (910) may be performed in slot 8 (908). Here, the time point at which ACK/NACK feedback is transmitted and the time point at which retransmission is performed may be determined in advance or may be determined according to a value indicated by control information and/or higher layer signaling.

FIG. 9 shows an example in which TB1 to TB8 are scheduled and transmitted in sequence according to slots from slot 0. For example, this may indicate that HARQ process IDs 0 to 7 are assigned respectively to TB1 to TB8 for transmission. If the number of HARQ process IDs that can be used by the base station and the UE is only 4, it may be not possible to successively transmit eight different TBs.

Satellite Network System

Figure 10:
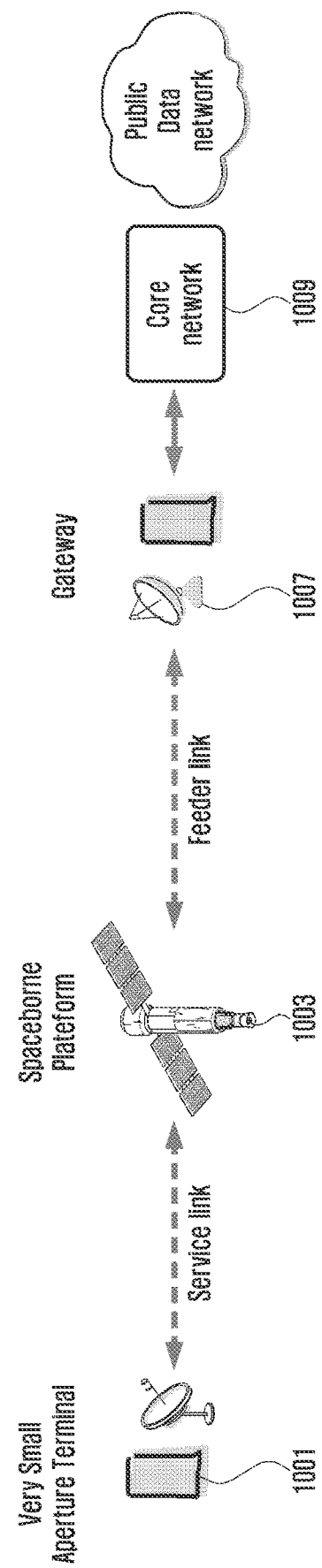
FIG. 10 is a diagram showing an example of a communication system using satellites.

FIG. 10 is a diagram showing an example of a communication system using satellites. For example, when the UE 1001 transmits a signal to a satellite 1003, the satellite 1003 forwards the signal to a base station 1005, and the base station 1005 processes the received signal and transmits a signal including a request for subsequent operation to the UE 1001, where it can be transmitted again via the satellite 1003. Here, since the distance between the UE 1001 and the satellite 1003 is long and the distance between the satellite 1003 and the base station 1005 is also long, the time required for data transmission and reception between the UE 1001 and the base station 1005 becomes longer correspondingly.

Figure 11:
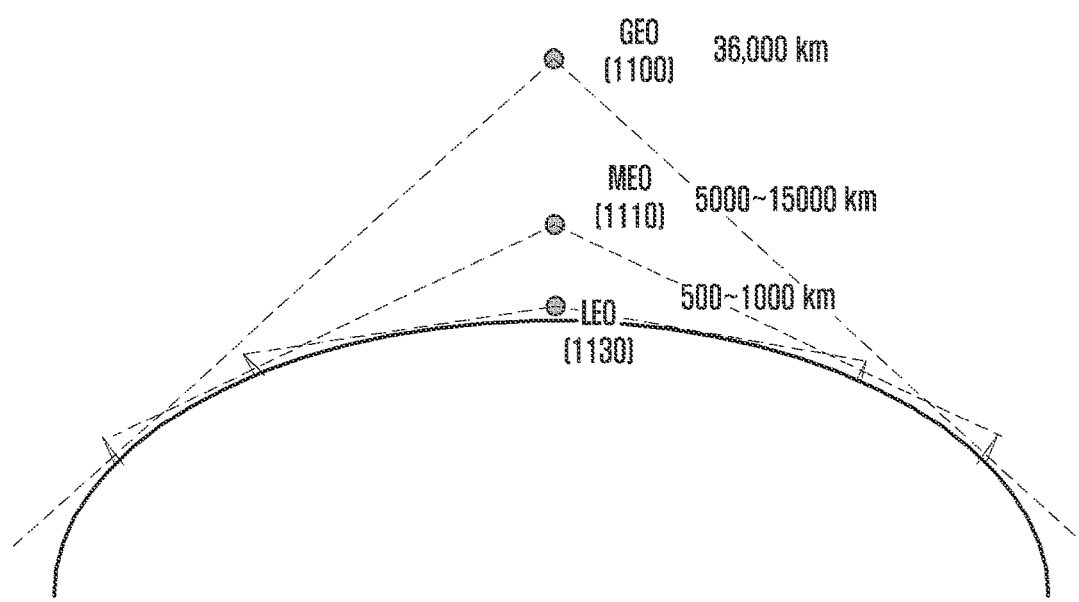
FIG. 11 is a diagram illustrating orbital periods of communication satellites revolving around the Earth according to their altitudes or heights.

FIG. 11 is a diagram illustrating orbital periods of communication satellites revolving around the Earth according to their altitudes or heights. Communications satellites can be classified into low Earth orbit (LEO), medium Earth orbit (MEO), and geostationary Earth orbit (GEO) satellites according to their orbits of the satellites. In general, GEO 1100 means a satellite at an altitude of about 36000 km, MEO 1110 means a satellite at an altitude of 5000 to 15000 km, and LEO means a satellite at an altitude of 500 to 1000 km. The orbital period about the Earth varies according to the altitude; GEO 1100 has an orbital period of about 24 hours with respect to the Earth, MEO 1110 has an orbital period of about 6 hours, and LEO 1130 has an orbital period of about 90 to 120 minutes. A low-orbit (~2,000 km) satellite has an advantage over a geostationary-orbit (36,000 km) satellite in propagation delay time (can be understood as the time it takes for a signal transmitted from the transmitter to reach the receiver) and loss due to its relatively low altitude. A non-GEO satellite may be referred to as a non-geostationary orbit (NGSO) satellite.

Figure 12:
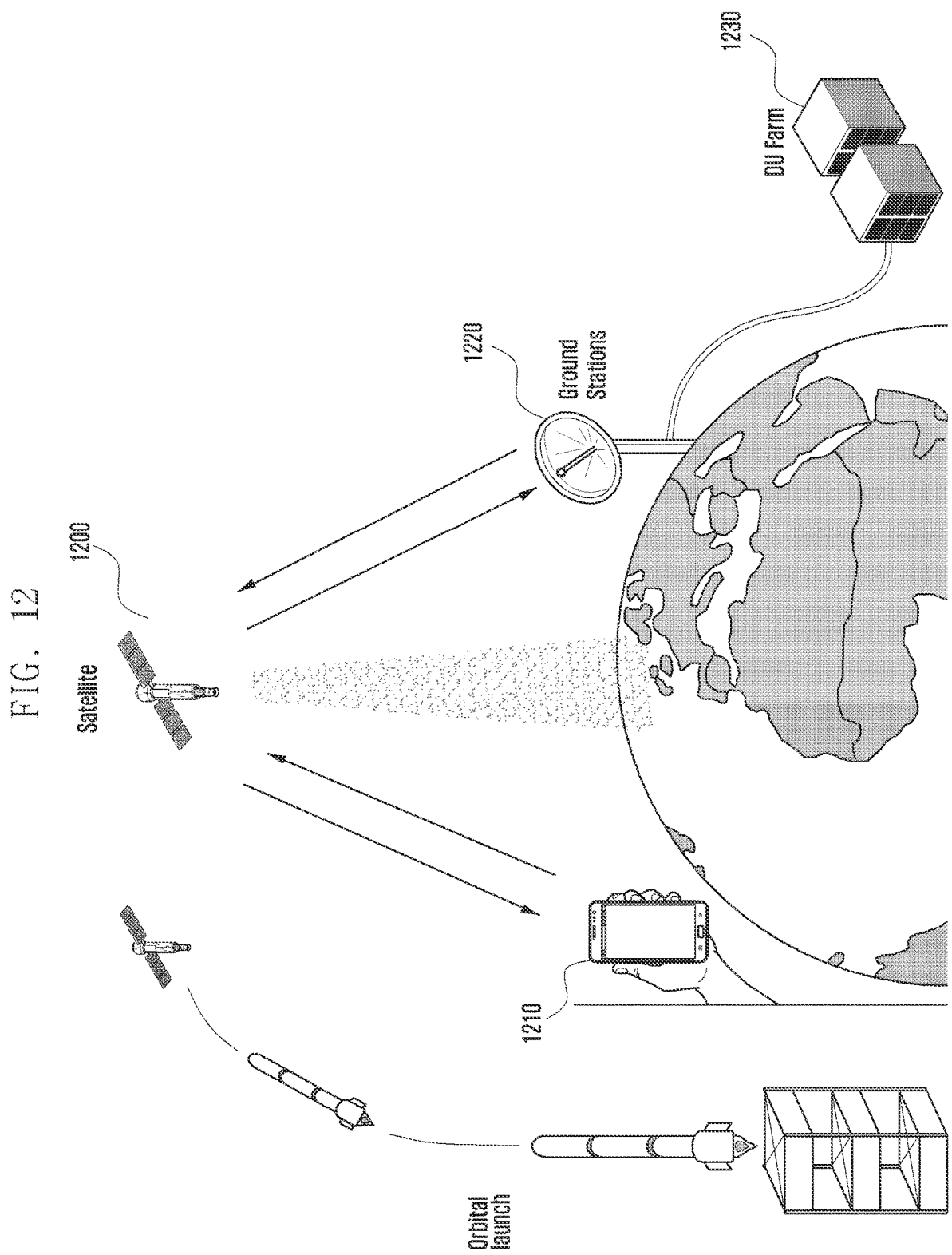
FIG. 12 is a conceptual diagram illustrating satellite-UE direct communication.

FIG. 12 is a conceptual diagram illustrating satellite-UE direct communication. A satellite 1200, which is located at an altitude of 100 km or higher by a rocket, transmits and receives signals to and from a UE 1210 on the ground, and also transmits and receives signals to and from a ground station 1220 connected to a base station (DU farms) 1230 on the ground.

Figure 13:
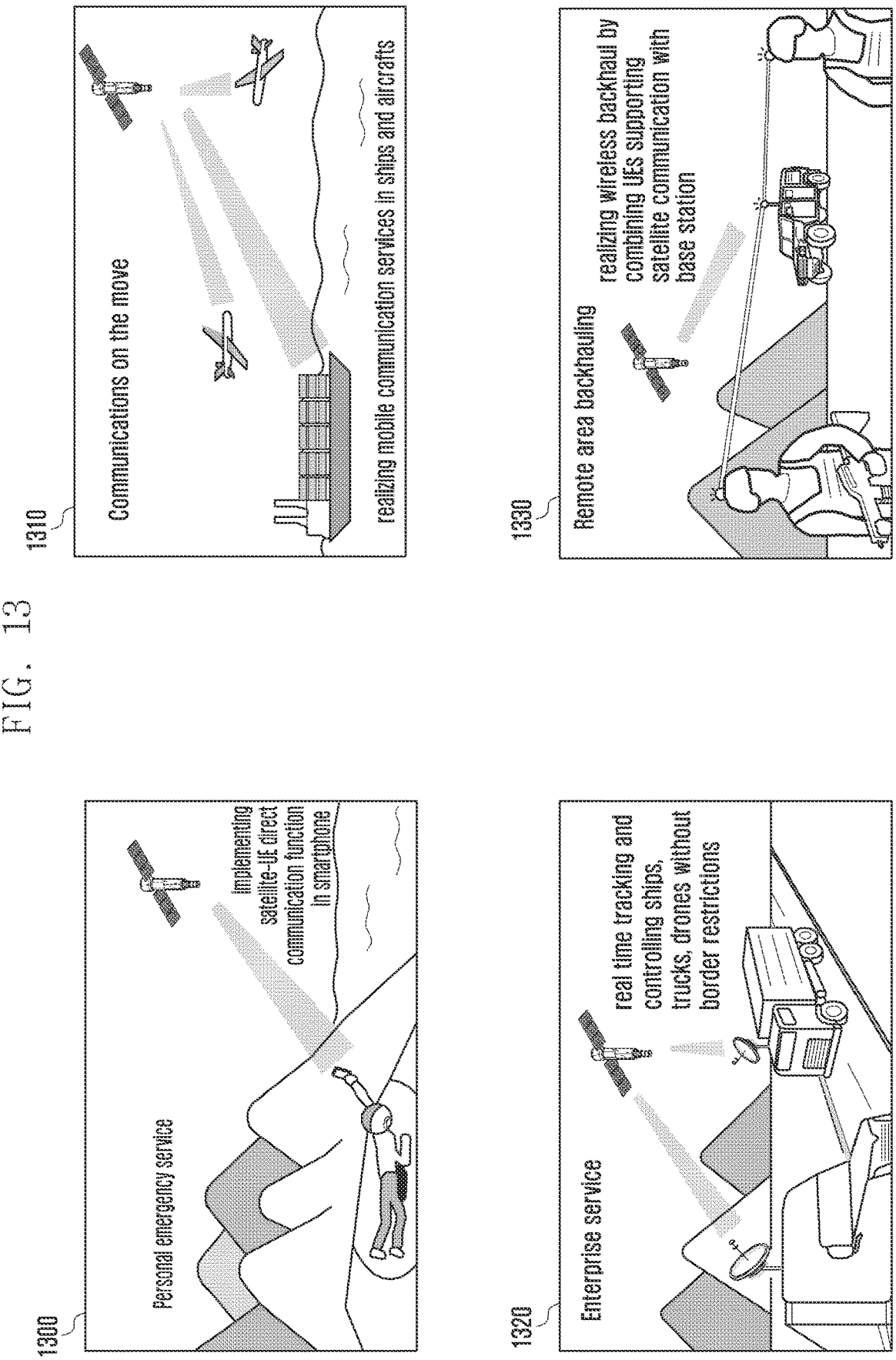
FIG. 13 is a diagram illustrating usage scenarios of satellite-UE direct communication.

FIG. 13 is a diagram illustrating usage scenarios of satellite-UE direct communication. Satellite-UE direct communication can support communication services for specialized purposes in a form of supplementing the coverage limit of a terrestrial network. For example, by implementing a satellite-UE direct communication function in a user UE, it is possible to send and receive emergency rescue or/and disaster signals of a user in a place that is not covered by terrestrial network communication (1300); a mobile communication service can be provided to users in areas where terrestrial network communication is not available such as ships or/and aircrafts (1310); it is possible to track and control the location of ships, trucks or/and drones in real time without border restrictions (1320); and by supporting a satellite communication function to the base station, satellite communication may function as a backhaul of the base station, so that it is possible to utilize satellite communication to perform the backhaul function when physically far away (1330).

Figure 14:
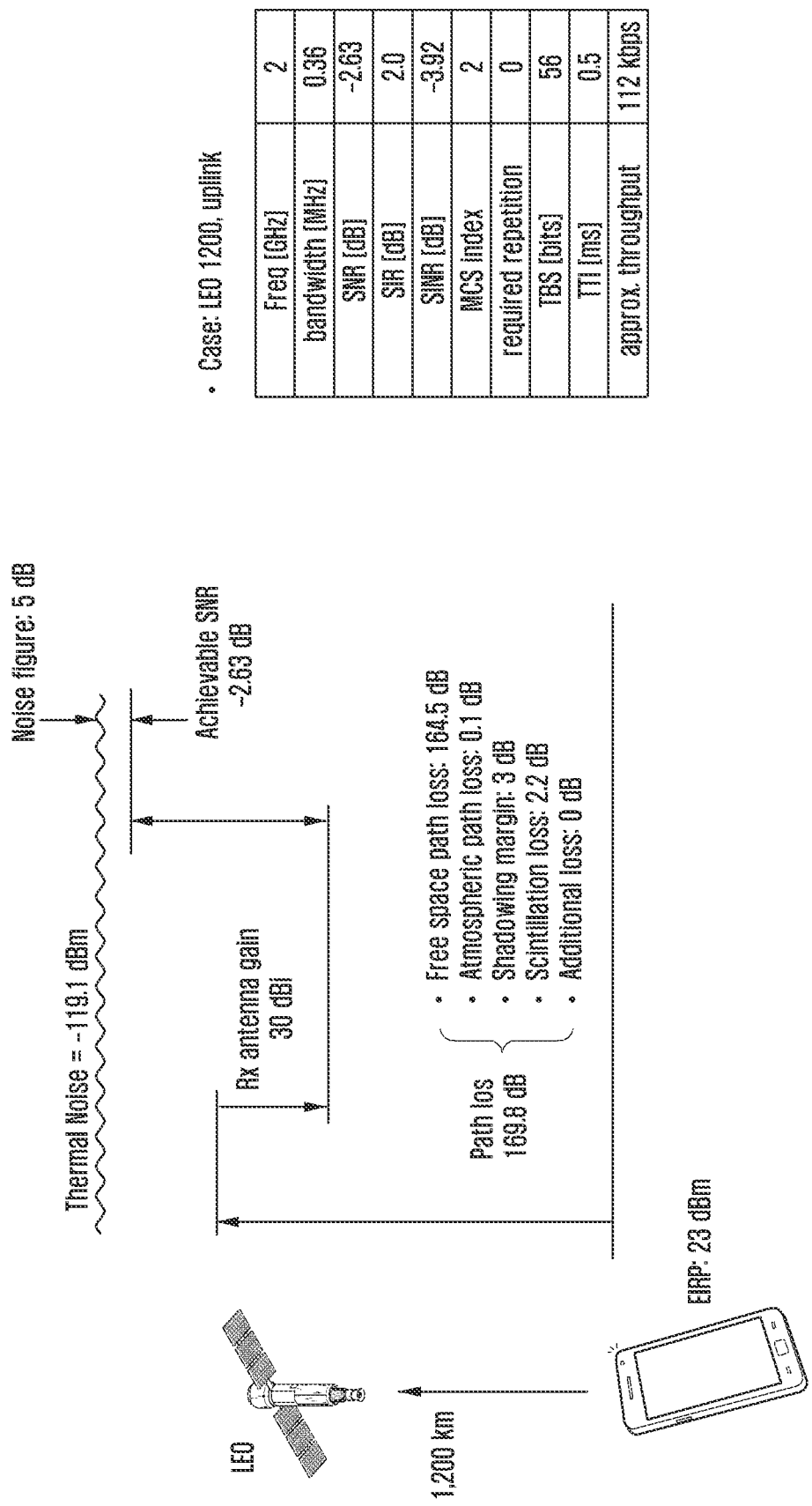
FIG. 14 is a diagram showing an example of calculating expected data throughput in the uplink when a LEO satellite at an altitude of 1200 km and a UE on the ground perform direct communication.

FIG. 14 is a diagram showing an example of calculating expected data throughput in the uplink when a LEO satellite at an altitude of 1200 km and a UE on the ground perform direct communication. In the uplink of the UE on the ground, when the transmit power EIRP (effective isotropic radiated power) is 23 dBm, the path loss of the radio channel to the satellite is 169.8 dB, and the satellite receiving antenna gain is 30 dBi, the achievable signal-to-noise ratio (SNR) is estimated at −2.63 dB. In this case, the path loss may include free-space path loss and loss in the atmosphere. Assuming that the signal-to-interference ratio (SIR) is 2 dB, the signal-to-interference and noise ratio (SINR) is calculated as −3.92 dB, in which case if a 30 kHz subcarrier spacing and a frequency resource of 1 PRB are used, a transmission rate of 112 kbps may be achieved.

Figure 15:
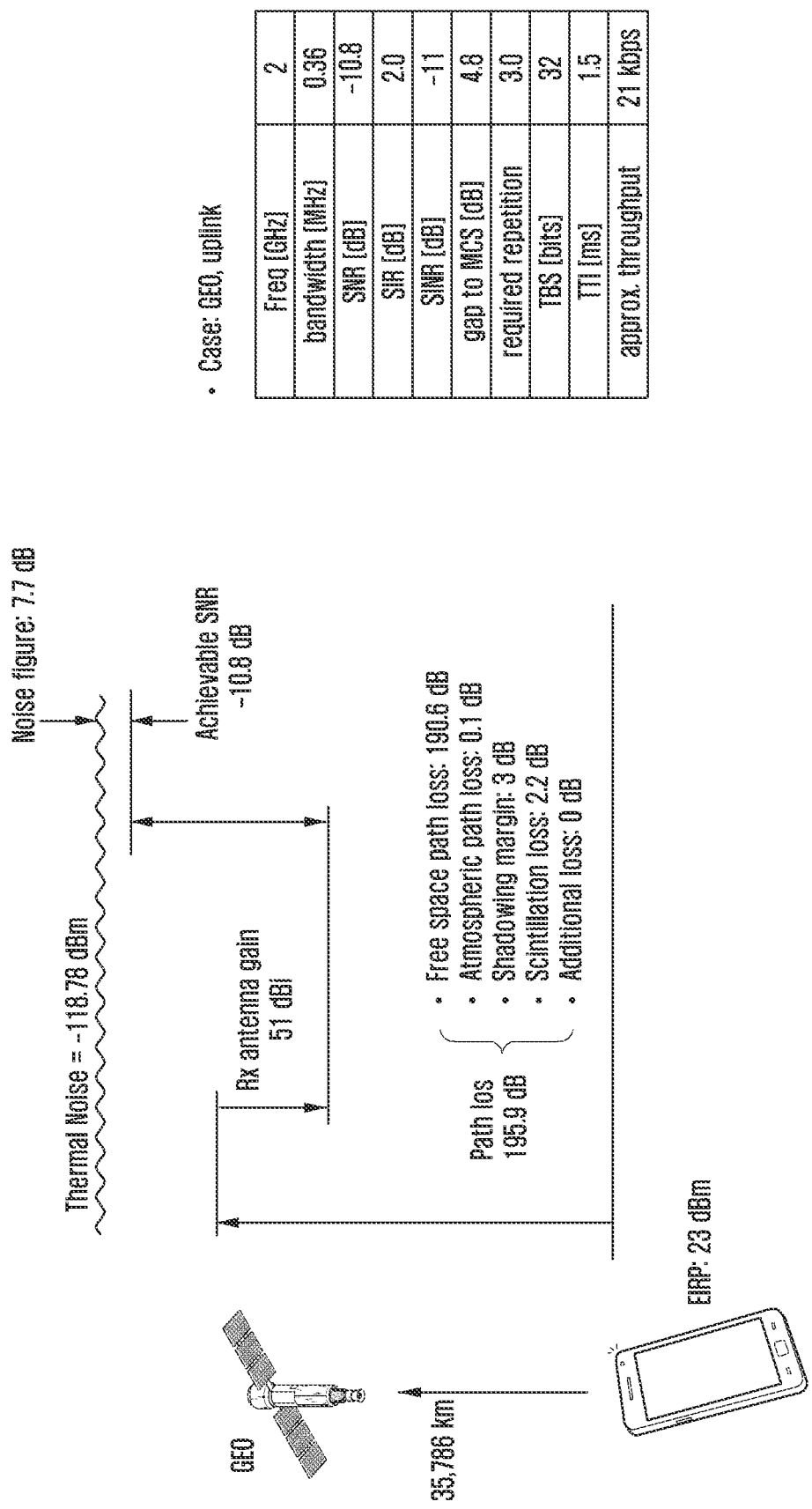
FIG. 15 is a diagram showing an example of calculating an expected data throughput in the uplink when a GEO satellite at an altitude of 35,786 km and a UE on the ground perform direct communication.

FIG. 15 is a diagram showing an example of calculating an expected data throughput in the uplink when a GEO satellite at an altitude of 35,786 km and a UE on the ground perform direct communication. In the uplink of the UE on the ground, when the transmit power EIRP is 23 dBm, the path loss of the radio channel to the satellite is 195.9 dB, and the satellite receiving antenna gain is 51 dBi, the achievable SNR is estimated at −10.8 dB. In this case, the path loss may include free-space path loss and loss in the atmosphere. Assuming that the SIR is 2 dB, the SINR is calculated as −11 dB, in which case if a 30 kHz subcarrier spacing and a frequency resource of 1 PRB are used, a transmission rate of 21 kbps may be achieved, which may be the result of performing repeated transmission three times.

Figure 16:
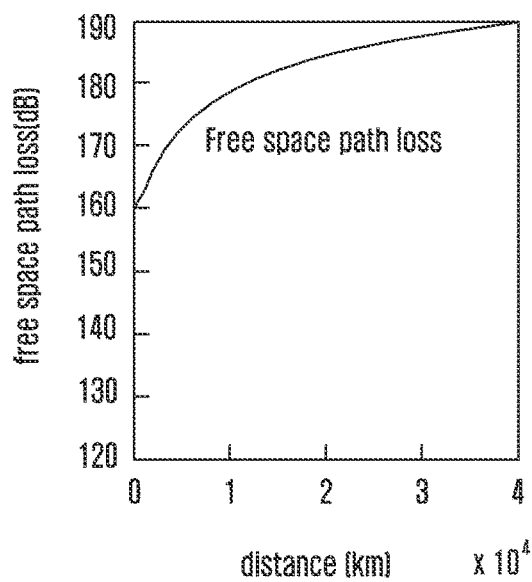
FIG. 16 is a diagram illustrating path loss values according to a path loss model between a UE and a satellite and a path loss model between a UE and a terrestrial base station.
Figure 16:
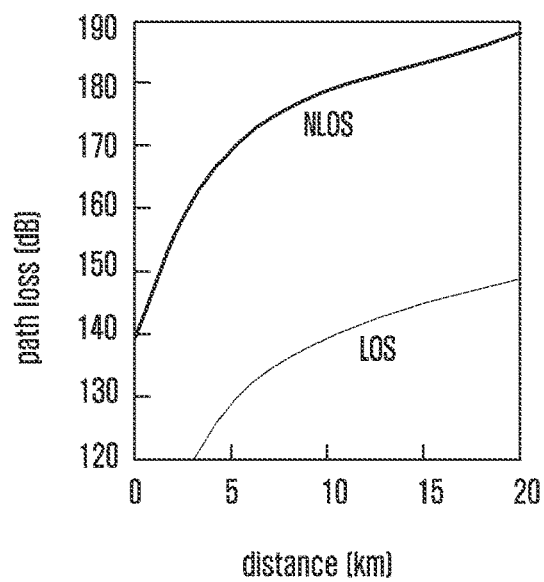

FIG. 16 is a diagram illustrating path loss values according to a path loss model between a UE and a satellite and a path loss model between a UE and a terrestrial base station. In FIG. 16, d indicates to the distance and $f_c$ indicates the frequency of a signal. Whereas, in free space where communication between the UE and the satellite is performed, the path loss (FSPL, 1600) is inversely proportional to the square of the distance, the path loss ($PL_2$ (1610), $PL'_{Uma\text{-}NLOS}$ (1620)) on the ground, where there is air and communication between the UE and the terrestrial gNB is performed, is almost inversely proportional to the fourth power of the distance. $d_{3D}$ indicates the line-of-sight distance between the UE and the base station, $h_{BS}$ indicates the height of the base station, and $h_{UT}$ indicates the height of the UE. It is given by $d'_{BP}=4 \times h_{BS} \times h_{UT} \times f_c/c$. $f_c$ is the center frequency in Hz, and c is the speed of light in m/s.

Frequency Offset in Satellite Communication

In satellite communications (or non-terrestrial networks), a Doppler shift, that is, a frequency shift (offset) of a transmitted signal, occurs as the satellite continuously moves rapidly.

Figure 17:
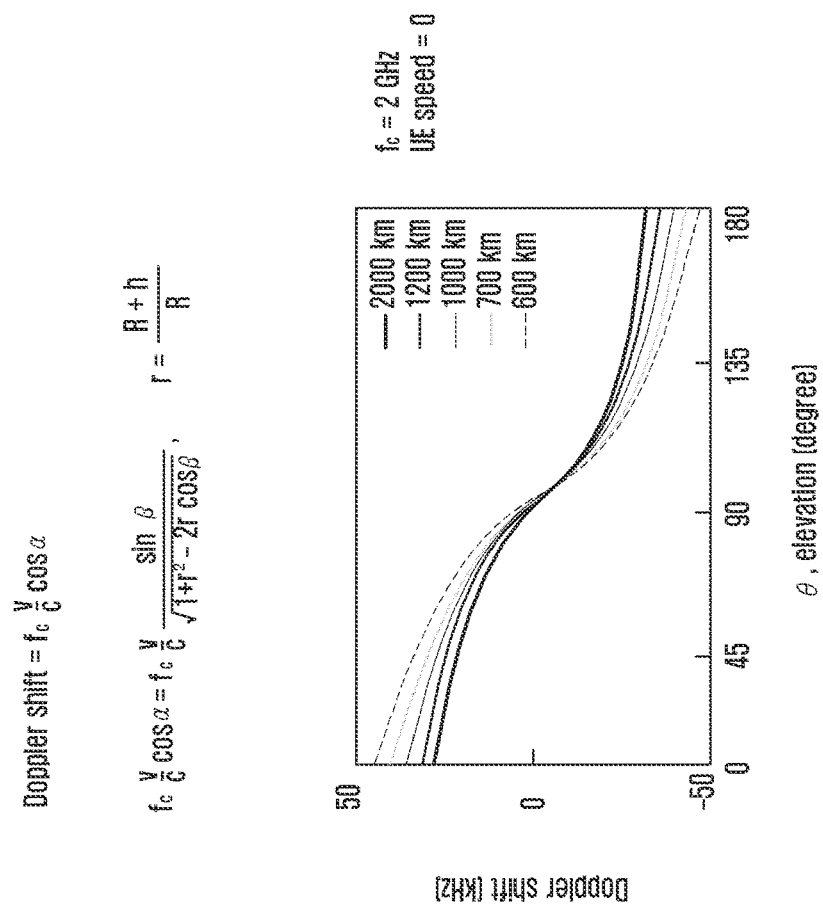
FIG. 17 is a diagram showing equations for calculating the amount of Doppler shift experienced by a signal transmitted from a satellite and received by a ground user according to the altitude and position of the satellite and the position of the UE user on the ground, and the calculated results.
Figure 17:
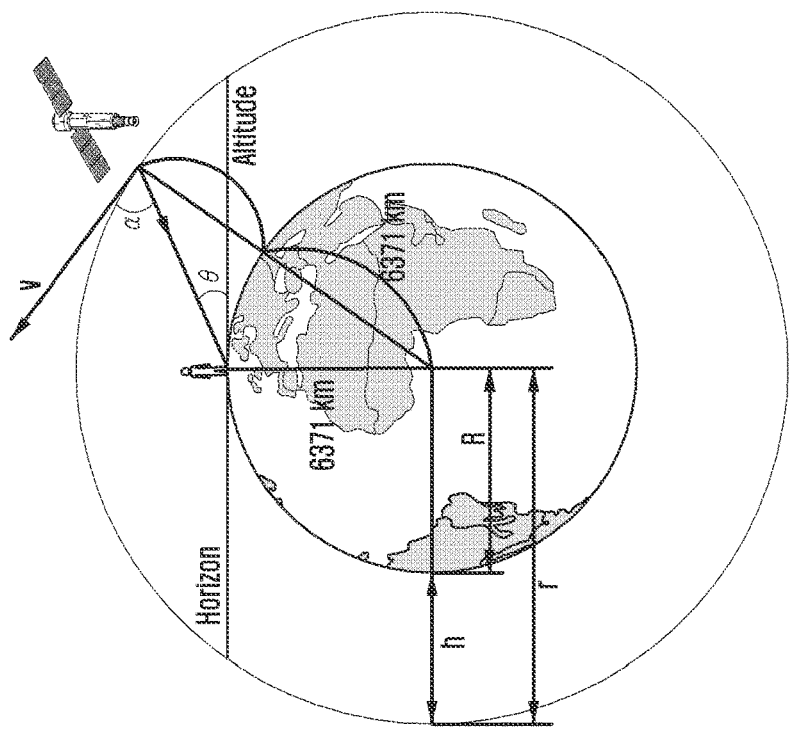

FIG. 17 is a diagram showing equations for calculating the amount of Doppler shift experienced by a signal transmitted from a satellite and received by a ground user according to the altitude and position of the satellite and the position of the UE user on the ground, and the calculated results. R is the Earth's radius, h is the altitude of the satellite, v is the velocity at which the satellite orbits the Earth, and fc is the frequency of the signal. The velocity of the satellite can be calculated from its altitude, and is the velocity at which the gravitational force being the force that pulls the satellite by the earth and the centripetal force generated as the satellite orbits are equal, where it can be calculated as shown in FIG. 18.

Figure 18:
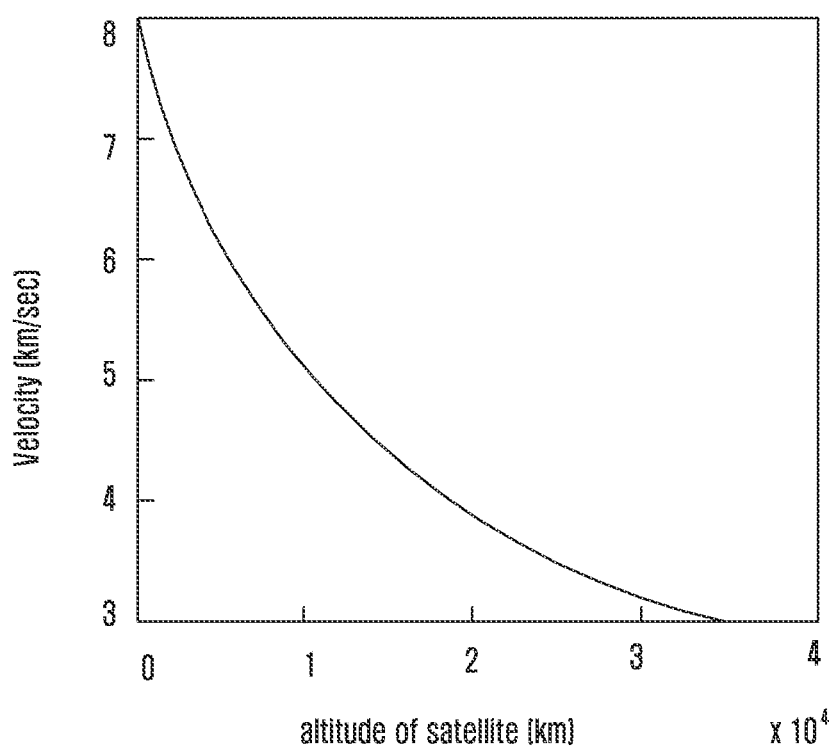
FIG. 18 illustrates the velocity of a satellite calculated with the varying altitude thereof.

FIG. 18 is a diagram showing the velocity of a satellite calculated from the altitude thereof. As can be seen in FIG. 17, since the angle α is determined by the elevation angle θ, the Doppler shift value is determined according to the elevation angle θ.

Figure 19:
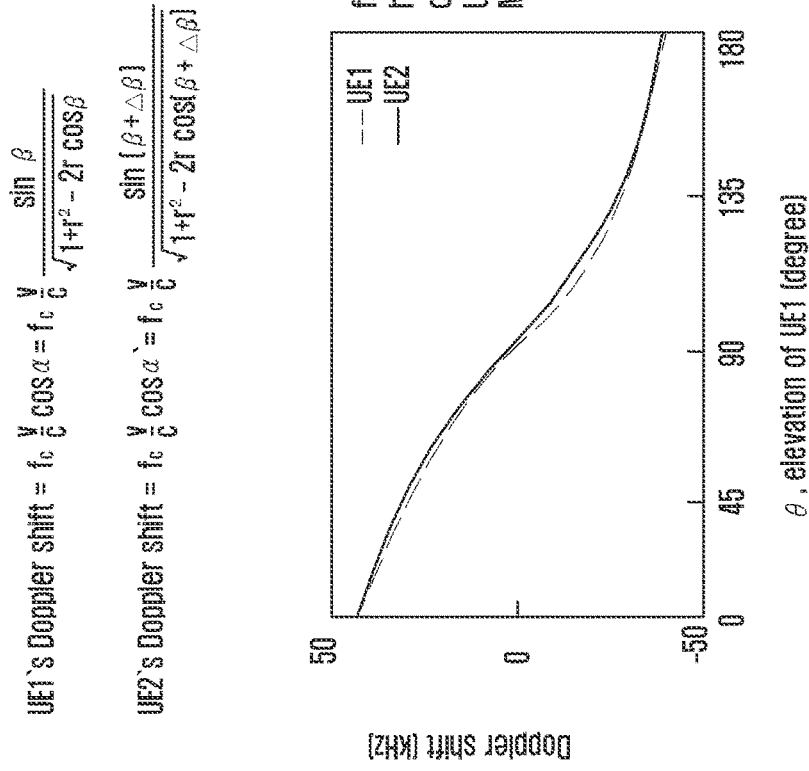
FIG. 19 is a diagram illustrating Doppler shifts experienced by different UEs in one beam transmitted from a satellite to the ground.
Figure 19:
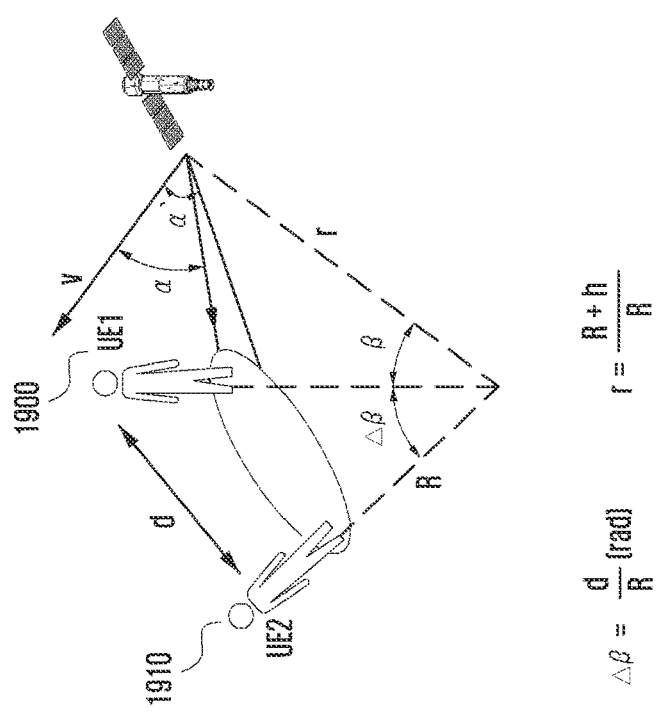

FIG. 19 is a diagram illustrating Doppler shifts experienced by different UEs in one beam transmitted from a satellite to the ground. In FIG. 19, Doppler shifts experienced by UE 1 (1900) and UE 2 (1910) are calculated according to the elevation angle θ. This is the result of assuming a center frequency of 2 GHz, a satellite altitude of 700 km, a beam diameter of 50 km on the ground, and a UE speed of 0. In addition, the Doppler shift calculated in the disclosure ignores the effect of the Earth's rotation speed, and since it is slower than the satellite's speed, the effect can be considered small.

Figure 20:
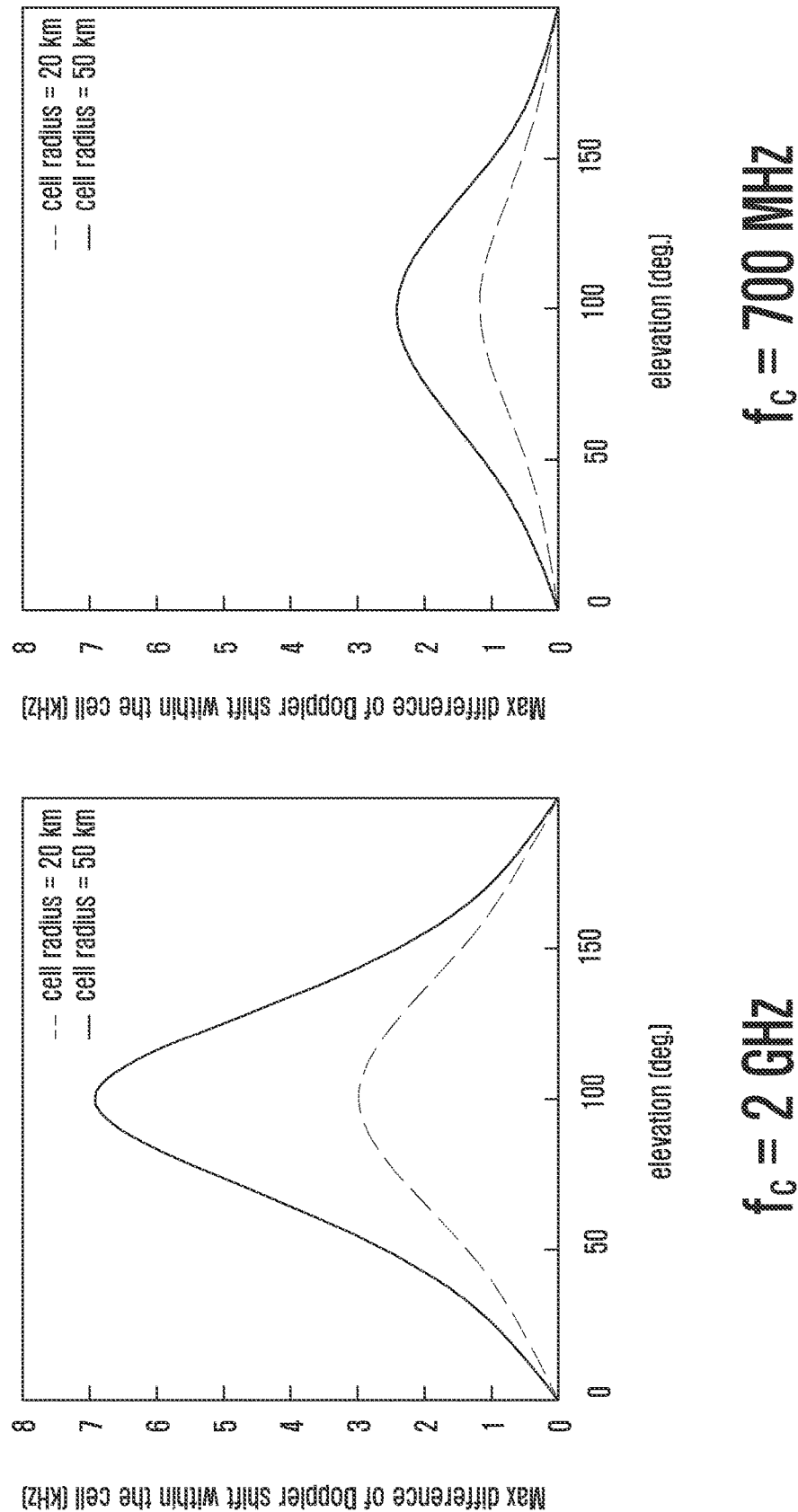
FIG. 20 is a diagram showing differences in Doppler shift occurring in one beam according to the satellite position determined from the elevation angle.

FIG. 20 is a diagram showing differences in Doppler shift occurring in one beam according to the satellite position determined from the elevation angle. It can be seen that the difference in Doppler shift within one beam (or cell) is the largest when the satellite is positioned directly above the beam, that is, when the elevation angle is 90 degrees. This may be because Doppler shift values at one end of the beam and at the other end are positive and negative respectively when the satellite is above the center.

Large Delay Time in Satellite Communication

On the other hand, in satellite communication, a large latency occurs compared to terrestrial network communication because the satellite is far from the user on the ground.

Figure 21:
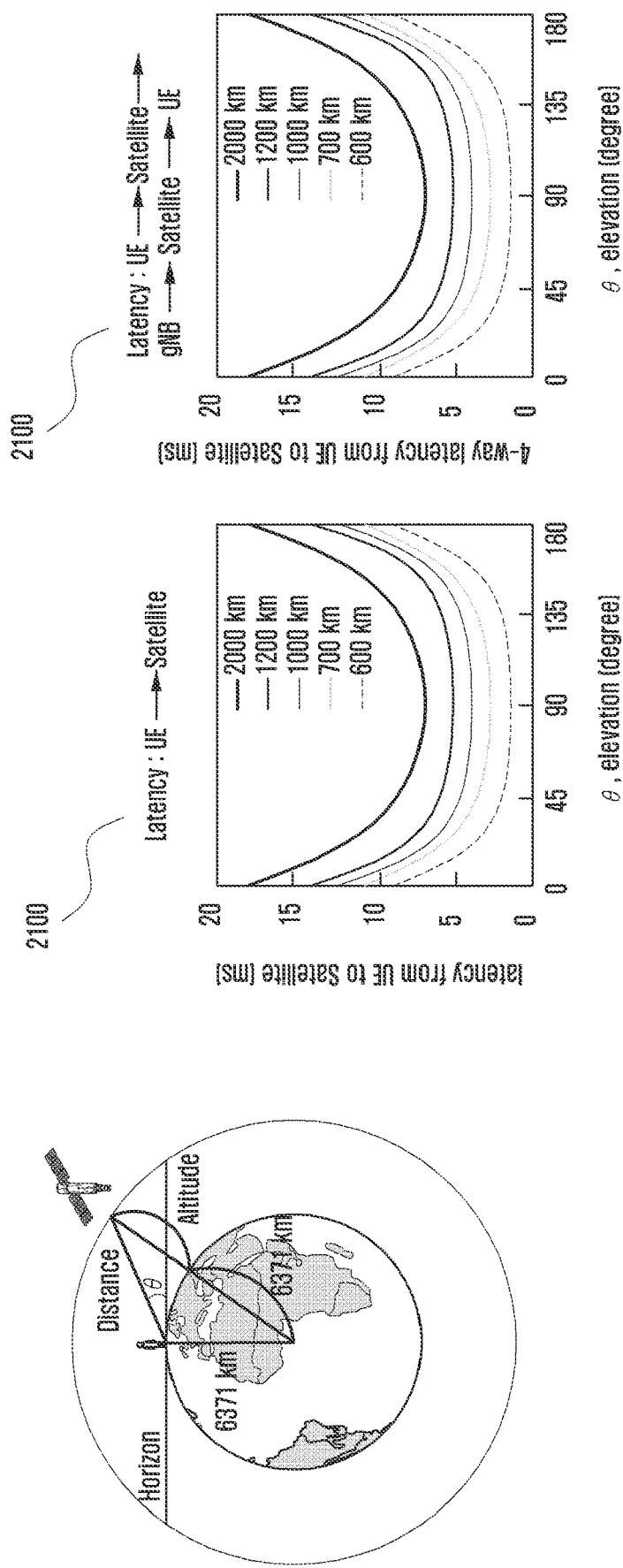
FIG. 21 is a diagram illustrating latency from UE to satellite and round-trip latency between UE, satellite, and base station according to the satellite position determined from the elevation angle.

FIG. 21 is a diagram illustrating latency from UE to satellite and round-trip latency between UE, satellite, and base station according to the satellite position determined from the elevation angle. Indicia 2100 indicates the latency from UE to satellite, and indicia 2110 indicates the round trip latency between UE, satellite, and base station. Here, it is assumed that the latency between satellite and base station is equal to the latency between UE and satellite.

Figure 22:
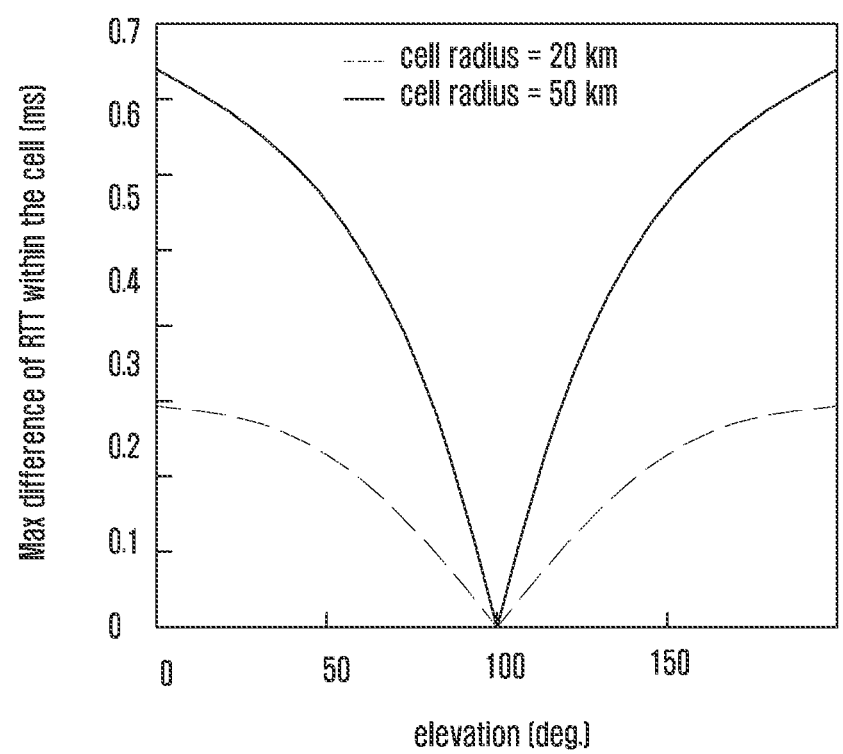
FIG. 22 is a diagram showing the maximum difference in the round-trip time depending on the user's location in one beam.

FIG. 22 is a diagram illustrating the maximum difference in the round-trip time depending on the user's location in one beam. For example, it can be seen that when the beam radius (or, cell radius) is 20 km, the difference in round-trip latency to the satellite, which is experienced differently by UEs at different positions within the beam according to the position of the satellite, is about 0.28 ms or less.

In satellite communications, when a UE transmits and receives a signal to and from a base station, the signal may be transferred through a satellite. That is, in the downlink, the satellite may receive a signal transmitted by the base station and then forward the signal to the UE; and in the uplink, the satellite may receive a signal transmitted by the UE and then forward the signal to the base station. In the above, the satellite may perform frequency shift only after receiving the signal and forward it, or may also perform signal processing such as decoding and re-encoding based on the received signal and forward it.

Initial Access Procedure in LTE and NR Systems

In the case of LTE or NR, the UE can access the base station through the following procedure.

Step 1: the UE receives a synchronization signal (or, synchronization signal block (SSB), which may include a broadcast signal) from the base station. The synchronization signal may include a primary synchronization signal (PSS), a secondary synchronization signal (SSS), and a physical broadcast channel (PBCH). The synchronization signal may include information such as slot boundary of a signal transmitted by the base station, frame number, downlink and uplink configuration. In addition, through the synchronization signal, the UE may obtain scheduling information for subcarrier offset and system information transmission.

Step 2: the UE receives system information (system information block (SIB)) from the base station. The SIB may include information for performing initial access and random access. The information for performing random access may include information about a resource for transmitting a random access preamble.

Step 3: a random access preamble (or, msg1) is transmitted over the random access resource configured at step 2. This preamble may be a signal determined based on the information set at step 2 by using a preset sequence. The base station receives the preamble transmitted by the UE. The base station attempts to receive a preamble set on the resource configured by itself without knowing which UE has transmitted a preamble, and can know that at least one UE has transmitted the preamble if reception is successful.

Step 4: when the preamble is received at step 3, the base station transmits a random access response (RAR, or msg2) as a reply. The UE having transmitted the random access preamble at step 3 may attempt to receive the RAR transmitted by the base station at this step. The RAR is transmitted on the PDSCH, and the PDCCH scheduling the PDSCH is transmitted together or in advance. A CRC scrambled with a RA-RNTI value is added to the DCI for scheduling the RAR, and the DCI (with CRC) is channel-coded and then transmitted by being mapped to the PDCCH. The RA-RNTI may be determined based on time and frequency resources through which the preamble at step 3 is transmitted.

The maximum time limit for the UE having transmitted the random access preamble at step 3 to receive the RAR at this step may be set through the SIB transmitted at step 2. This limit may be set to a maximum of 10 ms or 40 ms, for example. That is, if the UE having transmitted the preamble at step 3 does not receive the RAR within the time determined based on the set maximum time of 10 ms, for example, it may transmit a preamble again. The RAR may include scheduling information for allocating resources for a signal to be transmitted by the UE at the next step (step 5).

Figure 23:
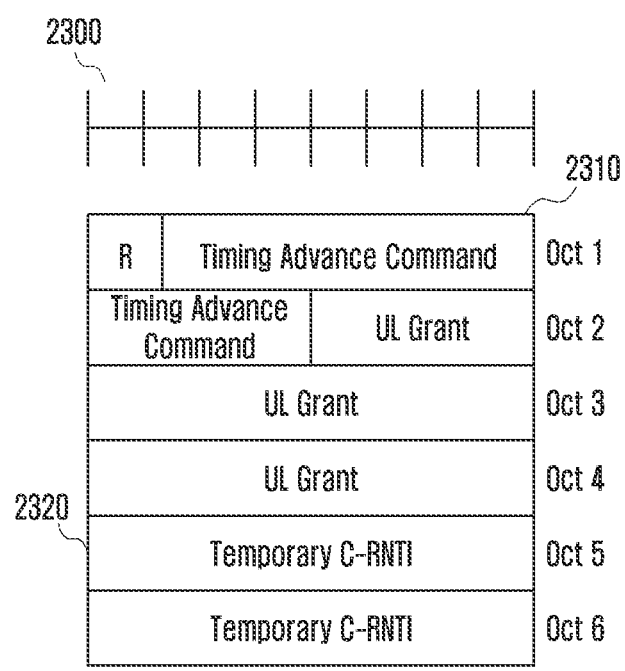
FIG. 23 is a diagram showing an example of the information structure of RAR.

FIG. 23 is a diagram showing an example of the information structure of RAR. The RAR 2300 may be, for example, a MAC PDU, and may also include timing advance (TA) information 2310 to be applied by the UE and a temporary C-RNTI value 2320 to be used from the next step.

Step 5: the UE having received the RAR at step 4 transmits message 3 (msg3) to the base station according to the scheduling information included in the RAR. The terminal may transmit msg3 including its unique ID value. The base station may attempt to receive msg3 according to the scheduling information having been transmitted by it at step 4.

Step 6: the base station receives msg3, checks ID information of the UE, generates message 4 (msg4) including the ID information of the UE, and transmits it to the UE. The UE having transmitted msg3 at step 5 may thereafter attempt to receive msg4 to be transmitted at step 6. Upon receiving msg4, the UE decodes msg4 and compares the ID value included in msg4 with the ID value having been transmitted at step 5 by itself to thereby check whether msg3 transmitted by itself has been received by the base station. There may also be restrictions on the time for the UE having transmitted msg3 at step 5 to receive msg4 at this step, and this maximum time may also be set through the SIB at step 2.

When the initial access procedure based on the above steps is applied to satellite communication, the propagation delay time required in satellite communication may become a problem. For example, the period (random access window) during which the UE can transmit a random access preamble (or PRACH preamble) at step 3 and receive an RAR at step 4, that is, the maximum time it takes to receive can be set through ra-ResponseWindow, and this maximum time can be set up to about 10 ms in existing LTE or 5G NR systems.

Figure 24:
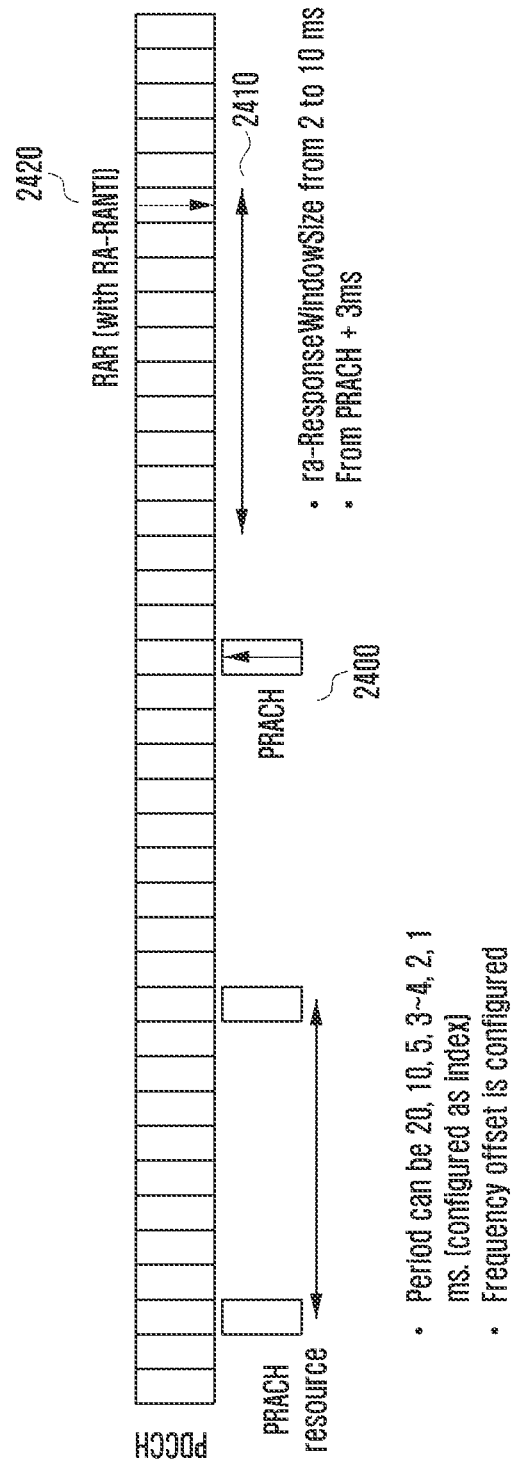
FIG. 24 is a diagram illustrating an example of a relationship between the reception time of a physical random access channel (PRACH) preamble configuration resource and the reception time of a random access response (RAR) in an LTE system.
Figure 25:
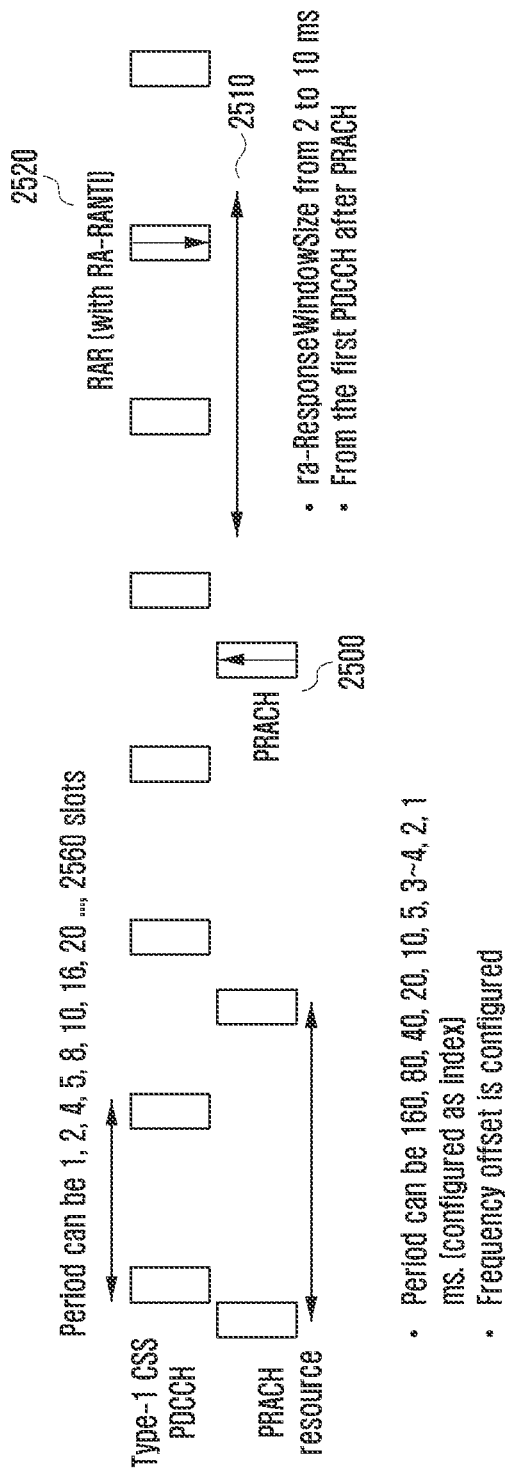
FIG. 25 is a diagram illustrating an example of a relationship between the reception time of a PRACH preamble configuration resource and the reception time of a RAR in a 5G NR system.

FIG. 24 is a diagram illustrating an example of a relationship between the reception time of a PRACH preamble configuration resource and the reception time of an RAR in an LTE system, and FIG. 25 is a diagram illustrating an example of a relationship between the reception time of a PRACH preamble configuration resource and the reception time of an RAR in a 5G NR system. With reference to FIG. 24, in the case of LTE, the random access window 2410 starts 3 ms after the PRACH (random access preamble) is transmitted (2400); when the UE receives an RAR within the random access window (2420), it can determine that PRACH preamble transmission is successful.

With reference to FIG. 25, in the case of NR, the random access window 2510 starts from the control information region for RAR scheduling that appears first after transmitting a PRACH (random access preamble) (2500). When the UE receives an RAR within the random access window (2520), it can determine that PRACH preamble transmission is successful.

For example, the TA for uplink transmission timing in a 5G NR system may be determined as follows. First, it can be determined as $T_c=1/(\Delta f_{max} \cdot N_f)$, where $\Delta f_{max}=480 \cdot 10^3$ Hz and $N_{4096}$. Then, it can be defined as $\kappa = T_s/T_c = 64$, $T_s = 1/(\Delta f_{ref} \cdot N_{f,ref})$, $\Delta f_{ref} = 15 \cdot 10^3$, $N_{f,ref} = 4096$, respectively.

Figure 26:
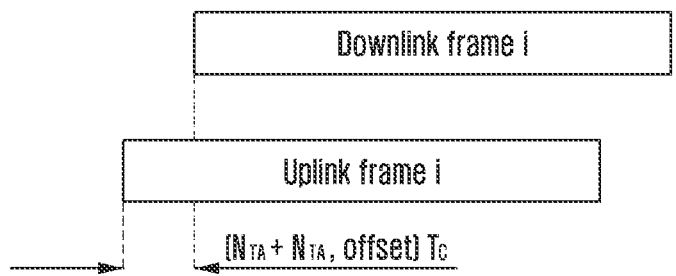
FIG. 26 is a diagram showing an example of downlink frame timing and uplink frame timing in a UE.

FIG. 26 is a diagram showing an example of downlink frame timing and uplink frame timing in a UE. The UE may perform uplink transmission by advancing the uplink frame by $T_{TA}=(N_{TA}+N_{TA,offset}) \cdot T_c$ with respect to the time point of the downlink frame. In the above, the value of $N_{TA}$ may be transmitted through the RAR or determined based on a MAC CE, and $N_{TA,offset}$ may be set in the UE or may be a value determined based on a preset value.

The RAR of a 5G NR system may indicate the value of $T_A$, where $T_A$ may indicate one value among 0, 1, 2, . . . , 3846. In this case, if the subcarrier spacing (SCS) of RAR is $2^\mu \cdot 15$ kHz, $N_{TA}$ is determined by $N_{TA}=T_A \cdot 16 \cdot 64/2^\mu$. After the UE completes the random access process, it may receive an indication of a changed value of TA from the base station, and this may be indicated through a MAC CE or the like. $T_A$ information indicated through a MAC CE may indicate one value among 0, 1, 2, . . . , 63, and this value may be added to or subtracted from the existing TA value to calculate a new TA value, in which case the TA value can be newly calculated as $N_{TA,new}=N_{TA,old}+(T_A-31) \cdot 16 \cdot 64/2^\mu$. The TA value indicated in this way can be applied to uplink transmission by the UE later after a certain time.

Figure 27A:
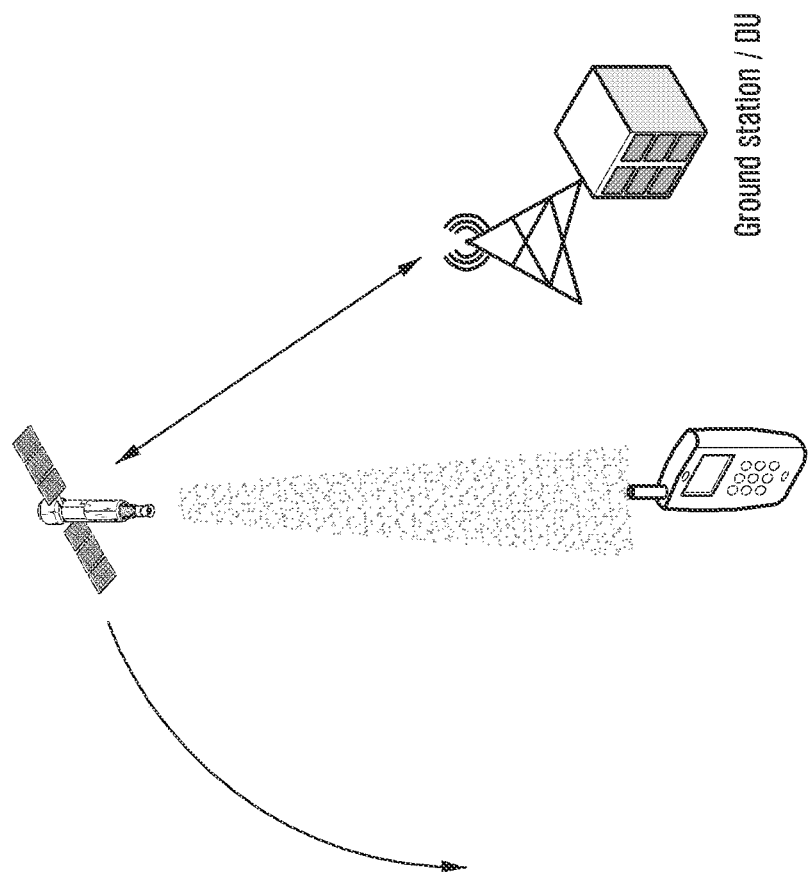
FIG. 27A is a diagram illustrating an example of continuous motion of a satellite for a UE located on the ground of the Earth or on the Earth as the satellite revolves around the Earth along a satellite orbit.

FIG. 27A is a diagram illustrating an example of continuous motion of a satellite for a UE located on the ground of the Earth or on the Earth as the satellite revolves around the Earth along a satellite orbit. Since the distance between the UE and the satellite varies according to the elevation angle at which the UE views the satellite, the propagation delay between UE, satellite, and base station varies.

Figure 27B:
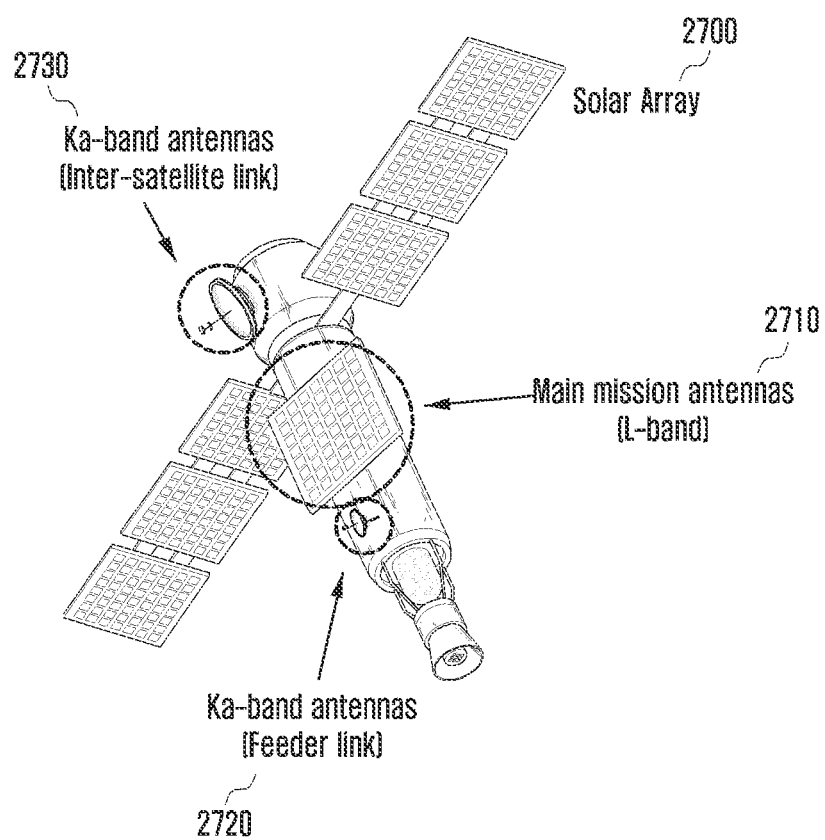
FIG. 27B is a diagram showing an example of the structure of an artificial satellite.

FIG. 27B is a diagram showing an example of the structure of an artificial satellite. The satellite may be composed of solar panels or solar array 2700 for solar photovoltaic or solar power generation, a transceiver antenna (main mission antenna) 2710 for communication with a UE, a transceiver antenna (feeder link antenna) 2720 for communication with a ground station, a transceiver antenna (inter-satellite link) 2730 for inter-satellite communication, and a processor for controlling transmission and reception and performing signal processing. For a satellite not supporting inter-satellite communication, the antenna for inter-satellite signal transmission/reception may be not installed. In FIG. 27B, it is shown that the L band of 1 to 2 GHz is used for communication with a UE, but it may also be possible to use high-frequency bands such as K band (18 to 26.5 GHz), Ka band (26.5 to 40 GHz), and Ku band (12 to 18 GHz).

In various embodiments of the disclosure, the term "base station (BS)" may indicate a specific component (or, a set of components) configured to provide radio access based on the type of a wireless communication system, such as transmit point (TP), transmit-receive point (TRP), enhanced node B (eNodeB or eNB), 5G base station (gNB), macro cell, femtocell, Wi-Fi access point (AP), or other wireless enabled device. Base stations may provide radio access according to one or more radio protocols such as 5G 3GPP new air interface/access (NR), long term evolution (LTE), LTE advanced (LTE-A), high speed packet access (HSPA), or Wi-Fi 802.11a/b/g/n/ac.

Also, in various embodiments of the disclosure, the term "user equipment (UE)" may indicate a specific component, such as terminal, mobile station, subscriber station, remote terminal, wireless terminal, receive point, or user device. For convenience, in various embodiments of the disclosure, the term "UE or terminal" is used to indicate a device accessing a base station, regardless of whether the UE is to be considered a mobile device (such as mobile phone or smartphone) or a stationary device (such as desktop computer or vending machine).

Further, in various embodiments of the disclosure, the term "TA" may be used interchangeably with "TA information", "TA value", or "TA index".

In various embodiments of the disclosure, data or control information transmitted from a base station to a UE may be referred to as a first signal, and an uplink signal associated with the first signal may be referred to as a second signal. For example, the first signal may include DCI, UL grant, PDCCH, PDSCH, RAR, or the like, and the second signal associated with the first signal may include PUCCH, PUSCH, msg 3, or the like.

Also, there may be an association between the first signal and the second signal. For example, when the first signal is a PDCCH including a UL grant for uplink data scheduling, the second signal corresponding to the first signal may be a PUSCH including uplink data. Meanwhile, the gap between transmission and reception times of the first signal and the second signal may be a value predefined between the UE and the base station. Otherwise, the gap between transmission and reception times of the first signal and the second signal may be determined by an indication from the base station or determined by a value transferred through higher signaling.

Meanwhile, a satellite navigation system may also be called GNSS, and the GNSS may include, for example, GPS of the United States, GLONASS of Russia, Galileo of the EU, and Beidou of China. The GNSS may include a regional navigation satellite system (RNSS), The RNSS may include, for example, India's IRNSS, Japan's QZSS, and Korea's KPS. On the other hand, the signal transmitted from the GNSS may include at least one of auxiliary navigation information, satellite's normal operation state, satellite time, satellite ephemeris, satellite altitude, reference time, or information on various correction data.

Synchronization Raster

A synchronization raster (sync raster) refers to candidate values of a center frequency at which a system synchronization signal can be transmitted. These values may be used in the initial access process of a UE. As the UE cannot know at which frequency a synchronization signal will be transmitted during the initial access process, it may have to detect a synchronization signal in all frequency bands. However, when attempting to detect a synchronization signal in all frequency bands, the complexity of the UE may be excessively high. Hence, specific candidate values may be determined in advance between the base station and the UE, and it may be determined to detect a synchronization signal only from the candidate values.

Figure 28:
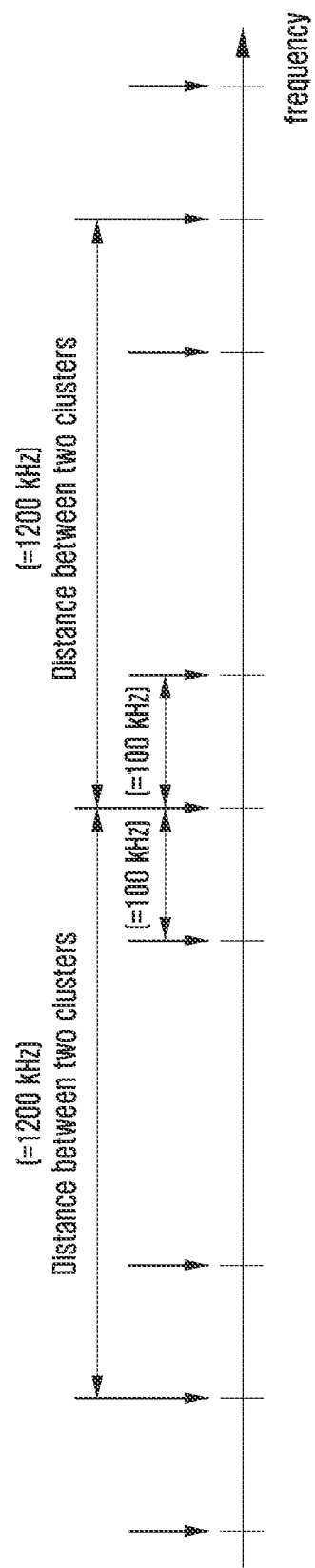
FIG. 28 is a diagram showing a candidate position where the center frequency of a synchronization signal can be located in an NR system.

FIG. 28 is a diagram showing a candidate position where the center frequency of a synchronization signal can be located in an NR system. In the NR system, candidate positions are set at 100 kHz intervals or 1000 kHz intervals, up to three candidate positions constitute one cluster, and the spacing between cluster centers is 1200 kHz. Such a synchronization raster may be defined according to the frequency range.

Table 23 is a table describing a range of frequencies used for the uplink and downlink of band 1 (n1) being a frequency band in which the NR system operates. Table 24 is a table describing SS_REF values, which are a synchronization raster, for the range of frequencies from 0 to 3000 MHz. Table 25 is a table describing information regarding the subcarrier spacing or pattern of the synchronization signal and the center frequency band of the synchronization signal in n1 being band 1. Here, GSCN means a global synchronization channel number, which may be a number corresponding to one value in frequency. Table 26 is a table describing SS_REF values, GSCN values, and differences from the previous synchronization raster for N and M values.

TABLE 23

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex mode |
|---|---|---|---|
| n1 | 1920 MHz-1980 MHz | 2110 MHz-2170 MHz | FDD |

TABLE 24

| Range of frequencies (MHz) | SS block frequency position $SS_{REF}$ | GSCN | Range of GSCN |
|---|---|---|---|
| 0-3000 | N * 1200 kHz + M * 50 kHz, N = 1:2499, M {1, 3, 5} (Note) | 3N + (M − 3)/2 | 2-7498 |

TABLE 25

| NR operating band | SS Block SCS | SS Block pattern (note) | Range of GSCN (First-<Step size>-Last) |
|---|---|---|---|
| n1 | 15 kHz | Case A | 5279-<1>-5419 |

TABLE 26

| N | M | SS_REF (kHz) | GSCN | diff (kHz) |
|---|---|---|---|---|
| 1760 | 1 | 2,112,050 | 5279 | — |
| 1760 | 3 | 2,112,150 | 5280 | 100 |
| 1760 | 5 | 2,112,250 | 5281 | 100 |
| 1761 | 1 | 2,113,250 | 5282 | 1,000 |
| 1761 | 3 | 2,113,350 | 5283 | 100 |
| 1761 | 5 | 2,113,450 | 5284 | 100 |
| 1762 | 1 | 2,114,450 | 5285 | 1,000 |
| 1762 | 3 | 2,114,550 | 5286 | 100 |
| 1762 | 5 | 2,114,650 | 5287 | 100 |
| 1763 | 1 | 2,115,650 | 5288 | 1,000 |
| 1763 | 3 | 2,115,750 | 5289 | 100 |
| 1763 | 5 | 2,115,850 | 5290 | 100 |

Meanwhile, various embodiments of the disclosure propose a method and apparatus for determining the center frequency and synchronization raster of a synchronization signal in a communication system.

In addition, various embodiments of the disclosure consider a case in which a UE transmits and receives a signal to and from a base station through a satellite, and thus propose an apparatus and method for transmitting and receiving signals by applying TA based on information provided from the base station and satellite or global navigation satellite system (GNSS) information in order for the UE to perform initial access, data transmission, or the other.

On the other hand, in UE-satellite direct communication, as the distance between the UE and the satellite and the distance between the satellite and the base station are long and the satellite continuously moves, when a signal transmitted by the base station or UE is received by the UE or base station, a time offset occurs due to propagation delay or the like and a frequency offset occurs due to the Doppler effect or the like.

Accordingly, various embodiments of the disclosure propose a method and apparatus enabling searching for a synchronization signal when such a time offset exists. In various embodiments of the disclosure, communication between UE, satellite, and base station on the ground is assumed, but it should be noted that communication between satellite base station and UE is not excluded.

Additionally, in various embodiments of the disclosure, it should be noted that the frequency offset may include one generated from the Doppler effect. In various embodiments of the disclosure, a satellite may be an object located at a high place away from the ground, and may be a concept including an airplane, an airship, or the like.

First Embodiment

The first embodiment of the disclosure provides a method and apparatus for determining candidate values or synchronization raster of the center frequency of a synchronization signal in downlink transmitted by a satellite or a base station.

Figure 29:
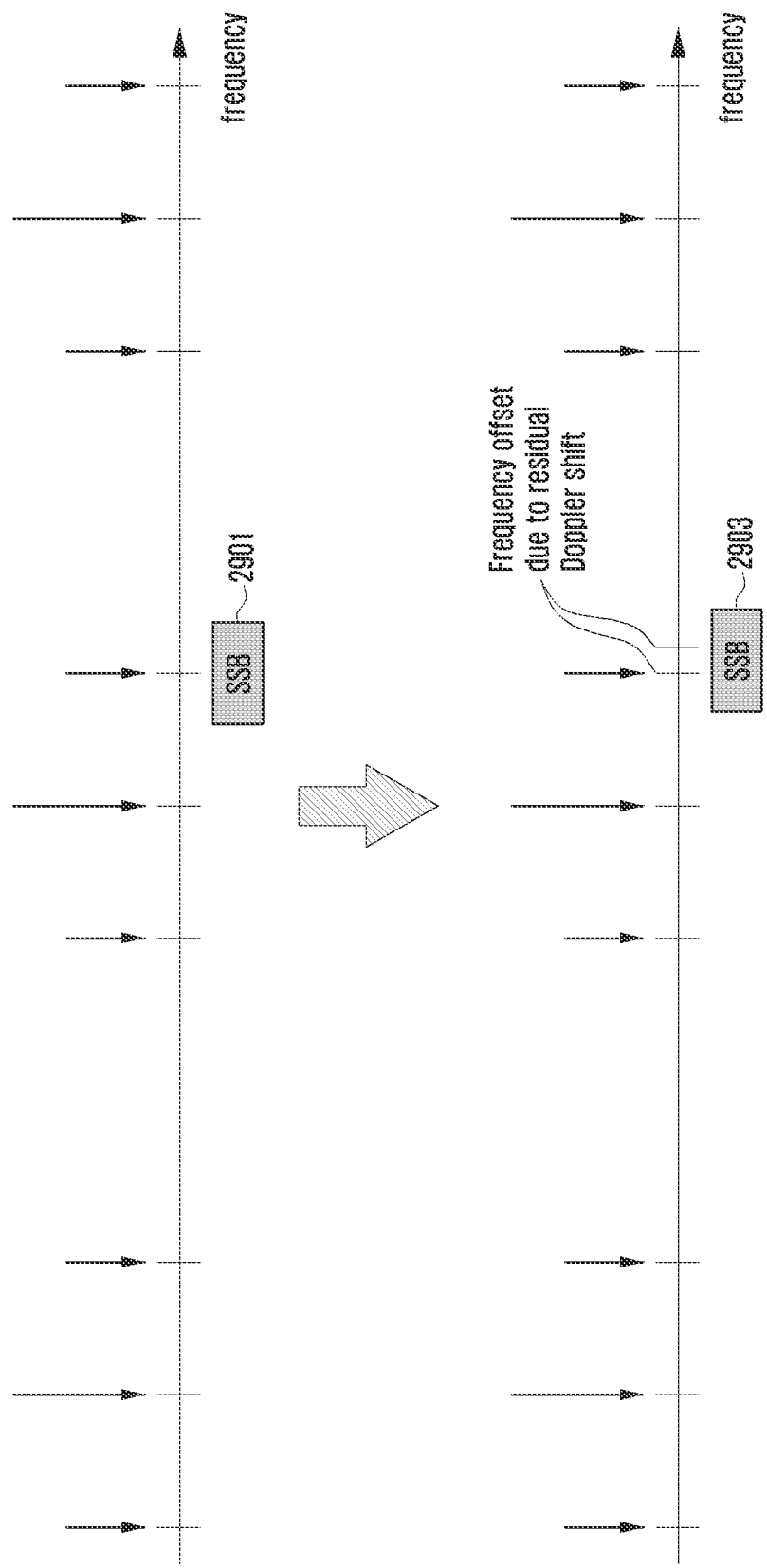
FIG. 29 is a diagram showing an example of positions of a synchronization raster in an NR system and an example of the position of an SSB (signal including PSS/SSS/PBCH) that can be transmitted at one of them.

FIG. 29 is a diagram showing an example of positions of a synchronization raster in an NR system and an example of the position 2901 of an SSB (signal including PSS/SSS/PBCH) that can be transmitted at one of them. The SSB transmitted by the satellite or base station may be received by the UE with the center frequency shifted due to a frequency offset caused by Doppler shift (2903). This may be a result of the fact that the Doppler effect can be calculated in advance to some extent by using the direction of a signal used when the satellite or base station transmits the signal to the UE, and the satellite or base station can correct the frequency offset to some extent according to the calculated Doppler effect. Considering that the SSB is received by the UE with a frequency offset as shown in FIG. 29, the UE may have to attempt to detect the SSB even at frequency positions around the synchronization raster determined to detect the SSB. If a large frequency offset occurs in satellite communication when a signal is transmitted to the UE through a satellite, the UE may have to attempt to detect the SSB at multiple positions around the synchronization raster. In this case, the complexity of the UE for SSB detection and the power consumption for SSB detection may significantly increase. Therefore, a method for reducing complexity and power consumption of the UE for SSB detection may be required.

Method A1: reducing the number of synchronization rasters in the satellite network frequency band.

Figure 30:
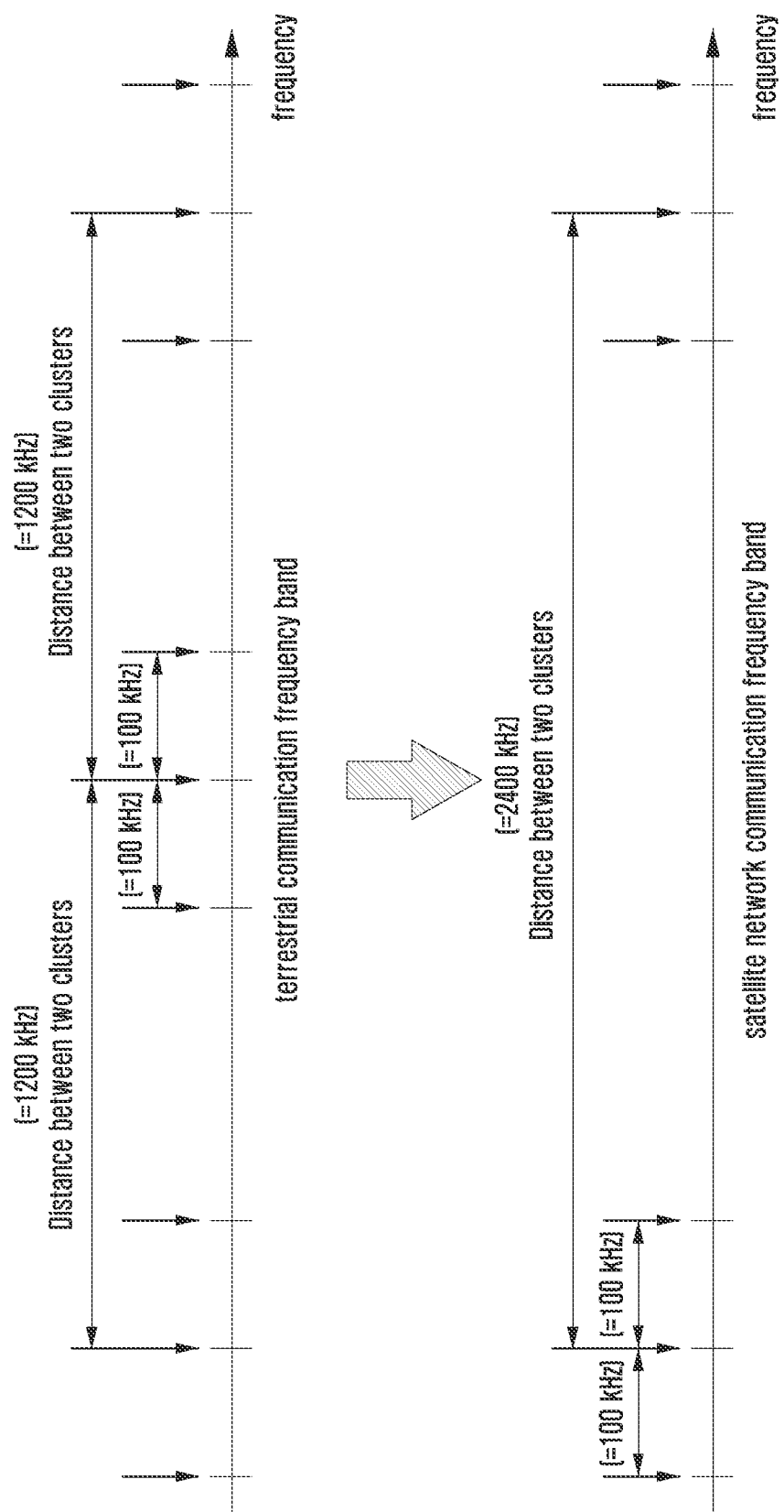
FIG. 30 is a diagram showing an example of changing the interval between clusters as a scheme of changing the interval between synchronization rasters in a satellite network frequency band.
Figure 31:
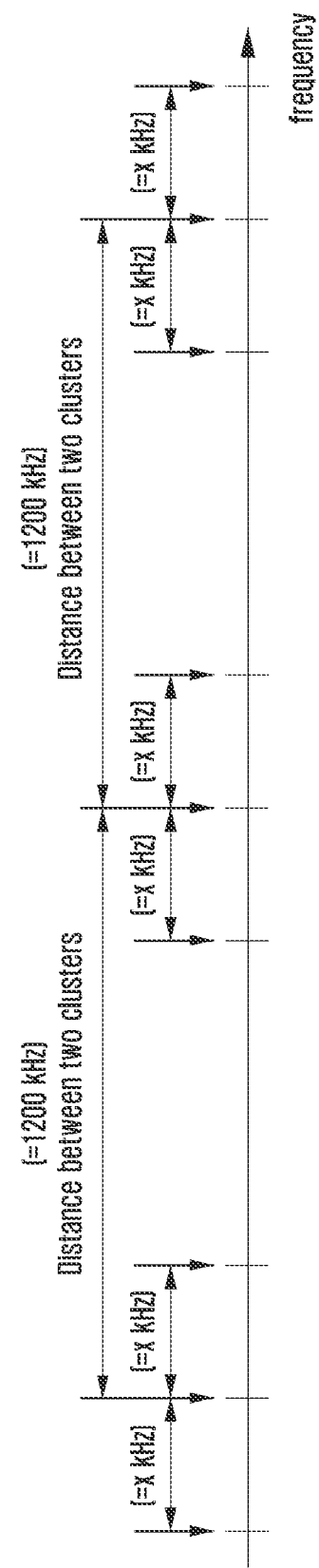
FIG. 31 is a diagram showing an example of changing the interval between synchronization rasters within one cluster as a scheme of changing the interval between synchronization rasters in a satellite network frequency band.

Method A2: changing and applying the synchronization raster interval in the satellite network frequency band. This may be a method of changing the cluster interval of the synchronization raster, or changing the synchronization raster interval in a cluster. FIG. 30 and FIG. 31 are diagrams showing an example of changing the cluster interval and an example of changing the synchronization raster interval in one cluster, respectively, as a method of changing the synchronization raster interval in a satellite network frequency band.

For instance, this can be given as shown in Table 27 below. When the value of SS_REF is given by N*1200 kHz+M*50 kHz in terrestrial network communication, it can be given by N*1200 kHz+M*X kHz in satellite network communication, where X can be a value smaller than 50, such as 5. For example, in satellite network communication, SS_REF may be determined as N*1200 kHz+M*5 kHz. At this time, the X value may be determined differently according to the altitude of the satellite or the range of the frequency band. For example, X may be given 5 for a low-orbit satellite at an altitude of 2000 km, and X may be given 3 for a low-orbit satellite at an altitude of 700 km. Also, as an example, X may be given 3 for a frequency band of 0 to 1000 MHz, X may be given 5 for a frequency band of 1000 to 2000 MHz, and X may be given 7 for a frequency band of 2000 to 3000 MHz.

Method A3: reducing the range of candidate values for N and M in determining the SSB frequency position.

Method A4: reducing candidate values of GSCN. For example, reducing the range of values that can be selected from the GSCN values provided in Table 25, or increasing the interval thereof. As an example, such a method may be given as Table 28 below. In Table 28, Range of GSCN (candidate values) of 5279-<3>-5419 may mean from 5279 to 5419 with a step size of 3. In this way, the number of GSCN values can be reduced by setting the step size of GSCN to a large value such as 3 or 5.

TABLE 27

| Range of frequencies (MHz) | SS block frequency position $SS_{REF}$ | GSCN | Range of GSCN |
|---|---|---|---|
| 0-3000 | N * 1200 KHz + M * X kHz, N = 1:2499, M {1, 3, 5} (Note) | 3N + (M − 3)/2 | 2-7498 |

TABLE 28

| NR operating band | SS Block SCS | SS Block pattern (note) | Range of GSCN (First-<Step size>-Last) |
|---|---|---|---|
| n xx | 15 kHz | Case A | 5279-<3>-5419 |

Second Embodiment

The second embodiment of the disclosure provides a method and apparatus that enable a UE performing satellite communication to detect a downlink synchronization signal.

As described herein, the satellite revolves around the Earth at a high speed to orbit the Earth, and due to such a high speed, a frequency offset occurs in the process of communication with a user or ground station/base station on the ground. This frequency offset is caused by the Doppler effect due to the satellite's speed; the degree of the Doppler effect or frequency offset occurring in this process may be determined according to the position of the satellite (altitude, longitude, latitude, etc.) and the position of the user (or ground station/base station) on the ground, and may be determined according to the elevation angle at which the UE views the satellite. In addition, it may be varied depending on how much the satellite or base station corrects the frequency offset in advance. In addition, the degree of frequency offset may vary according to the frequency band used for satellite communication.

Figure 32:
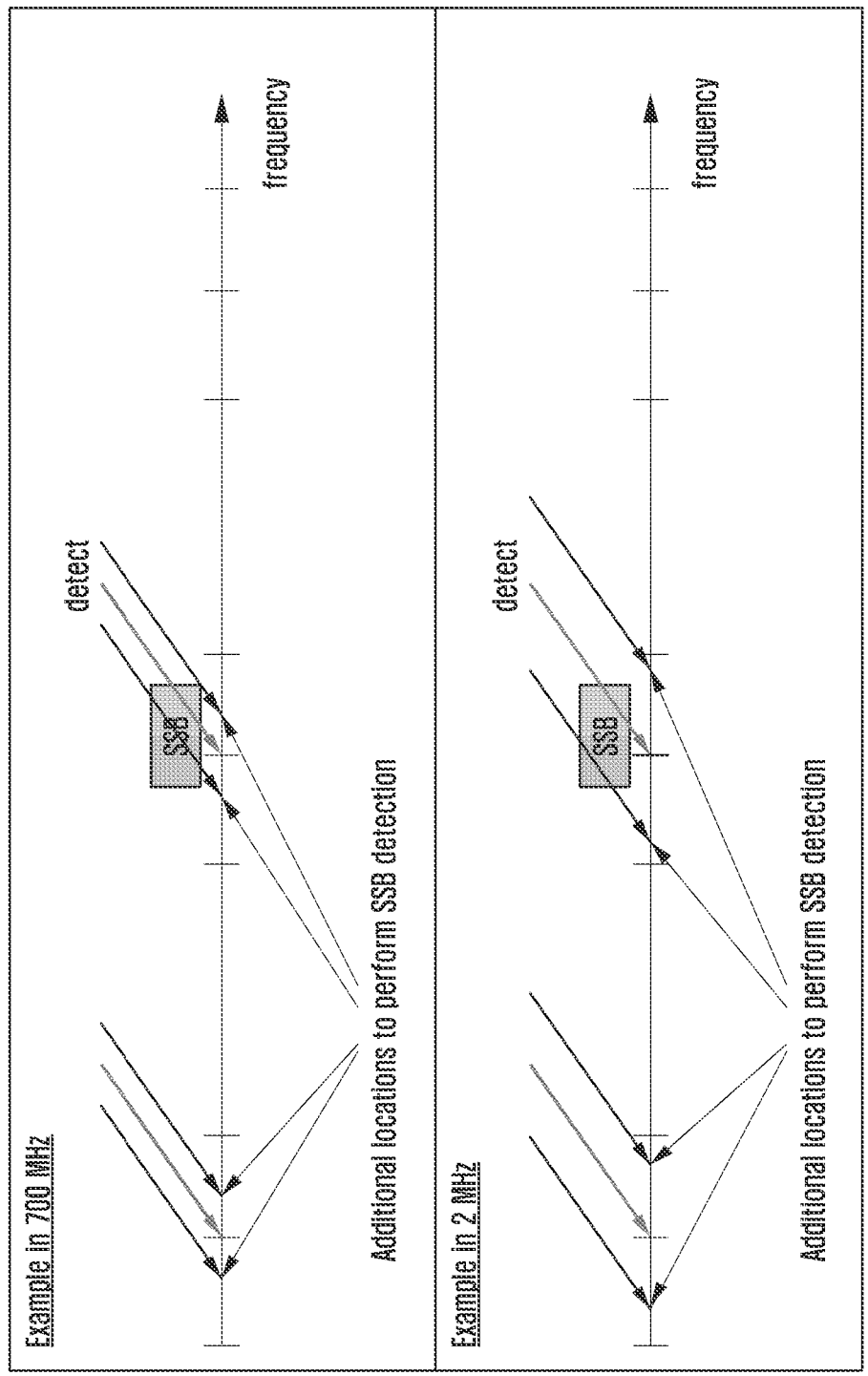
FIG. 32 is a diagram illustrating additional positions for SSB search in consideration of a frequency offset that may occur in satellite communication.
Figure 33A:
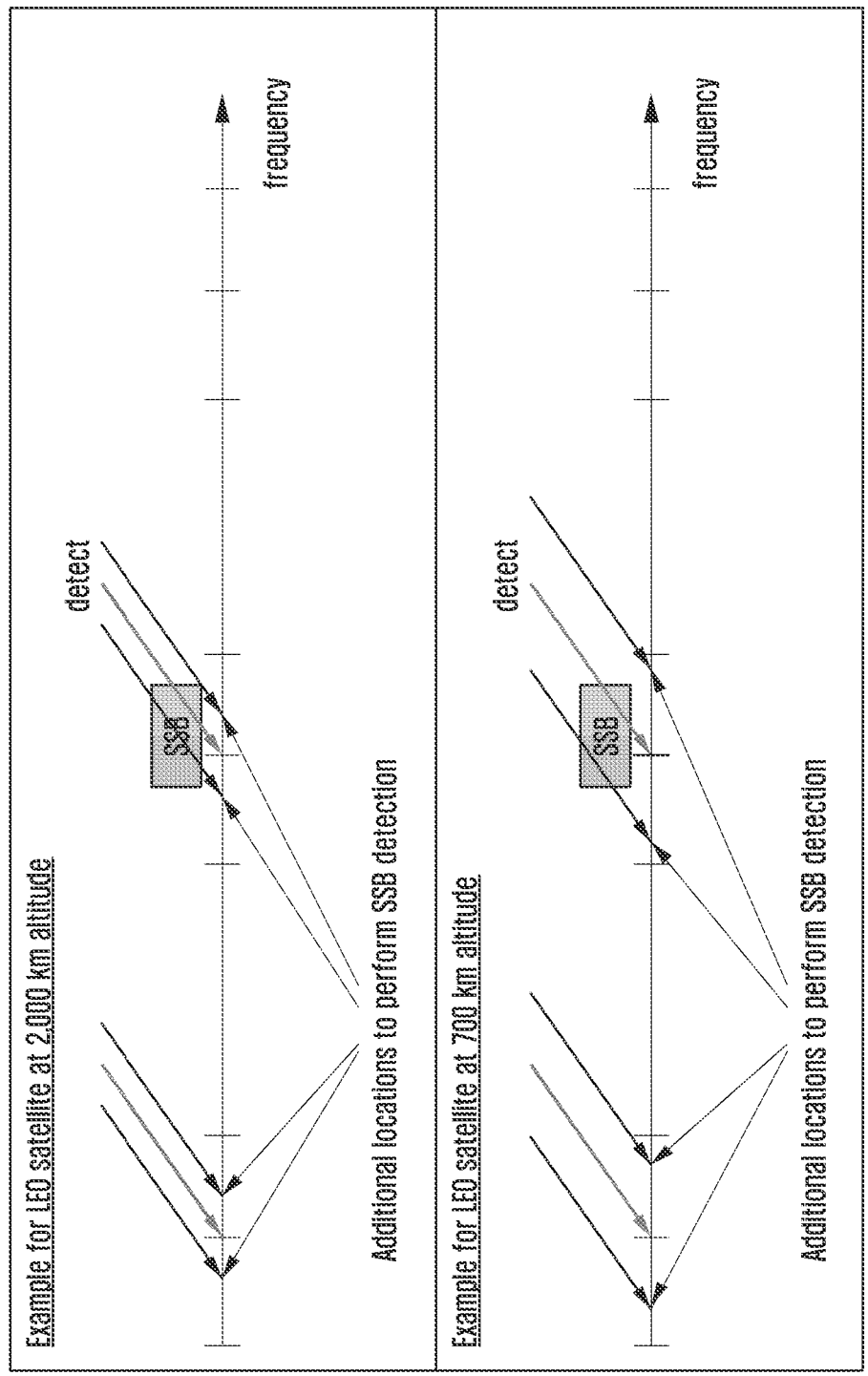
FIG. 33A is a diagram illustrating additional positions for SSB search in consideration of a frequency offset that may occur in satellite communication.

FIGS. 32 and 33A are diagrams illustrating additional SSB search positions in consideration of a frequency offset that may occur in satellite communication. A UE searching for an SSB, which is a synchronization signal in satellite communication, can determine a frequency position to be searched for by considering the degree of frequency offset that may occur in satellite communication. Thus, the UE may attempt to search for the SSB at a frequency position in addition to the preset synchronization raster. This can improve SSB search performance, but complexity and power consumption of the UE required for SSB search may increase.

Figure 33B:
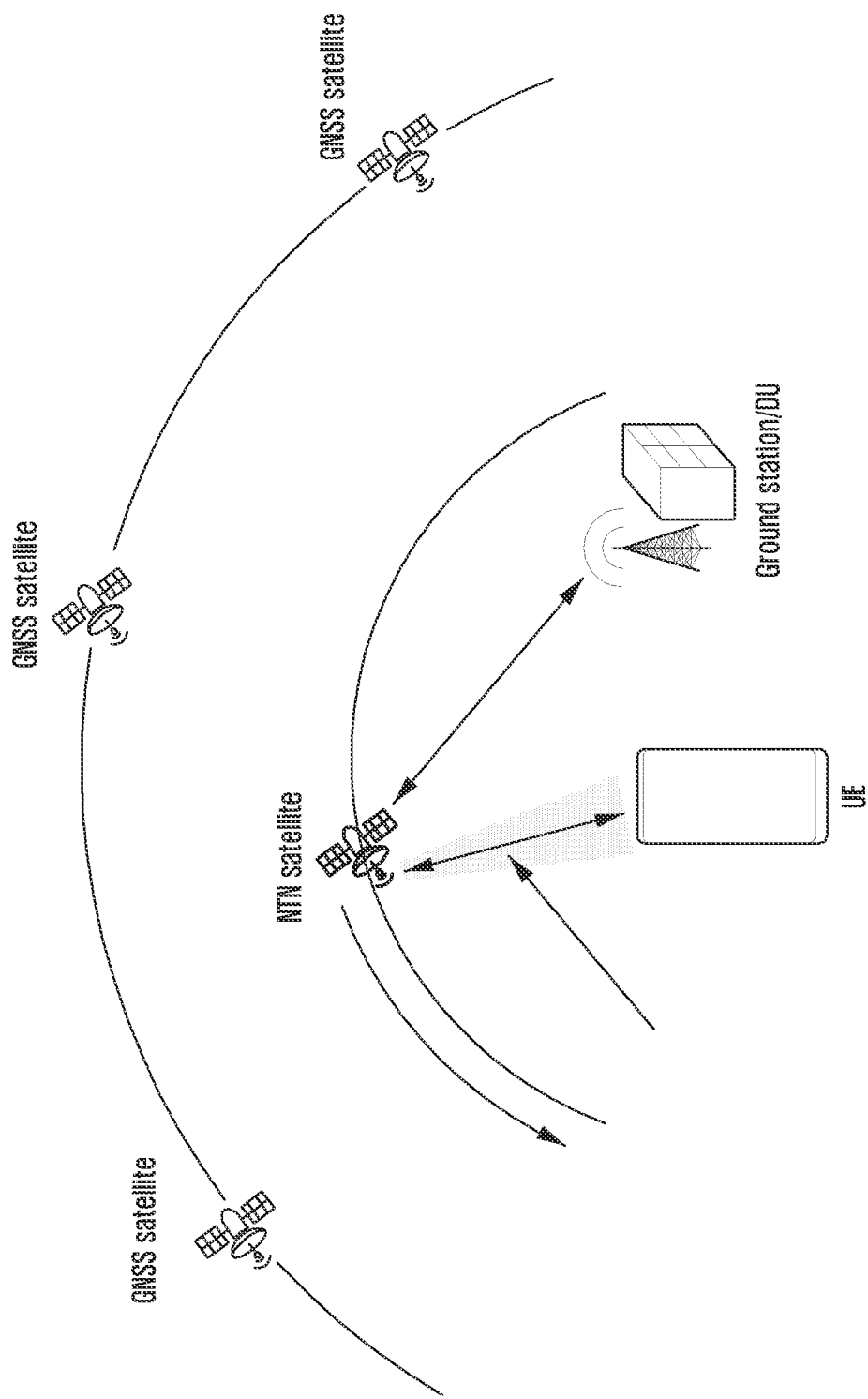
FIG. 33B is a schematic diagram illustrating calculation of a frequency offset based on the positions of a satellite, a UE, and a ground station in a communication system according to various embodiments of the disclosure.

With reference to FIG. 33B, first, a satellite, base station, or UE may calculate and estimate the Doppler effect or frequency offset between the satellite and the UE based on the positions of the UE and the satellite. For example, the UE may identify its position by using a global positioning system (GPS) or the like. The method for identifying the position of the UE may be implemented in various ways, and a detailed description thereof will be omitted.

Meanwhile, in various embodiments of the disclosure, a satellite navigation system such as GPS includes one or more satellites, and each of the one or more satellites transmits a signal containing information such as time and location. The UE may receive a signal from each of one or more satellites of the satellite navigation system, and identify the position of the UE itself based on the signal received from each of the one or more satellites.

On the other hand, in various embodiments of the disclosure, an NTN satellite may be a communication satellite serving to transfer signals for connecting a UE to the base station. Also, in various embodiments of the disclosure, a GNSS satellite may be a satellite that transmits a signal of the satellite navigation system. Meanwhile, it should be noted that in FIG. 33B, a terminal is represented as UE, and a base station is represented as ground station/DU.

Alternatively, by notifying the reference time used by the satellite, the UE can calculate a frequency offset value based on the time and position of the GNSS system.

In various embodiments of the disclosure, the time obtained from the GNSS or the time of the base station transmitted by the base station may be based on Coordinated Universal Time (UTC) for example, and this may be based on the time from 00:00:00 on Jan. 1, 1900 of the Gregorian calendar. This may vary depending on the type of GNSS system, and a reference time zone as shown in Table 29 below may be used.

TABLE 29 gnss-DayNumber
This field specifies the sequential number of days (with day count starting at 0) from the origin of the GNSS System Time as follows:
GPS, QZSS, SBAS - Days from Jan. 6$^{th}$, 1980 00:00:00 UTC (USNO);
Galileo - Days from Galileo System Time (GST) start epoch, defined as 13 seconds before midnight between 21$^{st}$ Aug. and 22$^{nd}$ Aug. 1999; i.e., GST was equal to 13 seconds at Aug. 22$^{nd}$, 1999 00:00:00 UTC;
GLONASS - Days from Dec. 31$^{st}$, 1995 21:00:00 UTC (SU), which is local UTC Moscow Jan. 1$^{st}$, 1996 00:00:00, defined as UTC(SU) + 3 hours in [9];
BDS - Days from Jan. 1$^{st}$, 2006 00:00:00 UTC (NTSC).
NavIC - Days from NavIC System Time start epoch, defined as 13 seconds before midnight between 21$^{st}$ Aug. and 22nd Aug. 1999; i.e., NavIC System Time was equal to 00:00:00 at Aug. 21st, 1999 23:55:47 UTC (BIPM).

In Table 29, NavIC may mean NAVigation with Indian Constellation, QZS may mean Quasi Zenith Satellite, QZSS may mean Quasi-Zenith Satellite System, QZST may mean Quasi-Zenith System Time, SBAS may mean Space Based Augmentation System, and BDS may mean BeiDou Navigation Satellite System. In addition, the base station may indicate, through a satellite, the type of a GNSS system that is used as a reference for the position or time information used by the base station itself, where indications as shown in Table 30 below can be used.

TABLE 30

| Value of gnss-T0-ID | Indication |
|---|---|
| 1 | GPS |
| 2 | Galileo |
| 3 | QZSS |
| 4 | GLONASS |
| 5 | BDS |
| 6 | NavIC |
| 7-15 | reserved |

In various embodiments of the disclosure, the method for the UE to determine whether a serving cell is provided through a satellite network or through a terrestrial network may be implemented in various ways. For example, the UE may distinguish whether a serving cell is provided from a terrestrial network or from a satellite network according to the pre-specified frequency bands. Such a frequency band may be pre-specified, or when accessing a previous network, whether it is a terrestrial network or a satellite network may have been set for each frequency band. Thereafter, when initial access is performed in the corresponding frequency band, the determination may be made based on the previously set information.

For example, the UE may identify whether the serving cell is provided through a satellite network or through a terrestrial network according to the frequency, SIB, or an explicit indication.

As an example, assuming that the SIB providing parameters necessary for satellite network transmission and reception is SIB-NTN or SIB-xx, when SIB-NTN or SIB-xx is provided from the base station via a corresponding serving cell, the UE can identify the corresponding serving cell as a serving cell provided by a satellite network. Otherwise, when SIB-NTN or SIB-xx is not provided from the base station via a corresponding serving cell, the UE can identify the corresponding serving cell as a serving cell provided by a terrestrial network.

As another example, a parameter indicating whether the serving cell of the UE is an NTN network (satellite network) or a terrestrial network as an explicit indication may be transmitted through the SIB. Here, the parameter indicating whether the serving cell is an NTN network or a terrestrial network may be implemented with a set number of bits, for example, one bit. Here, it is assumed that the parameter indicating an NTN network or a terrestrial network is implemented with 1 bit. The base station may set the value of the parameter to 1, for example, when the base station itself transmits a signal to the UE or receives a signal from the UE through a satellite network, and the value of the parameter may be set to 0, for example, when the base station transmits and receives a signal to and from the UE through a terrestrial network other than a satellite network.

Then, the UE receives the parameter, and if the value of the parameter is 1, the UE may identify the serving cell as a serving cell provided through a satellite network; otherwise if the value of the parameter is 0, the UE may identify the serving cell as a serving cell provided through a terrestrial network. Here, this parameter may be a parameter transmitted through MIB or SIB. Alternatively, the UE may receive at least one of MIB, PBCH, synchronization signal, or SIB, and identify the parameter value based on at least one of the received MIB, PBCH, synchronization signal, or SIB.

Meanwhile, in various embodiments of the disclosure, transmitting and receiving a signal through a satellite (satellite network) may include a fact that a signal transmitted by a UE is delivered to the satellite and the signal is then forwarded from the satellite to the base station, and may include a fact that a signal transmitted by the base station is delivered to the satellite and the signal is then forwarded from the satellite to the UE.

Meanwhile, in the above description, for convenience of explanation, the method and apparatus for adjusting the uplink timing based on the TA in a communication system according to various embodiments of the disclosure have been described separately as the first to fourth embodiments, but since the first to fourth embodiments include operations related to each other, it will be clear that two or more of the embodiments can be combined. In addition, the methods according to the individual embodiments are not mutually exclusive, and it is also possible to perform a combination of one or more methods.

Each of the base station, satellite, and UE for carrying out the embodiments of the disclosure may be a transmitting end or a receiving end; each of the base station, satellite, and UE may include a receiver, a processor, and a transmitter; and the base station, satellite, and UE each operate according to the embodiments of the disclosure.

Next, a description will be given of the internal structure of a UE according to various embodiments of the disclosure with reference to FIG. 34.

Figure 34:
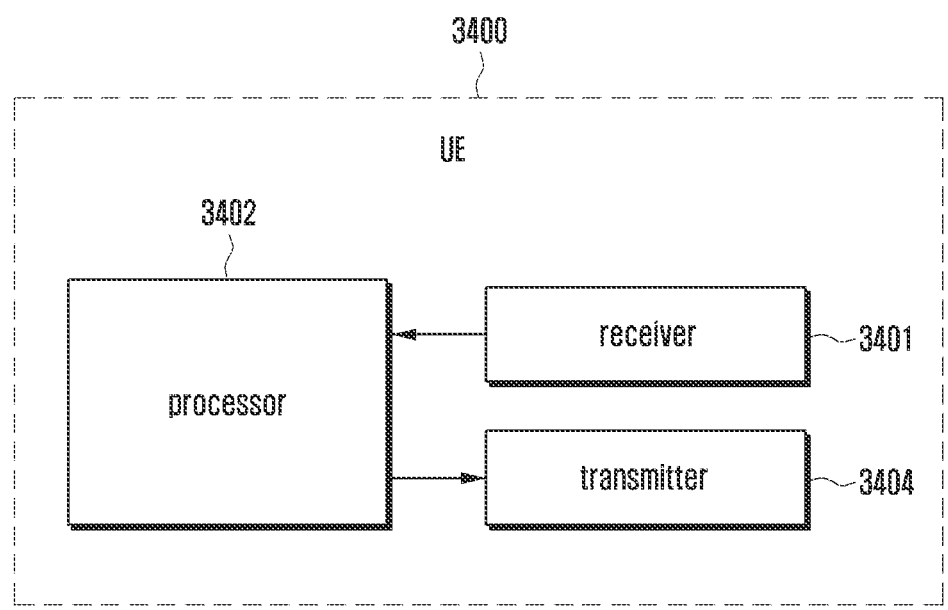
FIG. 34 is a schematic block diagram illustrating the internal structure of a UE according to various embodiments of the disclosure.

FIG. 34 is a schematic block diagram illustrating the internal structure of a UE according to various embodiments of the disclosure.

As shown in FIG. 34, the UE 3400 may include a receiver 3401, a transmitter 3404, and a processor 3402. The receiver 3401 and the transmitter 3404 may be collectively referred to as a transceiver in embodiments of the disclosure. The transceiver may transmit and receive a signal to and from a base station. Here, the signal may include control information and data. To this end, the transceiver may include an RF transmitter for up-converting and amplifying the frequency of a signal to be transmitted, and an RF receiver for low-noise amplifying a received signal and down-converting its frequency. In addition, the transceiver may receive a signal through a radio channel and output the signal to the processor 3402, and may transmit a signal output from the processor 3402 through a radio channel. The processor 3402 may control a series of processes so that the UE 3400 can operate according to the above-described embodiments of the disclosure. The processor 3402 may control overall operations related to the uplink timing adjustment based on the TA as described in the first to fourth embodiments, for example. For example, the receiver 3401 may receive a signal from a satellite or terrestrial base station, and the processor 3402 may control transmitting a signal to the base station and receiving a signal from the base station according to various embodiments of the disclosure. In addition, the transmitter 3404 may transmit a determined signal at a determined timing.

Figure 35:
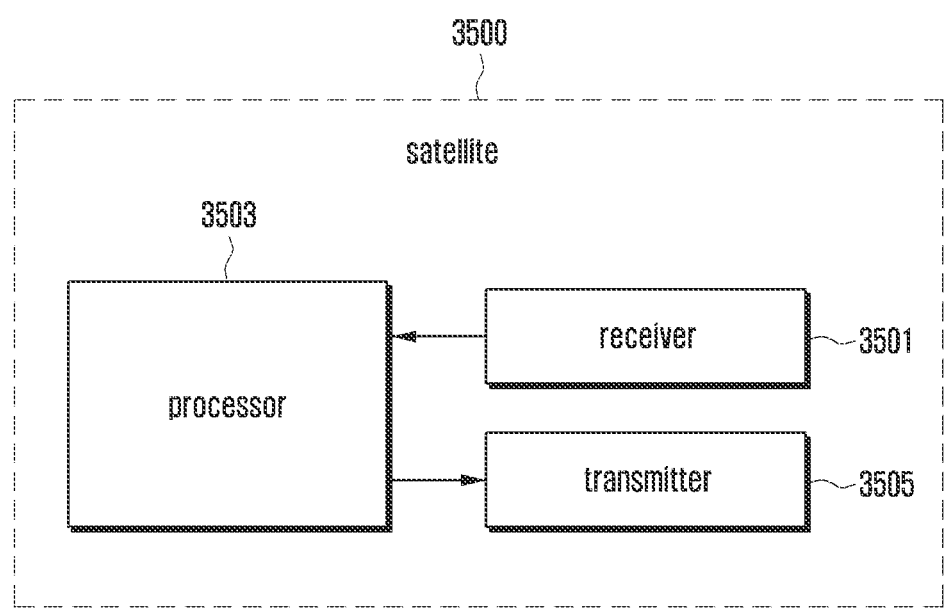
FIG. 35 is a schematic block diagram illustrating the internal structure of a satellite according to various embodiments of the disclosure.

Next, a description is given of the internal structure of a satellite according to various embodiments of the disclosure with reference to FIG. 35.

FIG. 35 is a schematic block diagram illustrating the internal structure of a satellite according to various embodiments of the disclosure.

As shown in FIG. 35, the satellite 3500 may include a receiver 3501, a transmitter 3505, and a processor 3503. In FIG. 35, for convenience of description, a case in which the receiver, transmitter, and processor are each implemented as a singular element, like the receiver 3501, transmitter 3505, or processor 3503, is shown, but the receiver, transmitter, and processor may each be implemented in plurality. For example, the satellite 3500 may include a receiver and a transmitter for transmitting and receiving signals to and from a UE, and a receiver and a transmitter for receiving and transmitting signals from and to a base station (and a receiver and a transmitter for transmitting and receiving signals to and from another satellite).

The receiver 3501 and the transmitter 3503 may be collectively referred to as a transceiver in embodiments of the disclosure. The transceiver may transmit and receive a signal to and from a UE and a base station. The signal may include control information and data. To this end, the transceiver may include an RF transmitter for up-converting and amplifying the frequency of a signal to be transmitted, and an RF receiver for low-noise amplifying a received signal and down-converting its frequency. In addition, the transceiver may receive a signal through a radio channel and output the signal to the processor 3503, and may transmit a signal output from the processor 3503 through a radio channel.

The processor 3503 may include a compensator (or, pre-compensator) for correcting a frequency offset or a Doppler shift, and may include a gadget capable of tracking a position from a GPS or the like. Also, the processor 3503 may include a frequency shift function capable of shifting the center frequency of a received signal. The processor 3503 may control a series of processes so that a satellite, a base station, and a UE can operate according to various embodiments of the disclosure. The processor 3503 may control overall operations related to the uplink timing adjustment based on the TA as described in the first to fourth embodiments, for example. For example, the processor 3503 may determine to transmit TA information to the base station in a process where the receiver 3501 receives a PRACH preamble from a UE and transmits a corresponding RAR back to the UE. The transmitter 3505 may transmit corresponding signals at a determined timing.

Figure 36:
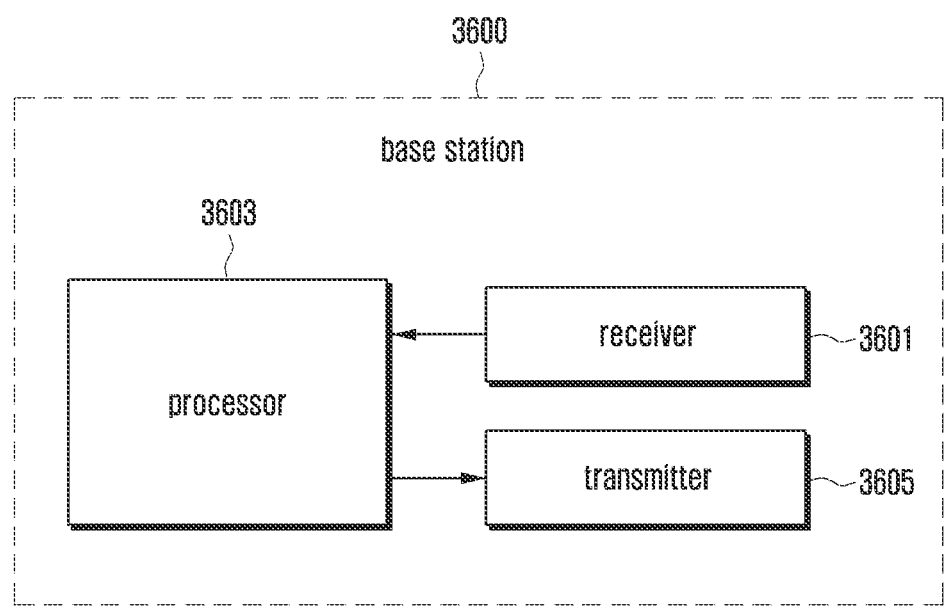
FIG. 36 is a schematic block diagram illustrating the internal structure of a base station according to various embodiments of the disclosure.

Next, a description is given of the internal structure of a base station according to various embodiments of the disclosure with reference to FIG. 36.

FIG. 36 is a schematic block diagram illustrating the internal structure of a base station according to various embodiments of the disclosure.

As shown in FIG. 36, the base station 3600 may include a receiver 3601, a transmitter 3605, and a processor 3603. The base station 3600 may be a terrestrial base station or may be a part of a satellite. The receiver 3601 and the transmitter 3605 may be collectively referred to as a transceiver in embodiments of the disclosure. The transceiver may transmit and receive a signal to and from a UE. The signal may include control information and data. To this end, the transceiver may include an RF transmitter for up-converting and amplifying the frequency of a signal to be transmitted, and an RF receiver for low-noise amplifying a received signal and down-converting its frequency. In addition, the transceiver may receive a signal through a radio channel and output the signal to the processor 3603, and may transmit a signal output from the processor 3603 through a radio channel. The processor 3603 may control a series of processes so that the base station 3600 can operate according to the embodiments of the disclosure. The processor 3603 may control overall operations related to the uplink timing adjustment based on the TA as described in the first to fourth embodiments, for example. For example, the processor 3603 may transmit an RAR including TA information.

Figure 37:
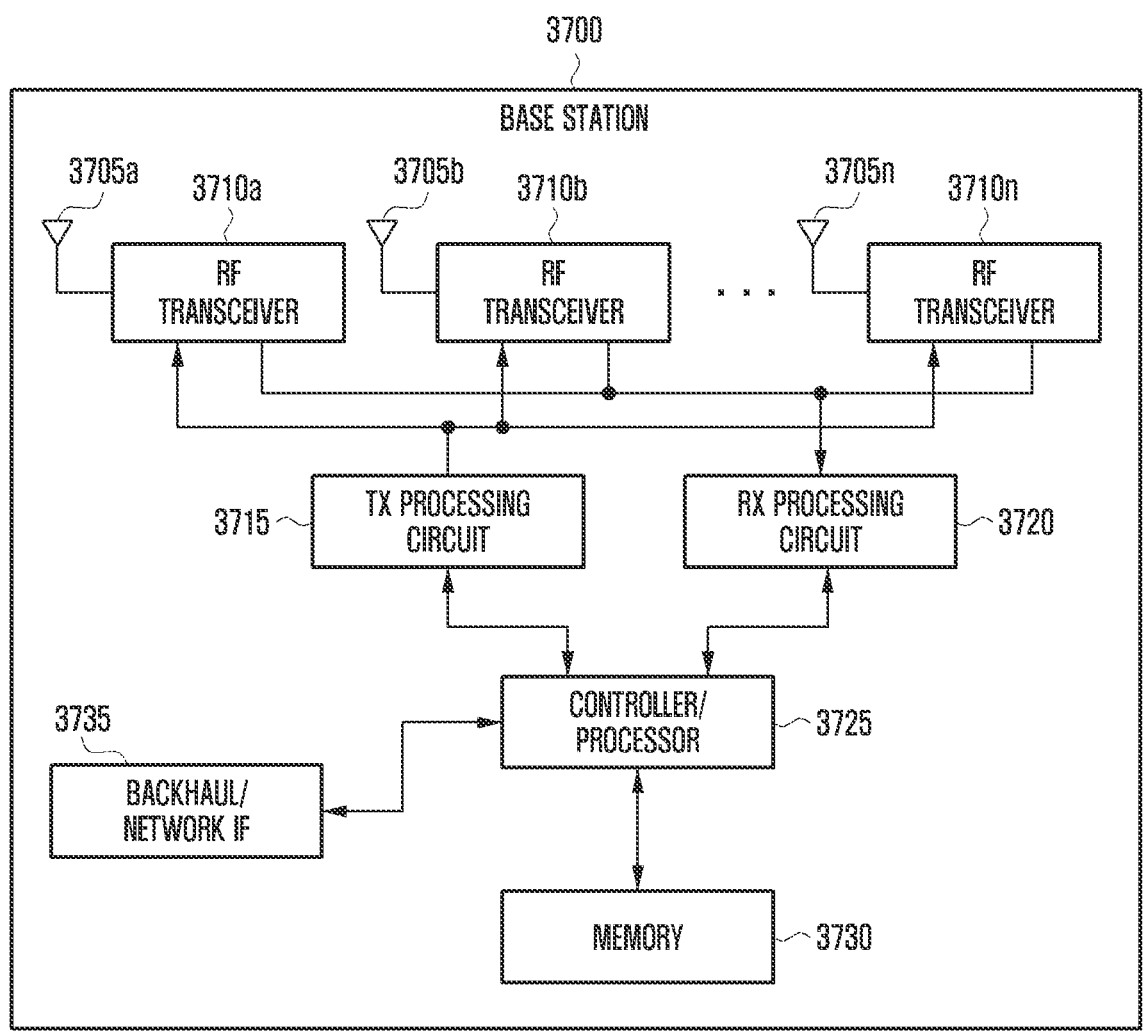
FIG. 37 is a schematic diagram illustrating the structure of an example base station according to embodiments of the disclosure.

Next, a description is given of the structure of a base station according to embodiments of the disclosure with reference to FIG. 37.

FIG. 37 is a schematic diagram illustrating the structure of an example base station according to embodiments of the disclosure. The embodiment of a base station shown in FIG. 37 is for illustration only, and thus FIG. 37 does not limit the scope of the disclosure to any particular implementation of a base station.

As shown in FIG. 37, the base station 3700 includes multiple antennas 3705a-3705n, multiple RF transceivers 3710a-3710n, a transmit (TX) processing circuit 3715, and a receive (RX) processing circuit 3720. The base station also includes a controller/processor 3725, a memory 3730, and a backhaul/network interface 3735.

The RF transceivers 3710a-3710n receive input RF signals, such as signals transmitted by UEs on a network, through the antennas 3705a-3705n. The RF transceivers 3710a to 3710n down-convert the input RF signals to generate IF or baseband signals. The IF or baseband signals are transferred to the RX processing circuit 3720, and the RX processing circuit 3720 filters, decodes, and/or digitizes the baseband or IF signals to generate processed baseband signals. The RX processing circuit 3720 transfers the processed baseband signals to the controller/processor 3725 for further processing.

The TX processing circuit 3715 receives analog or digital data (such as voice data, web data, email, or interactive video game data) from the controller/processor 3725. The TX processing circuit 3715 encodes, multiplexes, and/or digitizes the output baseband data to generate processed baseband or IF signals. The RF transceivers 3710a-3710n receive the processed baseband or IF signals output from the TX processing circuit 3715, and up-convert the baseband or IF signals to RF signals to be transmitted via the antennas 3705a-3705n.

The controller/processor 3725 may include one or more processors or other processing units to control the overall operation of the base station. For example, the controller/processor 3725 may control the RF transceivers 3710a-3710n, the RX processing circuit 3720, and the TX processing circuit 3715 to receive downlink channel signals and transmit uplink channel signals according to well-known principles. The controller/processor 3725 may support additional functions, such as more evolved wireless communication functions.

In various embodiments of the disclosure, the controller/processor 3725 may control overall operations related to the uplink timing adjustment based on TA as described in the first to fourth embodiments, for example.

In addition, the controller/processor 3725 may support beamforming or directional routing operations in which signals output from the multiple antennas 3705a-3705n are weighted differently to efficiently steer the output signals in a desired direction. Any of various other functions may be supported by the controller/processor 3725 in the base station.

The controller/processor 3725 can also execute programs resident in the memory 3730 such as an OS, and other processes. The controller/processor 3725 can move data into or out of the memory 3730 as needed by running processes.

The controller/processor 3725 is also connected to the backhaul/network interface 3735: The backhaul/network interface 3735 allows the base station to communicate with other devices or systems over a backhaul connection or over a network. The interface 3735 may support communications over suitable wired or wireless connections. For example, when the base station is implemented as part of a cellular communication system (such as a cellular communication system supporting 5G, LTE, or LTE-A), the interface 3735 may allow the base station to communicate with other base stations via a wired or wireless backhaul connection. When the base station is implemented as an access point, the interface 3735 may allow the base station to communicate with a larger network (such as the Internet) over a wired or wireless local area network or over a wired or wireless connection. The interface 3735 includes a suitable structure to support communications over a wired or wireless connection, such as an Ethernet or RF transceiver.

The memory 3730 is connected to the controller/processor 3725. A portion of the memory 3730 may include a RAM, and another portion of the memory 3730 may include a flash memory or other ROM.

Although FIG. 37 illustrates an example base station, various changes may be made to FIG. 37. For example, some of the components shown in FIG. 37 may be included as a variable number of instances in the base station. As a specific example, an access point may include multiple interfaces 3735, and the controller/processor 3725 may support routing functions to route data between different network addresses. As another specific example, although shown as including a single instance of TX processing circuit 3715 and a single instance of RX processing circuit 3720, the base station may include multiple instances thereof (such as one per RF transceiver). In addition, various components in FIG. 37 may be combined, subdivided further, or omitted, and additional components may be added according to special needs.

Figure 38:
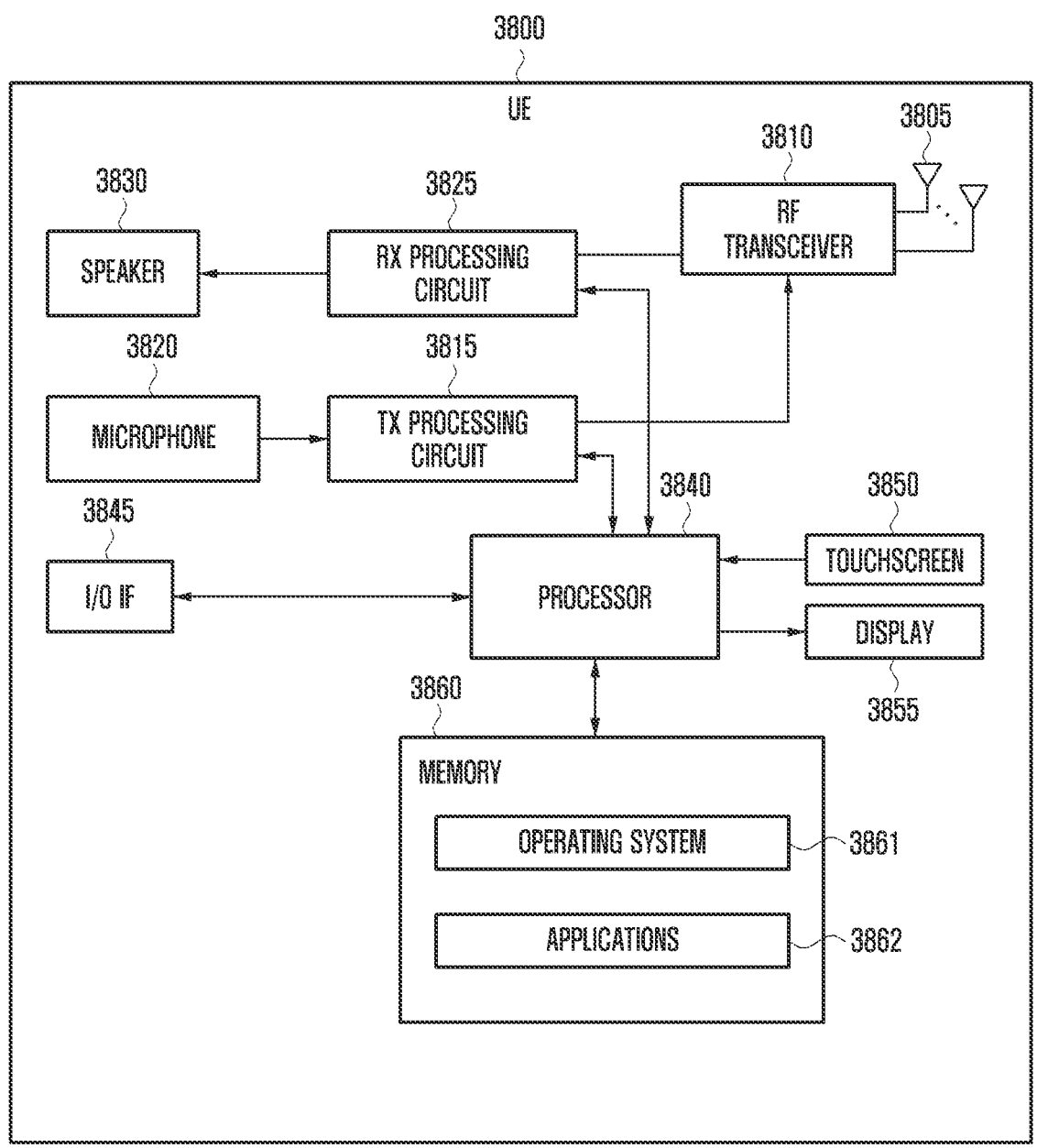
FIG. 38 is a schematic diagram illustrating the structure of an example UE according to embodiments of the disclosure.

Next, a description is given of the structure of a UE according to embodiments of the disclosure with reference to FIG. 38.

FIG. 38 is a schematic diagram illustrating the structure of an example UE according to embodiments of the disclosure.

The embodiment of a UE shown in FIG. 38 is for illustration only, and thus FIG. 38 does not limit the scope of the disclosure to any particular implementation of a UE.

As shown in FIG. 38, the UE 3800 includes an antenna 3805, a radio frequency (RF) transceiver 3810, a TX processing circuit 3815, a microphone 3820, and an RX processing circuit 3825. The UE also includes a speaker 3830, a processor 3840, an input/output (I/O) interface (IF) 3845, a touchscreen 3850, a display 3855, and a memory 3860. The memory 3860 stores an operating system (OS) 3861 and one or more applications 3862.

The RF transceiver 3810 receives an input RF signal transmitted by a base station of the network through the antenna 3805. The RF transceiver 3810 down-converts the input RF signal to generate an intermediate frequency (IF) or baseband signal. The IF or baseband signal is transferred to the RX processing circuit 3825, and the RX processing circuit 3825 filters, decodes, and/or digitizes the baseband or IF signal to generate a processed baseband signal. For further processing, the RX processing circuit 3825 transfers the processed baseband signal to the speaker 3830 (such as for voice data) or to the processor 3840 (such as for web browsing data).

The TX processing circuit 3815 receives analog or digital voice data from the microphone 3820, or receives other output baseband data (such as web data, email, or interactive video game data) from the processor 3840. The TX processing circuit 3815 encodes, multiplexes, and/or digitizes the output baseband data to generate a processed baseband or IF signal. The RF transceiver 3810 receives the processed baseband or IF signal output from the TX processing circuit 3815, and up-converts the baseband or IF signal into an RF signal to be transmitted through the antenna 3805.

The processor 3840 may include one or more processors or other processing units, and may execute the OS 3861 stored in the memory 3860 to control overall operations of the UE. For example, the processor 3840 may control the RF transceiver 3810, the RX processing circuit 3825, and the TX processing circuit 3815 to receive downlink channel signals and transmit uplink channel signals according to known principles. In some embodiments, the processor 3840 includes at least one microprocessor or microcontroller.

In various embodiments of the disclosure, the processor 3840 may control overall operations related to the uplink timing adjustment based on the TA as described in the first to fourth embodiments, for example.

The processor 3840 may also execute other processes and programs resident in the memory 3860. The processor 3840 may move data into or out of the memory 3860 as required by a running process. In some embodiments, the processor 3840 is configured to execute the applications 3862 based on the OS program 3861 or in response to a signal received from a base stations or operator. In addition, the processor 3840 is connected to the I/O interface 3845, the I/O interface 3845 provides the UE with the ability to connect to other devices such as a laptop computer and a handheld computer. The I/O interface 3845 is a communication path between the processor 3840 and an accessory or the like.

The processor 3840 is also connected to the touchscreen 3850 and the display unit 3855. An operator of the UE may input data into the UE by using the touchscreen 3850. The display 3855 may be a liquid crystal display, light emitting diode display, or other display capable of rendering text and/or at least limited graphics, such as data from a web site.

The memory 3860 is connected to the processor 3840. A portion of the memory 3860 may include a random access memory (RAM), and the remaining portion of the memory 3860 may include a flash memory or other read-only memory (ROM).

Although FIG. 38 illustrates an example UE, various changes may be made to FIG. 38. For example, various components in FIG. 38 may be combined, subdivided further, or omitted, and other components may be added according to special needs. Also, as a particular example, the processor 3840 may be divided into multiple processors such as one or more central processing units (CPUs) and one or more graphics processing units (GPUs). Also, although the UE in FIG. 38 is configured like a mobile phone or a smartphone, the UE may be configured to be operated as other types of mobile or fixed devices.

A method of a UE in a communication system according to various embodiments of the disclosure may include: selecting, as a final scheme for determining timing-related information, at least one of a first scheme in which the UE determines timing-related information used to adjust the uplink timing or a second scheme in which at least one of a base station or a satellite determines the timing-related information; and determining the timing-related information based on the final scheme.

In various embodiments of the disclosure, the method further includes adjusting the uplink timing based on the determined timing-related information.

In various embodiments of the disclosure, selecting at least one of the first scheme or the second scheme as the final scheme includes: selecting the second scheme by default as the final scheme; and changing the final scheme from the second scheme to the first scheme when at least one of the base station or the satellite transmits first information related to the second scheme in a state where the second scheme is selected as the final scheme.

In various embodiments of the disclosure, selecting at least one of the first scheme or the second scheme as the final scheme includes: receiving first information related to a scheme to be selected by the UE as the final scheme among the first scheme and the second scheme through at least one of the base station or the satellite; and selecting at least one of the first scheme or the second scheme as the final scheme based on the first information.

In various embodiments of the disclosure, selecting at least one of the first scheme or the second scheme as the final scheme includes selecting at least one of the first scheme or the second scheme as the final scheme based on the capability of the UE itself.

In various embodiments of the disclosure, selecting at least one of the first scheme or the second scheme as the final scheme includes selecting at least one of the first scheme or the second scheme as the final scheme based on the reliability of a signal transmitted from the satellite.

In various embodiments of the disclosure, selecting at least one of the first scheme or the second scheme as the final scheme includes selecting at least one of the first scheme or the second scheme as the final scheme based on the reliability of a signal transmitted from the satellite and a configuration of the satellite.

In various embodiments of the disclosure, selecting at least one of the first scheme or the second scheme as the final scheme includes selecting at least one of the first scheme or the second scheme as the final scheme based on whether the serving cell is provided through a satellite network or through a terrestrial network.

In various embodiments of the disclosure, the method further includes reporting the determined timing-related information and information related to the final scheme to at least one of the base station or the satellite.

A method of a base station in a communication system according to various embodiments of the disclosure includes receiving, from a UE, information on a final scheme used by the UE to determine timing-related information for adjusting the uplink timing, and the timing-related information, wherein at least one of a first scheme where the UE determines the timing-related information or a second scheme where at least one of a base station or a satellite determines the timing-related information is selected as the final scheme.

In various embodiments of the disclosure, the final scheme is selected to be the second scheme by default, or is selected based on the capability of the UE or the reliability of a signal transmitted from the satellite.

A UE in a communication system according to various embodiments of the disclosure includes: a processor and a transceiver, wherein the processor is configured to: select, as a final scheme for determining timing-related information, at least one of a first scheme in which the UE determines timing-related information used to adjust the uplink timing or a second scheme in which at least one of a base station or a satellite determines the timing-related information; and determine the timing-related information based on the final scheme.

In various embodiments of the disclosure, the processor is further configured to adjust the uplink timing based on the determined timing-related information.

In various embodiments of the disclosure, the processor is configured to: select the second scheme by default as the final scheme; and change the final scheme from the second scheme to the first scheme when at least one of the base station or the satellite transmits first information related to the second scheme in a state where the second scheme is selected as the final scheme.

In various embodiments of the disclosure, the transceiver is configured to receive first information related to a scheme to be selected by the UE as the final scheme among the first scheme and the second scheme through at least one of the base station or the satellite; and the processor is configured to select at least one of the first scheme or the second scheme as the final scheme based on the first information.

In various embodiments of the disclosure, the processor is configured to select at least one of the first scheme or the second scheme as the final scheme based on the capability of the UE itself.

In various embodiments of the disclosure, the processor is configured to select at least one of the first scheme or the second scheme as the final scheme based on the reliability of a signal transmitted from the satellite.

In various embodiments of the disclosure, the processor is configured to select at least one of the first scheme or the second scheme as the final scheme based on the reliability of a signal transmitted from the satellite and a configuration of the satellite.

In various embodiments of the disclosure, the processor is configured to select at least one of the first scheme or the second scheme as the final scheme based on whether the serving cell is provided through a satellite network or through a terrestrial network.

In various embodiments of the disclosure, the transceiver is further configured to report the determined timing-related information and information related to the final scheme to at least one of the base station or the satellite.

A base station in a communication system according to various embodiments of the disclosure includes: a transceiver; and a processor, wherein the transceiver is configured to receive, from a UE, information on a final scheme used by the UE to determine timing-related information for adjusting the uplink timing, and the timing-related information, and wherein at least one of a first scheme where the UE determines the timing-related information or a second scheme where at least one of a base station or a satellite determines the timing-related information is selected as the final scheme.

In various embodiments of the disclosure, the final scheme is selected to be the second scheme by default, or is selected based on the capability of the UE or the reliability of a signal transmitted from the satellite.

Meanwhile, the embodiments of the disclosure disclosed in this specification and drawings are only presented as specific examples to easily explain the technical content of the disclosure and help understanding of the disclosure, and are not intended to limit the scope of the disclosure. In other words, it is obvious to those skilled in the art that other modified examples based on the technical idea of the disclosure can be carried out. In addition, individual embodiments may be applied in combination with each other as needed. For example, it will be possible to apply the first embodiment and the second embodiment in combination. In addition, the embodiments of the disclosure may be carried out for systems such as LTE and 5G through other modified examples based on the technical ideas of those embodiments.

Although the disclosure has been described with reference to example embodiments, various changes and modifications may be proposed to those skilled in the art. The disclosure is intended to cover changes and modifications that fall within the scope of the appended claims. None of the detailed description in this application should be read to imply that any particular element, process, or function is an essential element that must be included within the scope of the claims.

The invention claimed is:

1. A method performed by a terminal supporting non-terrestrial network (NTN) communication in a wireless communication system, the method comprising:
identifying a synchronization raster to perform initial access for NTN communication; and
receiving a synchronization signal block (SSB) from a satellite based on the identified synchronization raster,
wherein a position of the synchronization raster is identified by a global synchronization channel number (GSCN),
wherein each GSCN is determined based on a first parameter related to an order of clusters formed by at least one synchronization raster and a second parameter related to an order of synchronization rasters included in a cluster.

2. The method of claim 1, wherein a transmission frequency of the SSB is corrected based on a Doppler effect between the satellite and the terminal.

3. The method of claim 1, wherein the SSB is transmitted by a base station and received via the satellite.

4. The method of claim 3, further comprising receiving, from the base station via the satellite, system information indicating that the base station is a base station for the NTN communication.

5. The method of claim 1, wherein in case that a subcarrier spacing (SCS) of the SSB is 15 kHz and a frequency band for the initial access is lower than 3000 MHz, an interval between $1^{st}$ synchronization rasters included respectively in two adjacent clusters is greater than 1200 kHz or an interval between two adjacent synchronization rasters included in a cluster is less than 50 kHz.

6. The method of claim 1, wherein in case that an SCS of the SSB is 15 kHz and a frequency band for the initial access is lower than 3000 MHz, a maximum value of the first parameter is less than 2499 or a number of synchronization rasters included in a cluster is less than 3.

7. The method of claim 1, wherein an interval between two adjacent synchronization rasters included in a cluster is determined based on an altitude of the satellite.

8. A terminal supporting non-terrestrial network (NTN) communication in a wireless communication system, comprising:
a transceiver to transmit and receive signals; and
a controller connected to the transceiver,
wherein the controller is configured to:
identify a synchronization raster to perform initial access for NTN communication, and
receive a synchronization signal block (SSB) from a satellite based on the identified synchronization raster,
wherein a position of the synchronization raster is identified by a global synchronization channel number (GSCN),
wherein each GSCN is determined based on a first parameter related to an order of clusters formed by at least one synchronization raster and a second parameter related to an order of synchronization rasters included in a cluster.

9. The terminal of claim 8, wherein a transmission frequency of the SSB is corrected based on a Doppler effect between the satellite and the terminal.

10. The terminal of claim 8, wherein the SSB is transmitted by a base station and received via the satellite.

11. The terminal of claim 10, wherein the controller is configured to receive, from the base station via the satellite, system information indicating that the base station is a base station for the NTN communication.

12. The terminal of claim 8, wherein in case that a subcarrier spacing (SCS) of the SSB is 15 kHz and a frequency band for the initial access is lower than 3000 MHz, an interval between $1^{st}$ synchronization rasters included respectively in two adjacent clusters is greater than 1200 kHz or an interval between two adjacent synchronization rasters included in a cluster is less than 50 kHz.

13. The terminal of claim 8, wherein in case that an SCS of the SSB is 15 kHz and a frequency band for the initial access is lower than 3000 MHz, a maximum value of the first parameter is less than 2499.

14. The terminal of claim 8, wherein in case that an SCS of the SSB is 15 kHz and a frequency band for the initial access is lower than 3000 MHz, a number of synchronization rasters included in a cluster is less than 3.

15. The terminal of claim 8, wherein an interval between two adjacent synchronization rasters included in a cluster is determined based on an altitude of the satellite.

\* \* \* \* \*